United States Patent
Jacobs et al.

(10) Patent No.: US 10,757,154 B1
(45) Date of Patent: Aug. 25, 2020

(54) REAL-TIME EVENT-BASED NOTIFICATION SYSTEM

(71) Applicant: Experian Information Solutions, Inc., Costa Mesa, CA (US)

(72) Inventors: Dwayne Charles Jacobs, Irvine, CA (US); Srikumar Puthupadi Kanthadai, El Monte, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 673 days.

(21) Appl. No.: 15/360,496

(22) Filed: Nov. 23, 2016

Related U.S. Application Data

(60) Provisional application No. 62/259,548, filed on Nov. 24, 2015.

(51) Int. Cl.
  *G06Q 40/02* (2012.01)
  *H04L 29/06* (2006.01)

(52) U.S. Cl.
  CPC ....... *H04L 65/4076* (2013.01); *G06Q 40/025* (2013.01)

(58) Field of Classification Search
  CPC ........... H04M 3/42136; H04M 7/0036; H04M 11/04; H04M 2203/2072; H04L 67/306; H04L 65/4076; G06Q 40/025
  See application file for complete search history.

(56) References Cited

U.S. PATENT DOCUMENTS

| | | |
|---|---|---|
| 3,316,395 A | 4/1967 | Lavin et al. |
| 4,305,059 A | 12/1981 | Benton |
| 4,346,442 A | 8/1982 | Musmanno |
| 4,491,725 A | 1/1985 | Pritchard |

(Continued)

FOREIGN PATENT DOCUMENTS

| | | |
|---|---|---|
| CN | 1290373 | 4/2001 |
| CN | 101452555 | 6/2009 |
| CN | 102096886 | 6/2011 |
| CN | 102663650 | 9/2012 |

(Continued)

OTHER PUBLICATIONS

Menge, Falk. "Enterprise Service Bus". Retrieved on Nov. 6, 2019 from <https://pdfs.semanticscholar.org/7539/3c46ab62d8c25d13f79d68ef42e232474b53.pdf> (Year: 2007).*

(Continued)

*Primary Examiner* — Shean Tokuta
*Assistant Examiner* — Juan C Turriate Gastulo
(74) *Attorney, Agent, or Firm* — Knobbe, Martens, Olson & Bear, LLP

(57) ABSTRACT

Methods and systems are provided for generating alerts in association with a request for credit data or an update to credit data. For example, information identifying an individual may be received from a credit bureau when an individual applies for a product or service from a requesting entity. The requesting entity may be a product or service provider that requests credit data of potential purchasers of its products. An electronic notification may then be sent in association with an event object generated by a notification system that is broadcast for delivery to one or more other systems, where the event object may be broadcast substantially in real time, such as via an enterprise server bus, relative to the requesting entity's initial request.

19 Claims, 13 Drawing Sheets

(56) References Cited

U.S. PATENT DOCUMENTS

| | | |
|---|---|---|
| 4,578,530 A | 3/1986 | Zeidler |
| 4,736,294 A | 4/1988 | Gill |
| 4,774,664 A | 9/1988 | Campbell et al. |
| 4,812,628 A | 3/1989 | Boston et al. |
| 4,872,113 A | 10/1989 | Dinerstein |
| 4,876,592 A | 10/1989 | Von Kohorn |
| 4,891,503 A | 1/1990 | Jewell |
| 4,895,518 A | 1/1990 | Arnold |
| 4,947,028 A | 8/1990 | Gorog |
| 5,013,038 A | 5/1991 | Luxenberg et al. |
| 5,025,138 A | 6/1991 | Cuervo |
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,220,501 A | 6/1993 | Lawlor et al. |
| 5,239,462 A | 8/1993 | Jones et al. |
| 5,259,766 A | 11/1993 | Sack |
| 5,262,941 A | 11/1993 | Saladin |
| 5,274,547 A | 12/1993 | Zoffel et al. |
| 5,301,105 A | 4/1994 | Cummings, Jr. |
| 5,317,636 A | 5/1994 | Vizcaino |
| 5,317,733 A | 5/1994 | Murdock |
| 5,336,870 A | 8/1994 | Hughes et al. |
| 5,361,201 A | 11/1994 | Jost et al. |
| 5,500,513 A | 3/1996 | Langhans et al. |
| 5,557,514 A | 9/1996 | Seare et al. |
| 5,583,760 A | 12/1996 | Klesse |
| 5,590,038 A | 12/1996 | Pitroda |
| 5,611,052 A | 3/1997 | Dykstra et al. |
| 5,615,408 A | 3/1997 | Johnson |
| 5,630,127 A | 5/1997 | Moore et al. |
| 5,640,577 A | 6/1997 | Scharmer |
| 5,644,778 A | 7/1997 | Burks et al. |
| 5,649,114 A | 7/1997 | Deaton et al. |
| 5,659,725 A | 8/1997 | Levy et al. |
| 5,696,907 A | 12/1997 | Tom |
| 5,699,527 A | 12/1997 | Davidson |
| 5,704,029 A | 12/1997 | Wright, Jr. |
| 5,704,044 A | 12/1997 | Tarter et al. |
| 5,708,422 A | 1/1998 | Blonder et al. |
| 5,732,400 A | 3/1998 | Mandler |
| 5,739,512 A | 4/1998 | Tognazzini |
| 5,745,654 A | 4/1998 | Titan |
| 5,745,706 A | 4/1998 | Wolfberg et al. |
| 5,748,098 A | 5/1998 | Grace |
| 5,754,632 A | 5/1998 | Smith |
| 5,754,939 A | 5/1998 | Herz et al. |
| 5,764,923 A | 6/1998 | Tallman et al. |
| 5,774,883 A | 6/1998 | Andersen |
| 5,793,972 A | 8/1998 | Shane |
| 5,802,142 A | 9/1998 | Browne |
| 5,819,291 A | 10/1998 | Haimowitz et al. |
| 5,822,410 A | 10/1998 | McCausland et al. |
| 5,828,837 A | 10/1998 | Eikland |
| 5,832,068 A | 11/1998 | Smith |
| 5,832,447 A | 11/1998 | Rieker et al. |
| 5,842,211 A | 11/1998 | Horadan et al. |
| 5,844,218 A | 12/1998 | Kawan et al. |
| 5,857,174 A | 1/1999 | Dugan |
| 5,870,721 A | 2/1999 | Norris |
| 5,875,236 A | 2/1999 | Jankowitz |
| 5,878,403 A | 3/1999 | DeFrancesco |
| 5,884,287 A | 3/1999 | Edesess |
| 5,903,830 A | 5/1999 | Joao et al. |
| 5,903,881 A | 5/1999 | Schrader et al. |
| 5,907,828 A | 5/1999 | Meyer et al. |
| 5,914,472 A | 6/1999 | Foladare et al. |
| 5,918,217 A | 6/1999 | Maggioncalda et al. |
| 5,924,082 A | 7/1999 | Silverman et al. |
| 5,926,800 A | 7/1999 | Baronowski et al. |
| 5,930,759 A | 7/1999 | Moore et al. |
| 5,930,764 A | 7/1999 | Melchione et al. |
| 5,930,776 A | 7/1999 | Dykstra et al. |
| 5,933,809 A | 8/1999 | Hunt et al. |
| 5,940,812 A | 8/1999 | Tengel et al. |
| 5,950,172 A | 9/1999 | Klingman |
| 5,950,179 A | 9/1999 | Buchanan et al. |
| 5,953,710 A | 9/1999 | Fleming |
| 5,956,693 A | 9/1999 | Geerlings |
| 5,960,430 A | 9/1999 | Haimowitz et al. |
| 5,961,593 A | 10/1999 | Gabber et al. |
| 5,966,695 A | 10/1999 | Melchione et al. |
| 5,966,699 A | 10/1999 | Zandi |
| 5,970,478 A | 10/1999 | Walker et al. |
| 5,978,780 A | 11/1999 | Watson |
| 5,991,411 A | 11/1999 | Kaufman et al. |
| 5,995,947 A | 11/1999 | Fraser et al. |
| 5,999,596 A | 12/1999 | Walker et al. |
| 6,006,333 A | 12/1999 | Nielsen |
| 6,012,044 A | 1/2000 | Maggioncalda et al. |
| 6,014,632 A | 1/2000 | Gamble et al. |
| 6,014,645 A | 1/2000 | Cunningham |
| 6,018,723 A | 1/2000 | Siegel et al. |
| 6,021,397 A | 2/2000 | Jones et al. |
| 6,029,149 A | 2/2000 | Dykstra et al. |
| 6,029,178 A | 2/2000 | Martin et al. |
| 6,038,551 A | 3/2000 | Barlow et al. |
| 6,044,351 A | 3/2000 | Jones |
| 6,044,352 A | 3/2000 | Deavers |
| 6,055,570 A | 4/2000 | Nielsen |
| 6,064,987 A | 5/2000 | Walker |
| 6,067,522 A | 5/2000 | Warady et al. |
| 6,070,141 A | 5/2000 | Houvener |
| 6,070,147 A | 5/2000 | Harms et al. |
| 6,070,241 A | 5/2000 | Edwards et al. |
| 6,073,104 A | 6/2000 | Field |
| 6,073,106 A | 6/2000 | Rozen et al. |
| 6,078,922 A | 6/2000 | Johnson et al. |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,108,641 A | 8/2000 | Kenna et al. |
| 6,115,690 A | 9/2000 | Wong |
| 6,115,694 A | 9/2000 | Cheetham et al. |
| 6,119,103 A | 9/2000 | Basch et al. |
| 6,128,599 A | 10/2000 | Walker |
| 6,128,602 A | 10/2000 | Northington et al. |
| 6,128,603 A | 10/2000 | Dent |
| 6,129,273 A | 10/2000 | Shah |
| 6,144,948 A | 11/2000 | Walker et al. |
| 6,154,729 A | 11/2000 | Cannon et al. |
| 6,157,707 A | 12/2000 | Baulier et al. |
| 6,163,770 A | 12/2000 | Gamble et al. |
| 6,171,112 B1 | 1/2001 | Clark et al. |
| 6,182,229 B1 | 1/2001 | Nielsen |
| 6,185,543 B1 | 2/2001 | Galperin et al. |
| 6,202,053 B1 | 3/2001 | Christiansen et al. |
| 6,208,973 B1 | 3/2001 | Boyer et al. |
| 6,249,770 B1 | 6/2001 | Erwin et al. |
| 6,253,202 B1 | 6/2001 | Gilmour |
| 6,253,203 B1 | 6/2001 | O'Flaherty et al. |
| 6,263,447 B1 | 7/2001 | French et al. |
| 6,269,325 B1 | 7/2001 | Lee et al. |
| 6,269,369 B1 | 7/2001 | Robertson |
| 6,275,824 B1 | 8/2001 | O'Flaherty et al. |
| 6,282,658 B2 | 8/2001 | French et al. |
| 6,285,987 B1 | 9/2001 | Roth et al. |
| 6,298,348 B1 | 10/2001 | Eldering |
| 6,304,860 B1 | 10/2001 | Martin et al. |
| 6,311,169 B2 | 10/2001 | Duhon |
| 6,321,205 B1 | 11/2001 | Eder |
| 6,321,339 B1 | 11/2001 | French et al. |
| 6,324,524 B1 | 11/2001 | Lent et al. |
| 6,330,546 B1 | 12/2001 | Gopinathan et al. |
| 6,330,575 B1 | 12/2001 | Moore |
| 6,339,790 B1 | 1/2002 | Inoue |
| 6,343,279 B1 | 1/2002 | Bissonette et al. |
| 6,374,229 B1 | 4/2002 | Lowrey et al. |
| 6,374,230 B1 | 4/2002 | Walker et al. |
| 6,374,264 B1 | 4/2002 | Bohannon et al. |
| 6,384,844 B1 | 5/2002 | Stewart et al. |
| 6,385,594 B1 | 5/2002 | Lebda et al. |

(56) References Cited

U.S. PATENT DOCUMENTS

| | | |
|---|---|---|
| 6,393,406 B1 | 5/2002 | Eder |
| 6,397,197 B1 | 5/2002 | Gindlesperger |
| 6,397,224 B1 | 5/2002 | Zubeldia et al. |
| 6,405,173 B1 | 6/2002 | Honarvar |
| 6,405,181 B2 | 6/2002 | Lent et al. |
| 6,424,878 B1 | 7/2002 | Barker et al. |
| 6,430,539 B1 | 8/2002 | Lazarus et al. |
| 6,453,297 B1 | 9/2002 | Burks et al. |
| 6,456,983 B1 | 9/2002 | Keyes et al. |
| 6,463,533 B1 | 10/2002 | Calamera et al. |
| 6,496,827 B2 | 12/2002 | Kozam et al. |
| 6,496,936 B1 | 12/2002 | French et al. |
| 6,513,018 B1 | 1/2003 | Culhane |
| 6,523,021 B1 | 2/2003 | Monberg et al. |
| 6,529,880 B1 | 3/2003 | McKeen et al. |
| 6,532,450 B1 | 3/2003 | Brown et al. |
| 6,542,894 B1 | 4/2003 | Lee et al. |
| 6,543,683 B2 | 4/2003 | Hoffman |
| 6,564,210 B1 | 5/2003 | Korda et al. |
| 6,567,791 B2 | 5/2003 | Lent et al. |
| 6,581,059 B1 | 6/2003 | Barrett et al. |
| 6,581,075 B1 | 6/2003 | Guturu et al. |
| 6,587,841 B1 | 7/2003 | DeFrancesco |
| 6,598,030 B1 | 7/2003 | Siegel et al. |
| 6,601,173 B1 | 7/2003 | Mohler |
| 6,611,816 B2 | 8/2003 | Lebda et al. |
| 6,622,131 B1 | 9/2003 | Brown et al. |
| 6,622,266 B1 | 9/2003 | Goddard et al. |
| 6,629,245 B1 | 9/2003 | Stone et al. |
| 6,636,803 B1 | 10/2003 | Hartz, Jr. et al. |
| 6,647,383 B1 | 11/2003 | August et al. |
| 6,658,393 B1 | 12/2003 | Basch et al. |
| 6,684,093 B2 | 1/2004 | Kuth |
| 6,714,944 B1 | 3/2004 | Shapiro et al. |
| 6,734,886 B1 | 5/2004 | Hagan et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,390 B2 | 8/2004 | Lee et al. |
| 6,795,812 B1 | 9/2004 | Lent et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,823,319 B1 | 11/2004 | Lynch et al. |
| 6,826,535 B2 | 11/2004 | Wood et al. |
| 6,832,229 B2 | 12/2004 | Reed |
| 6,839,690 B1 | 1/2005 | Foth et al. |
| 6,845,448 B1 | 1/2005 | Chaganti et al. |
| 6,847,942 B1 | 1/2005 | Land et al. |
| 6,857,073 B2 | 2/2005 | French et al. |
| 6,873,972 B1 | 3/2005 | Marcial et al. |
| 6,901,406 B2 | 5/2005 | Nabe et al. |
| 6,910,624 B1 | 6/2005 | Natsuno |
| 6,912,483 B2 | 6/2005 | Frederick |
| 6,934,714 B2 | 8/2005 | Meinig |
| 6,950,807 B2 | 9/2005 | Brock |
| 6,950,858 B2 | 9/2005 | Ogami |
| 6,954,757 B2 | 10/2005 | Zargham et al. |
| 6,962,336 B2 | 11/2005 | Glass |
| 6,968,319 B1 | 11/2005 | Remington et al. |
| 6,983,379 B1 | 1/2006 | Spalink et al. |
| 6,985,887 B1 | 1/2006 | Sunstein et al. |
| 6,988,085 B2 | 1/2006 | Hedy |
| 6,999,941 B1 | 2/2006 | Agarwal |
| 7,003,476 B1 | 2/2006 | Samra et al. |
| 7,003,491 B2 | 2/2006 | Starkman |
| 7,016,870 B1 | 3/2006 | Jones et al. |
| 7,028,052 B2 | 4/2006 | Chapman et al. |
| 7,039,607 B2 | 5/2006 | Watarai et al. |
| 7,058,817 B1 | 6/2006 | Ellmore |
| 7,062,458 B2 | 6/2006 | Maggioncalda et al. |
| 7,065,566 B2 | 6/2006 | Menard et al. |
| 7,069,240 B2 | 6/2006 | Spero et al. |
| 7,069,249 B2 | 6/2006 | Stolfo et al. |
| 7,072,842 B2 | 7/2006 | Provost et al. |
| 7,076,462 B1 | 7/2006 | Nelson et al. |
| 7,076,475 B2 | 7/2006 | Honarvar et al. |
| 7,083,087 B1 | 8/2006 | Gangi |
| 7,107,241 B1 | 9/2006 | Pinto |
| 7,120,599 B2 | 10/2006 | Keyes |
| 7,124,144 B2 | 10/2006 | Christianson et al. |
| 7,133,840 B1 | 11/2006 | Kenna et al. |
| 7,133,935 B2 | 11/2006 | Hedy |
| 7,143,063 B2 | 11/2006 | Lent |
| 7,165,037 B2 | 1/2007 | Lazarus et al. |
| 7,171,371 B2 | 1/2007 | Goldstein |
| 7,174,302 B2 | 2/2007 | Patricelli et al. |
| 7,181,427 B1 | 2/2007 | DeFrancesco |
| 7,188,169 B2 | 3/2007 | Buus et al. |
| 7,191,150 B1 | 3/2007 | Shao et al. |
| 7,191,451 B2 | 3/2007 | Nakagawa |
| 7,197,468 B1 | 3/2007 | Patricelli et al. |
| 7,206,768 B1 | 4/2007 | deGroeve et al. |
| 7,212,995 B2 | 5/2007 | Schulkins |
| 7,234,156 B2 | 6/2007 | French et al. |
| 7,234,160 B2 | 6/2007 | Vogel et al. |
| 7,236,950 B2 | 6/2007 | Savage et al. |
| 7,243,075 B1 | 7/2007 | Shaffer et al. |
| 7,246,067 B2 | 7/2007 | Austin et al. |
| 7,246,068 B2 | 7/2007 | Thomas, Jr. |
| 7,249,076 B1 | 7/2007 | Pendleton et al. |
| 7,249,113 B1 | 7/2007 | Continelli et al. |
| 7,251,625 B2 | 7/2007 | Anglum |
| 7,254,558 B2 | 8/2007 | Hinkle et al. |
| 7,263,497 B1 | 8/2007 | Wiser et al. |
| 7,277,869 B2 | 10/2007 | Starkman |
| 7,280,980 B1 | 10/2007 | Hoadley et al. |
| 7,280,983 B2 | 10/2007 | Kuroda et al. |
| 7,281,652 B2 | 10/2007 | Foss |
| 7,289,971 B1 | 10/2007 | O'Neil et al. |
| 7,295,988 B1 | 11/2007 | Reeves |
| 7,296,734 B2 | 11/2007 | Pliha |
| 7,298,872 B2 | 11/2007 | Glisson |
| 7,302,420 B2 | 11/2007 | Aggarwal et al. |
| 7,305,359 B2 | 12/2007 | Bonnell |
| 7,308,417 B1 | 12/2007 | Nathan |
| 7,310,617 B1 | 12/2007 | Cunningham |
| 7,313,538 B2 | 12/2007 | Wilmes et al. |
| 7,314,166 B2 | 1/2008 | Anderson et al. |
| 7,318,224 B2 | 1/2008 | Honarvar et al. |
| 7,328,276 B2 | 2/2008 | Alisuag |
| 7,330,835 B2 | 2/2008 | Deggendorf |
| 7,333,635 B2 | 2/2008 | Tsantes et al. |
| 7,333,937 B2 | 2/2008 | Baldwin, Jr. et al. |
| 7,337,133 B1 | 2/2008 | Bezos et al. |
| 7,337,468 B2 | 2/2008 | Metzger |
| 7,340,424 B2 | 3/2008 | Gang et al. |
| 7,340,434 B2 | 3/2008 | Schnall |
| 7,343,295 B2 | 3/2008 | Pomerance |
| 7,346,576 B2 | 3/2008 | Lent et al. |
| 7,356,516 B2 | 4/2008 | Richey et al. |
| 7,366,694 B2 | 4/2008 | Lazerson |
| 7,370,044 B2 | 5/2008 | Mulhern et al. |
| 7,376,603 B1 | 5/2008 | Mayr et al. |
| 7,379,913 B2 | 5/2008 | Steele et al. |
| 7,380,707 B1 | 6/2008 | Fredman |
| 7,383,215 B1 | 6/2008 | Navarro et al. |
| 7,383,988 B2 | 6/2008 | Slonecker, Jr. |
| 7,386,466 B2 | 6/2008 | McLean et al. |
| 7,392,216 B1 | 6/2008 | Palmgren et al. |
| 7,395,232 B1 | 7/2008 | Pilato |
| 7,395,273 B2 | 7/2008 | Khan et al. |
| 7,403,919 B2 | 7/2008 | Chacko et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,418,417 B2 | 8/2008 | Chacko et al. |
| 7,433,864 B2 | 10/2008 | Malik |
| 7,451,095 B1 | 11/2008 | Bradley et al. |
| 7,451,113 B1 | 11/2008 | Kasower |
| 7,460,857 B2 | 12/2008 | Roach, Jr. |
| 7,467,401 B2 | 12/2008 | Cicchitto |
| 7,478,157 B2 | 1/2009 | Bohrer et al. |

(56) References Cited

U.S. PATENT DOCUMENTS

| | | |
|---|---|---|
| 7,479,949 B2 | 1/2009 | Jobs et al. |
| 7,480,631 B1 | 1/2009 | Merced et al. |
| 7,490,356 B2 | 2/2009 | Lieblich et al. |
| 7,505,939 B2 | 3/2009 | Lent et al. |
| 7,527,967 B2 | 5/2009 | Chao et al. |
| 7,529,698 B2 | 5/2009 | Joao |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,543,739 B2 | 6/2009 | Brown et al. |
| 7,546,266 B2 | 6/2009 | Beirne et al. |
| 7,546,271 B1 | 6/2009 | Chmielewski et al. |
| 7,552,080 B1 | 6/2009 | Willard et al. |
| 7,552,086 B1 | 6/2009 | Rajasekar et al. |
| 7,556,192 B2 | 7/2009 | Wokaty, Jr. |
| 7,559,217 B2 | 7/2009 | Bass |
| 7,562,184 B2 | 7/2009 | Henmi et al. |
| 7,562,814 B1 | 7/2009 | Shao et al. |
| 7,571,138 B2 | 8/2009 | Miri et al. |
| 7,580,884 B2 | 8/2009 | Cook |
| 7,584,127 B2 | 9/2009 | Byrne et al. |
| 7,584,146 B1 | 9/2009 | Duhon |
| 7,587,366 B2 | 9/2009 | Grim, III et al. |
| 7,593,889 B2 | 9/2009 | Raines et al. |
| 7,593,891 B2 | 9/2009 | Kornegay et al. |
| 7,593,892 B2 | 9/2009 | Balk et al. |
| 7,596,512 B1 | 9/2009 | Raines et al. |
| 7,596,716 B2 | 9/2009 | Frost et al. |
| 7,603,317 B2 | 10/2009 | Adler et al. |
| 7,603,701 B2 | 10/2009 | Gaucas |
| 7,606,725 B2 | 10/2009 | Robertson et al. |
| 7,610,229 B1 | 10/2009 | Kornegay |
| 7,617,116 B2 | 11/2009 | Amar et al. |
| 7,620,592 B2 | 11/2009 | O'Mara et al. |
| 7,624,068 B1 | 11/2009 | Heasley et al. |
| 7,630,932 B2 | 12/2009 | Danaher et al. |
| 7,630,933 B2 | 12/2009 | Peterson et al. |
| 7,640,200 B2 | 12/2009 | Gardner et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,593 B2 | 1/2010 | Zarikian et al. |
| 7,672,833 B2 | 3/2010 | Blume et al. |
| 7,676,410 B2 | 3/2010 | Petralia |
| 7,676,418 B1 | 3/2010 | Chung et al. |
| 7,689,451 B2 | 3/2010 | Vives |
| 7,689,505 B2 | 3/2010 | Kasower |
| 7,689,506 B2 | 3/2010 | Fei et al. |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,102 B2 | 4/2010 | Rothstein |
| 7,711,635 B2 | 5/2010 | Steele et al. |
| 7,711,636 B2 | 5/2010 | Robida et al. |
| 7,720,750 B2 | 5/2010 | Brody |
| 7,725,385 B2 | 5/2010 | Royer et al. |
| 7,729,959 B1 | 6/2010 | Wells et al. |
| 7,729,983 B1 | 6/2010 | Ellis |
| 7,734,522 B2 | 6/2010 | Johnson et al. |
| 7,739,139 B2 | 6/2010 | Robertson et al. |
| 7,747,559 B2 | 6/2010 | Leitner et al. |
| 7,752,132 B2 | 7/2010 | Stewart et al. |
| 7,756,789 B2 | 7/2010 | Welker et al. |
| 7,765,311 B2 | 7/2010 | Itabashi et al. |
| 7,769,657 B2 | 8/2010 | Chacko et al. |
| 7,769,696 B2 | 8/2010 | Yoda |
| 7,769,998 B2 | 8/2010 | Lynch et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,783,562 B1 | 8/2010 | Ellis |
| 7,788,147 B2 | 8/2010 | Haggerty et al. |
| 7,788,152 B2 | 8/2010 | Haggerty et al. |
| 7,788,155 B2 | 8/2010 | Jones et al. |
| 7,792,715 B1 | 9/2010 | Kasower |
| 7,792,716 B2 | 9/2010 | Gooding et al. |
| 7,792,732 B2 | 9/2010 | Haggerty et al. |
| 7,797,725 B2 | 9/2010 | Lunt et al. |
| 7,801,807 B2 | 9/2010 | DeFrancesco et al. |
| 7,801,812 B2 | 9/2010 | Conlin et al. |
| 7,801,828 B2 | 9/2010 | Candella et al. |
| 7,805,345 B2 | 9/2010 | Abrahams et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,832,006 B2 | 11/2010 | Chen et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,008 B1 | 11/2010 | Cole et al. |
| 7,848,972 B1 | 12/2010 | Sharma |
| 7,848,978 B2 | 12/2010 | Imrey et al. |
| 7,849,004 B2 | 12/2010 | Choudhuri et al. |
| 7,849,014 B2 | 12/2010 | Erikson |
| 7,853,493 B2 | 12/2010 | DeBie et al. |
| 7,853,518 B2 | 12/2010 | Cagan |
| 7,853,984 B2 | 12/2010 | Antell et al. |
| 7,853,998 B2 | 12/2010 | Blaisdell et al. |
| 7,856,386 B2 | 12/2010 | Hazlehurst et al. |
| 7,860,782 B2 | 12/2010 | Cash et al. |
| 7,860,786 B2 | 12/2010 | Blackburn et al. |
| 7,870,078 B2 | 1/2011 | Clark et al. |
| 7,877,304 B1 | 1/2011 | Coulter |
| 7,880,728 B2 | 2/2011 | de los Reyes et al. |
| 7,890,420 B2 | 2/2011 | Haggerty et al. |
| 7,899,750 B1 | 3/2011 | Klieman et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,912,770 B2 | 3/2011 | Haggerty et al. |
| 7,912,865 B2 | 3/2011 | Akerman et al. |
| 7,925,578 B1 | 4/2011 | Hong et al. |
| 7,925,582 B1 | 4/2011 | Kornegay et al. |
| 7,930,195 B2 | 4/2011 | Heyns et al. |
| 7,930,252 B2 | 4/2011 | Bender et al. |
| 7,941,363 B2 | 5/2011 | Tanaka et al. |
| 7,941,365 B1 | 5/2011 | Bradley et al. |
| 7,945,510 B1 | 5/2011 | Bradley et al. |
| 7,966,192 B2 | 6/2011 | Pagliari et al. |
| 7,966,255 B2 | 6/2011 | Wong et al. |
| 7,970,676 B2 | 6/2011 | Feinstein |
| 7,970,679 B2 | 6/2011 | Kasower |
| 7,970,698 B2 | 6/2011 | Gupta et al. |
| 7,974,919 B2 | 7/2011 | Conlin et al. |
| 7,979,908 B2 | 7/2011 | Millwee |
| 7,983,975 B2 | 7/2011 | Jones et al. |
| 7,983,976 B2 | 7/2011 | Nafeh et al. |
| 7,983,979 B2 | 7/2011 | Holland, IV |
| 7,987,124 B1 | 7/2011 | Holden et al. |
| 7,991,689 B1 | 8/2011 | Brunzell et al. |
| 8,001,034 B2 | 8/2011 | Chung et al. |
| 8,001,040 B2 | 8/2011 | Keithley |
| 8,001,041 B2 | 8/2011 | Hoadley et al. |
| 8,001,042 B1 | 8/2011 | Brunzell et al. |
| 8,001,043 B1 | 8/2011 | Walker et al. |
| 8,001,153 B2 | 8/2011 | Skurtovich, Jr. et al. |
| 8,005,738 B2 | 8/2011 | Chacko et al. |
| 8,005,759 B2 | 8/2011 | Hirtenstein et al. |
| 8,005,795 B2 | 8/2011 | Galipeau et al. |
| 8,015,107 B2 | 9/2011 | Kornegay et al. |
| 8,019,828 B2 | 9/2011 | Cash et al. |
| 8,019,843 B2 | 9/2011 | Cash et al. |
| 8,024,263 B2 | 9/2011 | Zarikian et al. |
| 8,024,778 B2 | 9/2011 | Cash et al. |
| 8,032,932 B2 | 10/2011 | Speyer et al. |
| 8,055,579 B2 | 11/2011 | Davies et al. |
| 8,060,424 B2 | 11/2011 | Kasower |
| 8,060,441 B2 | 11/2011 | Stewart et al. |
| 8,064,586 B2 | 11/2011 | Shaffer et al. |

(56) References Cited

U.S. PATENT DOCUMENTS

| | | |
|---|---|---|
| 8,065,233 B2 | 11/2011 | Lee et al. |
| 8,065,234 B2 | 11/2011 | Liao et al. |
| 8,073,768 B2 | 12/2011 | Haggerty et al. |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,082,202 B2 | 12/2011 | Weiss |
| 8,086,523 B1 | 12/2011 | Palmer |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,099,356 B2 | 1/2012 | Feinstein et al. |
| 8,104,679 B2 | 1/2012 | Brown |
| 8,127,982 B1 | 3/2012 | Casey et al. |
| 8,127,986 B1 | 3/2012 | Taylor et al. |
| 8,131,614 B2 | 3/2012 | Haggerty et al. |
| 8,131,685 B1 | 3/2012 | Gedalius et al. |
| 8,135,642 B1 | 3/2012 | Krause |
| 8,160,960 B1 | 4/2012 | Fei et al. |
| 8,165,940 B2 | 4/2012 | Meimes et al. |
| 8,195,549 B2 | 6/2012 | Kasower |
| 8,201,257 B1 | 6/2012 | Andres et al. |
| 8,204,774 B2 | 6/2012 | Chwast et al. |
| 8,204,812 B2 | 6/2012 | Stewart et al. |
| 8,219,535 B1 | 7/2012 | Kobori et al. |
| 8,224,723 B2 | 7/2012 | Bosch et al. |
| 8,225,395 B2 | 7/2012 | Atwood et al. |
| 8,234,498 B2 | 7/2012 | Britti et al. |
| 8,239,130 B1 | 8/2012 | Upstill et al. |
| 8,255,971 B1 | 8/2012 | Webb et al. |
| 8,285,613 B1 | 10/2012 | Coulter |
| 8,285,656 B1 | 10/2012 | Chang et al. |
| 8,290,840 B2 | 10/2012 | Kasower |
| 8,296,229 B1 | 10/2012 | Yellin et al. |
| 8,311,936 B2 | 11/2012 | Haggerty et al. |
| 8,312,033 B1 | 11/2012 | McMillan |
| 8,315,942 B2 | 11/2012 | Haggerty et al. |
| 8,321,334 B1 | 11/2012 | Kornegay et al. |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,340,685 B2 | 12/2012 | Cochran et al. |
| 8,355,967 B2 | 1/2013 | Debie et al. |
| 8,364,518 B1 | 1/2013 | Blake et al. |
| 8,364,588 B2 | 1/2013 | Celka et al. |
| 8,380,618 B1 | 2/2013 | Kazenas et al. |
| 8,386,377 B1 | 2/2013 | Xiong et al. |
| 8,392,334 B2 | 3/2013 | Hirtenstein et al. |
| 8,412,593 B1 | 4/2013 | Song et al. |
| 8,418,254 B2 | 4/2013 | Britti et al. |
| 8,433,512 B1 | 4/2013 | Lopatenko et al. |
| 8,433,648 B2 | 4/2013 | Keithley et al. |
| 8,442,886 B1 | 5/2013 | Haggerty et al. |
| 8,458,062 B2 | 6/2013 | Dutt et al. |
| 8,458,074 B2 | 6/2013 | Showalter |
| 8,463,595 B1 | 6/2013 | Rehling et al. |
| 8,464,939 B1 | 6/2013 | Taylor et al. |
| 8,473,353 B2 | 6/2013 | Matsuda et al. |
| 8,473,354 B2 | 6/2013 | Psota et al. |
| 8,478,686 B1 | 7/2013 | Giles |
| 8,489,502 B2 | 7/2013 | Morris et al. |
| 8,515,844 B2 | 8/2013 | Kasower |
| 8,527,596 B2 | 9/2013 | Long et al. |
| 8,533,118 B2 | 9/2013 | Weller et al. |
| 8,560,161 B1 | 10/2013 | Kator et al. |
| 8,560,436 B2 | 10/2013 | Ingram et al. |
| 8,566,029 B1 | 10/2013 | Lopatenko et al. |
| 8,566,141 B1 | 10/2013 | Nagdev et al. |
| 8,571,971 B1 | 10/2013 | Brown et al. |
| 8,572,083 B1 | 10/2013 | Snell et al. |
| 8,589,069 B1 | 11/2013 | Lehman |
| 8,589,208 B2 | 11/2013 | Kruger et al. |
| 8,589,286 B1 | 11/2013 | Kornegay et al. |
| 8,595,101 B1 | 11/2013 | Daukas et al. |
| 8,600,886 B2 | 12/2013 | Ramavarjula et al. |
| 8,606,694 B2 | 12/2013 | Campbell et al. |
| 8,621,562 B2 | 12/2013 | Antell et al. |
| 8,626,618 B2 | 1/2014 | Psota et al. |
| 8,631,242 B2 | 1/2014 | Britti et al. |
| 8,639,616 B1 | 1/2014 | Rolenaitis et al. |
| 8,646,101 B2 | 2/2014 | Millwee |
| 8,650,407 B2 | 2/2014 | Britti et al. |
| 8,660,919 B2 | 2/2014 | Kasower |
| 8,671,107 B2 | 3/2014 | Scully et al. |
| 8,671,115 B2 | 3/2014 | Skurtovich, Jr. et al. |
| 8,694,420 B1 | 4/2014 | Oliai |
| 8,719,159 B2 | 5/2014 | Keithley |
| 8,725,613 B1 | 5/2014 | Celka et al. |
| 8,732,004 B1 | 5/2014 | Ramos et al. |
| 8,738,516 B1 | 5/2014 | Dean et al. |
| 8,744,956 B1 | 6/2014 | DiChiara et al. |
| 8,756,099 B2 | 6/2014 | Keithley et al. |
| 8,760,417 B2 | 6/2014 | Haug |
| 8,762,243 B2 | 6/2014 | Jenkins et al. |
| 8,768,914 B2 | 7/2014 | Scriffignano et al. |
| 8,775,299 B2 | 7/2014 | Achanta et al. |
| 8,781,882 B1 | 7/2014 | Arboletti et al. |
| 8,781,951 B2 | 7/2014 | Lewis et al. |
| 8,781,953 B2 | 7/2014 | Kasower |
| 8,806,218 B2 | 8/2014 | Hatakeda |
| 8,856,894 B1 | 10/2014 | Dean et al. |
| 8,930,251 B2 | 1/2015 | DeBie |
| 8,930,262 B1 | 1/2015 | Searson et al. |
| 8,930,263 B1 | 1/2015 | Mahacek et al. |
| 8,931,058 B2 | 1/2015 | DiChiara et al. |
| 8,938,399 B1 | 1/2015 | Herman |
| 8,938,432 B2 | 1/2015 | Rossmark et al. |
| 8,949,981 B1 | 2/2015 | Trollope et al. |
| 9,043,930 B2 | 5/2015 | Britti et al. |
| 9,053,589 B1 | 6/2015 | Kator et al. |
| 9,053,590 B1 | 6/2015 | Kator et al. |
| 9,058,627 B1 | 6/2015 | Wasser et al. |
| 9,076,276 B1 | 7/2015 | Kator et al. |
| 9,116,918 B1 | 8/2015 | Kim |
| 9,143,541 B1 | 9/2015 | Szamonek et al. |
| 9,147,042 B1 | 9/2015 | Haller et al. |
| 9,183,363 B1 | 11/2015 | Millwee |
| 9,213,461 B2 | 12/2015 | Eraker et al. |
| 9,251,541 B2 | 2/2016 | Celka et al. |
| 9,256,624 B2 | 2/2016 | Skurtovich, Jr. et al. |
| 9,256,904 B1 | 2/2016 | Haller et al. |
| 9,443,268 B1 | 9/2016 | Kapczynski et al. |
| 9,489,694 B2 | 11/2016 | Haller et al. |
| 9,553,936 B2 | 1/2017 | Dijk et al. |
| 9,558,519 B1 | 1/2017 | Burger |
| 9,569,797 B1 | 2/2017 | Rohn et al. |
| 9,607,336 B1 * | 3/2017 | Dean .................. G06Q 40/025 |
| 9,652,802 B1 | 5/2017 | Kasower |
| 9,684,905 B1 | 6/2017 | Haller et al. |
| 9,690,820 B1 | 6/2017 | Girulat, Jr. |
| 9,697,263 B1 | 7/2017 | Girulat, Jr. |
| 9,710,523 B2 | 7/2017 | Skurtovich, Jr. et al. |
| 9,710,852 B1 | 7/2017 | Olson et al. |
| 9,760,553 B1 | 9/2017 | Hecht-Nielse |
| 9,792,648 B1 | 10/2017 | Haller et al. |
| 10,115,155 B1 | 10/2018 | Haller et al. |
| 10,380,654 B2 | 8/2019 | Hirtenstein et al. |
| 10,417,704 B2 | 9/2019 | Searson et al. |
| 10,528,545 B1 | 1/2020 | Girulat, Jr. |
| 10,565,643 B2 | 2/2020 | Rohn et al. |
| 10,586,279 B1 | 3/2020 | Ramos et al. |
| 2001/0011247 A1 | 8/2001 | O'Flaherty et al. |
| 2001/0014868 A1 | 8/2001 | Herz et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0029482 A1 | 10/2001 | Tealdi et al. |
| 2001/0034618 A1 | 10/2001 | Kessler et al. |
| 2001/0034631 A1 | 10/2001 | Kiselik |
| 2001/0039523 A1 | 11/2001 | Iwamoto |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |

(56) References Cited

U.S. PATENT DOCUMENTS

| | | |
|---|---|---|
| 2001/0044756 A1 | 11/2001 | Watkins et al. |
| 2001/0049620 A1 | 12/2001 | Blasko |
| 2002/0004736 A1 | 1/2002 | Roundtree et al. |
| 2002/0004774 A1 | 1/2002 | Defarlo |
| 2002/0010594 A1 | 1/2002 | Levine |
| 2002/0026519 A1 | 2/2002 | Itabashi et al. |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0035520 A1 | 3/2002 | Weiss |
| 2002/0042763 A1 | 4/2002 | Pillay et al. |
| 2002/0049624 A1 | 4/2002 | Ravels, Jr. |
| 2002/0052836 A1 | 5/2002 | Galperin et al. |
| 2002/0052841 A1 | 5/2002 | Guthrie et al. |
| 2002/0055869 A1 | 5/2002 | Hegg |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0091650 A1 | 7/2002 | Ellis |
| 2002/0099635 A1 | 7/2002 | Guiragosian |
| 2002/0099641 A1 | 7/2002 | Mills et al. |
| 2002/0099824 A1 | 7/2002 | Bender et al. |
| 2002/0107765 A1* | 8/2002 | Walker ............... G06Q 30/02 705/35 |
| 2002/0107849 A1 | 8/2002 | Hickey et al. |
| 2002/0111816 A1 | 8/2002 | Lortscher et al. |
| 2002/0111890 A1 | 8/2002 | Sloan et al. |
| 2002/0116247 A1 | 8/2002 | Tucker et al. |
| 2002/0119824 A1 | 8/2002 | Allen |
| 2002/0128962 A1 | 9/2002 | Kasower |
| 2002/0133365 A1 | 9/2002 | Grey et al. |
| 2002/0133462 A1 | 9/2002 | Shteyn |
| 2002/0138297 A1 | 9/2002 | Lee |
| 2002/0138470 A1 | 9/2002 | Zhou |
| 2002/0147617 A1 | 10/2002 | Schoenbaum et al. |
| 2002/0147669 A1 | 10/2002 | Taylor et al. |
| 2002/0147695 A1 | 10/2002 | Khedkar et al. |
| 2002/0152166 A1 | 10/2002 | Dutta et al. |
| 2002/0156676 A1 | 10/2002 | Ahrens et al. |
| 2002/0156797 A1 | 10/2002 | Lee et al. |
| 2002/0161664 A1 | 10/2002 | Shaya et al. |
| 2002/0165757 A1 | 11/2002 | Lisser |
| 2002/0165839 A1 | 11/2002 | Taylor et al. |
| 2002/0169747 A1 | 11/2002 | Chapman et al. |
| 2002/0173994 A1 | 11/2002 | Ferguson, III |
| 2002/0174048 A1 | 11/2002 | Dheer et al. |
| 2002/0174124 A1 | 11/2002 | Haas et al. |
| 2002/0184054 A1 | 12/2002 | Cox et al. |
| 2002/0188478 A1 | 12/2002 | Breeland et al. |
| 2002/0194103 A1 | 12/2002 | Nabe |
| 2002/0194117 A1 | 12/2002 | Nabe et al. |
| 2002/0194120 A1 | 12/2002 | Russell et al. |
| 2002/0198736 A1 | 12/2002 | Harrison |
| 2002/0198806 A1 | 12/2002 | Blagg et al. |
| 2002/0198824 A1 | 12/2002 | Cook |
| 2002/0198830 A1 | 12/2002 | Randell et al. |
| 2003/0009415 A1 | 1/2003 | Lutnick et al. |
| 2003/0009418 A1 | 1/2003 | Green et al. |
| 2003/0014336 A1 | 1/2003 | Dao et al. |
| 2003/0018549 A1 | 1/2003 | Fei et al. |
| 2003/0028402 A1 | 2/2003 | Ulrich et al. |
| 2003/0028477 A1 | 2/2003 | Stevenson et al. |
| 2003/0036926 A1 | 2/2003 | Starkey et al. |
| 2003/0036995 A1 | 2/2003 | Lazerson |
| 2003/0037054 A1 | 2/2003 | Dutta et al. |
| 2003/0041019 A1 | 2/2003 | Vagim, III et al. |
| 2003/0041031 A1 | 2/2003 | Hedy |
| 2003/0046112 A1 | 3/2003 | Dutta et al. |
| 2003/0046222 A1 | 3/2003 | Bard et al. |
| 2003/0046311 A1 | 3/2003 | Baidya et al. |
| 2003/0050795 A1 | 3/2003 | Baldwin, Jr. et al. |
| 2003/0050796 A1 | 3/2003 | Baldwin, Jr. et al. |
| 2003/0064705 A1 | 4/2003 | Desierio |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0078897 A1 | 4/2003 | Florance et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0110111 A1 | 6/2003 | Nalebuff et al. |
| 2003/0115122 A1 | 6/2003 | Slater et al. |
| 2003/0154162 A1 | 8/2003 | Danaher et al. |
| 2003/0158960 A1 | 8/2003 | Engberg |
| 2003/0163416 A1 | 8/2003 | Kitajima |
| 2003/0163435 A1 | 8/2003 | Payone |
| 2003/0163483 A1 | 8/2003 | Zingher et al. |
| 2003/0172039 A1 | 9/2003 | Guy |
| 2003/0177091 A1 | 9/2003 | Paglin |
| 2003/0187780 A1 | 10/2003 | Arthus et al. |
| 2003/0195830 A1 | 10/2003 | Merkoulovitch et al. |
| 2003/0195859 A1 | 10/2003 | Lawrence |
| 2003/0204752 A1 | 10/2003 | Garrison |
| 2003/0208412 A1 | 11/2003 | Hillestad et al. |
| 2003/0212618 A1 | 11/2003 | Keyes et al. |
| 2003/0220858 A1 | 11/2003 | Lam et al. |
| 2003/0229507 A1 | 12/2003 | Perge |
| 2003/0229580 A1 | 12/2003 | Gass et al. |
| 2003/0233259 A1 | 12/2003 | Mistretta et al. |
| 2003/0236738 A1 | 12/2003 | Lange et al. |
| 2004/0006488 A1 | 1/2004 | Fitall et al. |
| 2004/0006536 A1 | 1/2004 | Kawashima et al. |
| 2004/0010443 A1 | 1/2004 | May et al. |
| 2004/0010458 A1 | 1/2004 | Friedman |
| 2004/0023637 A1 | 2/2004 | Johnson et al. |
| 2004/0024709 A1 | 2/2004 | Yu et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0030667 A1 | 2/2004 | Xu et al. |
| 2004/0039688 A1 | 2/2004 | Sulkowski et al. |
| 2004/0044563 A1 | 3/2004 | Stein |
| 2004/0044615 A1 | 3/2004 | Xue et al. |
| 2004/0044617 A1 | 3/2004 | Lu |
| 2004/0044673 A1 | 3/2004 | Brady et al. |
| 2004/0049473 A1 | 3/2004 | Gower et al. |
| 2004/0050928 A1 | 3/2004 | Bishop et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078323 A1 | 4/2004 | Johnston et al. |
| 2004/0078324 A1 | 4/2004 | Lonnberg et al. |
| 2004/0088237 A1 | 5/2004 | Moenickheim et al. |
| 2004/0088255 A1 | 5/2004 | Zielke et al. |
| 2004/0103147 A1 | 5/2004 | Flesher et al. |
| 2004/0111292 A1 | 6/2004 | Hutchins |
| 2004/0111305 A1 | 6/2004 | Gavan et al. |
| 2004/0111358 A1 | 6/2004 | Lange et al. |
| 2004/0111359 A1 | 6/2004 | Hudock |
| 2004/0111363 A1 | 6/2004 | Trench et al. |
| 2004/0117235 A1 | 6/2004 | Shacham |
| 2004/0117302 A1 | 6/2004 | Weichert et al. |
| 2004/0128150 A1 | 7/2004 | Lundegren |
| 2004/0128230 A1 | 7/2004 | Oppenheimer et al. |
| 2004/0133493 A1 | 7/2004 | Ford et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0138995 A1 | 7/2004 | Hershkowitz et al. |
| 2004/0139025 A1 | 7/2004 | Coleman |
| 2004/0143546 A1 | 7/2004 | Wood et al. |
| 2004/0153437 A1 | 8/2004 | Buchan |
| 2004/0153521 A1 | 8/2004 | Kogo |
| 2004/0158521 A1 | 8/2004 | Newton |
| 2004/0158523 A1 | 8/2004 | Dort |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0177030 A1 | 9/2004 | Shoham |
| 2004/0177114 A1 | 9/2004 | Friedman et al. |
| 2004/0186807 A1 | 9/2004 | Nathans et al. |

(56) References Cited

U.S. PATENT DOCUMENTS

| | | |
|---|---|---|
| 2004/0193535 A1 | 9/2004 | Barazesh |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0215556 A1 | 10/2004 | Merkley, Jr. et al. |
| 2004/0215584 A1 | 10/2004 | Yao |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0225545 A1 | 11/2004 | Turner et al. |
| 2004/0225594 A1 | 11/2004 | Nolan, III et al. |
| 2004/0225597 A1 | 11/2004 | Oppenheimer et al. |
| 2004/0225643 A1 | 11/2004 | Alpha et al. |
| 2004/0230534 A1 | 11/2004 | McGough |
| 2004/0243450 A1 | 12/2004 | Bernard, Jr. et al. |
| 2004/0243506 A1 | 12/2004 | Das |
| 2004/0243588 A1 | 12/2004 | Tanner et al. |
| 2004/0249532 A1 | 12/2004 | Kelly et al. |
| 2004/0255127 A1 | 12/2004 | Arnouse |
| 2004/0267660 A1 | 12/2004 | Greenwood et al. |
| 2004/0267714 A1 | 12/2004 | Frid et al. |
| 2005/0004855 A1 | 1/2005 | Jenson et al. |
| 2005/0004870 A1 | 1/2005 | McGaughey |
| 2005/0005168 A1 | 1/2005 | Dick |
| 2005/0010513 A1 | 1/2005 | Duckworth et al. |
| 2005/0027633 A1 | 2/2005 | Fortuna et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0055275 A1 | 3/2005 | Newman et al. |
| 2005/0058262 A1 | 3/2005 | Timmins et al. |
| 2005/0071328 A1 | 3/2005 | Lawrence |
| 2005/0080697 A1 | 4/2005 | Foss et al. |
| 2005/0080821 A1 | 4/2005 | Breil et al. |
| 2005/0086071 A1 | 4/2005 | Fox, Jr. et al. |
| 2005/0086072 A1 | 4/2005 | Fox, Jr. et al. |
| 2005/0086126 A1 | 4/2005 | Patterson |
| 2005/0086176 A1 | 4/2005 | Dahlgren |
| 2005/0091164 A1 | 4/2005 | Varble |
| 2005/0096950 A1 | 5/2005 | Caplan et al. |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0102206 A1 | 5/2005 | Savasoglu et al. |
| 2005/0102226 A1 | 5/2005 | Oppenheimer et al. |
| 2005/0105719 A1 | 5/2005 | Huda |
| 2005/0125291 A1 | 6/2005 | Demkiw Grayson et al. |
| 2005/0125350 A1 | 6/2005 | Tidwell et al. |
| 2005/0125397 A1 | 6/2005 | Gross et al. |
| 2005/0130704 A1 | 6/2005 | McParland et al. |
| 2005/0137899 A1 | 6/2005 | Davies et al. |
| 2005/0137912 A1 | 6/2005 | Rao et al. |
| 2005/0137963 A1 | 6/2005 | Ricketts et al. |
| 2005/0144452 A1 | 6/2005 | Lynch et al. |
| 2005/0154617 A1 | 7/2005 | Ruggieri et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0159996 A1 | 7/2005 | Lazaraus et al. |
| 2005/0197953 A1 | 9/2005 | Broadbent et al. |
| 2005/0203768 A1 | 9/2005 | Florance |
| 2005/0209880 A1 | 9/2005 | Drelicharz et al. |
| 2005/0209922 A1 | 9/2005 | Hofmeister |
| 2005/0228748 A1 | 10/2005 | Togher et al. |
| 2005/0251474 A1 | 11/2005 | Shinn et al. |
| 2005/0267840 A1 | 12/2005 | Holm-Blagg et al. |
| 2005/0273431 A1 | 12/2005 | Abel et al. |
| 2005/0279827 A1 | 12/2005 | Mascavage et al. |
| 2005/0288998 A1 | 12/2005 | Verma et al. |
| 2006/0014129 A1 | 1/2006 | Coleman et al. |
| 2006/0015425 A1 | 1/2006 | Brooks |
| 2006/0029107 A1 | 2/2006 | McCullough et al. |
| 2006/0031158 A1 | 2/2006 | Orman |
| 2006/0032909 A1 | 2/2006 | Seegar |
| 2006/0036543 A1 | 2/2006 | Blagg et al. |
| 2006/0059073 A1 | 3/2006 | Walzak |
| 2006/0059086 A1 | 3/2006 | Mulhern |
| 2006/0069635 A1 | 3/2006 | Ram et al. |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0085334 A1 | 4/2006 | Murphy |
| 2006/0089842 A1 | 4/2006 | Medawar |
| 2006/0095363 A1 | 5/2006 | May |
| 2006/0100944 A1 | 5/2006 | Reddin et al. |
| 2006/0100954 A1 | 5/2006 | Schoen |
| 2006/0106670 A1 | 5/2006 | Cai et al. |
| 2006/0123461 A1 | 6/2006 | Lunt et al. |
| 2006/0149674 A1 | 7/2006 | Cook et al. |
| 2006/0155573 A1 | 7/2006 | Hartunian |
| 2006/0155639 A1 | 7/2006 | Lynch et al. |
| 2006/0163347 A1 | 7/2006 | Foss et al. |
| 2006/0173772 A1 | 8/2006 | Hayes et al. |
| 2006/0177226 A1 | 8/2006 | Ellis, III |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0184440 A1 | 8/2006 | Britti et al. |
| 2006/0184585 A1 | 8/2006 | Grear et al. |
| 2006/0195351 A1 | 8/2006 | Bayburtian |
| 2006/0202012 A1 | 9/2006 | Grano et al. |
| 2006/0204051 A1 | 9/2006 | Holland, IV |
| 2006/0212386 A1 | 9/2006 | Willey et al. |
| 2006/0212407 A1 | 9/2006 | Lyon |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0229996 A1 | 10/2006 | Keithley et al. |
| 2006/0233332 A1 | 10/2006 | Toms |
| 2006/0235743 A1 | 10/2006 | Long et al. |
| 2006/0241923 A1 | 10/2006 | Xu et al. |
| 2006/0242046 A1 | 10/2006 | Haggerty et al. |
| 2006/0248106 A1 | 11/2006 | Milne et al. |
| 2006/0259364 A1 | 11/2006 | Strock et al. |
| 2006/0265323 A1 | 11/2006 | Winter et al. |
| 2006/0267999 A1 | 11/2006 | Cash et al. |
| 2006/0271457 A1 | 11/2006 | Romain et al. |
| 2006/0271633 A1 | 11/2006 | Adler |
| 2006/0277092 A1 | 12/2006 | Williams |
| 2006/0277141 A1 | 12/2006 | Palmer |
| 2006/0282359 A1 | 12/2006 | Nobili et al. |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0011083 A1 | 1/2007 | Bird et al. |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0016520 A1 | 1/2007 | Gang et al. |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0038483 A1 | 2/2007 | Wood |
| 2007/0038497 A1 | 2/2007 | Britti et al. |
| 2007/0038568 A1 | 2/2007 | Greene et al. |
| 2007/0043654 A1 | 2/2007 | Libman |
| 2007/0067207 A1 | 3/2007 | Haggerty et al. |
| 2007/0067297 A1 | 3/2007 | Kublickis |
| 2007/0078741 A1 | 4/2007 | Haggerty et al. |
| 2007/0083460 A1 | 4/2007 | Bachenheimer |
| 2007/0083463 A1 | 4/2007 | Kraft |
| 2007/0088950 A1 | 4/2007 | Wheeler et al. |
| 2007/0093234 A1 | 4/2007 | Willis et al. |
| 2007/0094137 A1 | 4/2007 | Phillips et al. |
| 2007/0094230 A1 | 4/2007 | Subramaniam et al. |
| 2007/0094241 A1 | 4/2007 | Blackwell et al. |
| 2007/0106582 A1 | 5/2007 | Baker et al. |

(56) References Cited

U.S. PATENT DOCUMENTS

| | | |
|---|---|---|
| 2007/0112668 A1 | 5/2007 | Celano et al. |
| 2007/0118410 A1 | 5/2007 | Nadai |
| 2007/0130070 A1 | 6/2007 | Williams |
| 2007/0156692 A1 | 7/2007 | Rosewarne |
| 2007/0156718 A1 | 7/2007 | Hossfeld et al. |
| 2007/0162414 A1 | 7/2007 | Horowitz et al. |
| 2007/0168267 A1 | 7/2007 | Zimmerman et al. |
| 2007/0179798 A1 | 8/2007 | Inbarajan |
| 2007/0192121 A1 | 8/2007 | Routson et al. |
| 2007/0192122 A1 | 8/2007 | Routson et al. |
| 2007/0198336 A1 | 8/2007 | Thompson |
| 2007/0198407 A1 | 8/2007 | Winter |
| 2007/0208640 A1 | 9/2007 | Banasiak et al. |
| 2007/0214000 A1 | 9/2007 | Shahrabi et al. |
| 2007/0226047 A1 | 9/2007 | Ward |
| 2007/0226093 A1 | 9/2007 | Chan et al. |
| 2007/0226114 A1 | 9/2007 | Haggerty et al. |
| 2007/0233591 A1 | 10/2007 | Newton |
| 2007/0244732 A1 | 10/2007 | Chatterji et al. |
| 2007/0250459 A1 | 10/2007 | Schwarz et al. |
| 2007/0255654 A1 | 11/2007 | Whipple et al. |
| 2007/0255655 A1 | 11/2007 | Kemper et al. |
| 2007/0258626 A1 | 11/2007 | Reiner |
| 2007/0260539 A1 | 11/2007 | Delinsky |
| 2007/0261114 A1 | 11/2007 | Pomerantsev |
| 2007/0262137 A1 | 11/2007 | Brown |
| 2007/0266439 A1 | 11/2007 | Kraft |
| 2007/0279187 A1 | 12/2007 | Hekmatpour et al. |
| 2007/0282730 A1 | 12/2007 | Carpenter et al. |
| 2007/0282736 A1 | 12/2007 | Conlin et al. |
| 2007/0284433 A1 | 12/2007 | Domenica et al. |
| 2007/0288338 A1 | 12/2007 | Hoadley |
| 2007/0288360 A1 | 12/2007 | Seeklus |
| 2007/0288490 A1 | 12/2007 | Longshaw |
| 2007/0294195 A1 | 12/2007 | Curry et al. |
| 2007/0294431 A1 | 12/2007 | Adelman et al. |
| 2007/0299699 A1 | 12/2007 | Policelli et al. |
| 2007/0299770 A1 | 12/2007 | Delinsky |
| 2007/0299771 A1 | 12/2007 | Brody |
| 2008/0010203 A1 | 1/2008 | Grant |
| 2008/0010206 A1 | 1/2008 | Coleman |
| 2008/0015979 A1 | 1/2008 | Bentley |
| 2008/0022281 A1 | 1/2008 | Dubhashi et al. |
| 2008/0027841 A1 | 1/2008 | Eder |
| 2008/0027859 A1 | 1/2008 | Nathans et al. |
| 2008/0033742 A1 | 2/2008 | Bernasconi |
| 2008/0046351 A1 | 2/2008 | Wiener et al. |
| 2008/0052182 A1 | 2/2008 | Marshall |
| 2008/0052224 A1 | 2/2008 | Parker |
| 2008/0052244 A1 | 2/2008 | Tsuei et al. |
| 2008/0059317 A1* | 3/2008 | Chandran .............. G06Q 20/20 705/16 |
| 2008/0059352 A1 | 3/2008 | Chandran |
| 2008/0059364 A1 | 3/2008 | Tidwell et al. |
| 2008/0065530 A1 | 3/2008 | Talbert et al. |
| 2008/0086400 A1 | 4/2008 | Ardelean et al. |
| 2008/0091519 A1 | 4/2008 | Foss |
| 2008/0097768 A1 | 4/2008 | Godshalk |
| 2008/0103959 A1 | 5/2008 | Carroll et al. |
| 2008/0103972 A1 | 5/2008 | Lanc |
| 2008/0109315 A1 | 5/2008 | Huang et al. |
| 2008/0109740 A1 | 5/2008 | Prinsen et al. |
| 2008/0109875 A1 | 5/2008 | Kraft |
| 2008/0115191 A1 | 5/2008 | Kim et al. |
| 2008/0120133 A1 | 5/2008 | Krishnaswami et al. |
| 2008/0133322 A1 | 6/2008 | Kalia et al. |
| 2008/0140507 A1 | 6/2008 | Hamlisch et al. |
| 2008/0162383 A1 | 7/2008 | Kraft |
| 2008/0172324 A1 | 7/2008 | Johnson |
| 2008/0177655 A1 | 7/2008 | Zalik |
| 2008/0184270 A1 | 7/2008 | Cole et al. |
| 2008/0189202 A1 | 8/2008 | Zadoorian et al. |
| 2008/0195548 A1 | 8/2008 | Chu et al. |
| 2008/0201257 A1 | 8/2008 | Lewis et al. |
| 2008/0205655 A1 | 8/2008 | Wilkins et al. |
| 2008/0205774 A1 | 8/2008 | Brinker et al. |
| 2008/0208610 A1 | 8/2008 | Thomas et al. |
| 2008/0208726 A1 | 8/2008 | Tsantes et al. |
| 2008/0208873 A1 | 8/2008 | Boehmer |
| 2008/0221972 A1 | 9/2008 | Megdal et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0255922 A1 | 10/2008 | Feldman et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294501 A1 | 11/2008 | Rennich et al. |
| 2008/0294540 A1 | 11/2008 | Celka et al. |
| 2008/0294996 A1 | 11/2008 | Hunt et al. |
| 2008/0301016 A1 | 12/2008 | Durvasula et al. |
| 2008/0306750 A1 | 12/2008 | Wunder et al. |
| 2008/0312969 A1 | 12/2008 | Raines et al. |
| 2008/0319832 A1 | 12/2008 | Liebe |
| 2008/0319889 A1 | 12/2008 | Hammad |
| 2009/0007231 A1 | 1/2009 | Kaiser et al. |
| 2009/0012889 A1 | 1/2009 | Finch |
| 2009/0018996 A1 | 1/2009 | Hunt et al. |
| 2009/0024428 A1 | 1/2009 | Hudock, Jr. |
| 2009/0030776 A1 | 1/2009 | Walker et al. |
| 2009/0031426 A1 | 1/2009 | Dal Lago et al. |
| 2009/0043691 A1 | 2/2009 | Kasower |
| 2009/0044279 A1 | 2/2009 | Crawford et al. |
| 2009/0055322 A1 | 2/2009 | Bykov et al. |
| 2009/0055894 A1 | 2/2009 | Lorsch |
| 2009/0060343 A1 | 3/2009 | Rosca |
| 2009/0089190 A1* | 4/2009 | Girulat, Jr. .............. G06Q 40/02 705/30 |
| 2009/0094674 A1 | 4/2009 | Schwartz et al. |
| 2009/0099960 A1 | 4/2009 | Robida et al. |
| 2009/0106846 A1 | 4/2009 | Dupray et al. |
| 2009/0112650 A1 | 4/2009 | Iwane |
| 2009/0119199 A1 | 5/2009 | Salahi |
| 2009/0119299 A1 | 5/2009 | Rhodes |
| 2009/0132347 A1 | 5/2009 | Anderson et al. |
| 2009/0138335 A1 | 5/2009 | Lieberman |
| 2009/0144160 A1 | 6/2009 | Haggerty et al. |
| 2009/0150166 A1 | 6/2009 | Leite et al. |
| 2009/0150238 A1 | 6/2009 | Marsh et al. |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0171723 A1 | 7/2009 | Jenkins |
| 2009/0172815 A1 | 7/2009 | Gu et al. |
| 2009/0210886 A1 | 8/2009 | Bhojwani et al. |
| 2009/0222308 A1 | 9/2009 | Zoldi et al. |
| 2009/0222375 A1 | 9/2009 | Choudhuri et al. |
| 2009/0222377 A1 | 9/2009 | Choudhuri et al. |
| 2009/0222379 A1 | 9/2009 | Choudhuri et al. |
| 2009/0234775 A1 | 9/2009 | Whitney et al. |
| 2009/0240624 A1 | 9/2009 | James et al. |
| 2009/0248573 A1 | 10/2009 | Haggerty et al. |
| 2009/0254971 A1 | 10/2009 | Herz et al. |
| 2009/0271248 A1 | 10/2009 | Sherman et al. |
| 2009/0271265 A1 | 10/2009 | Lay et al. |
| 2009/0276244 A1 | 11/2009 | Baldwin, Jr. et al. |
| 2009/0289110 A1 | 11/2009 | Regen et al. |
| 2009/0299911 A1 | 12/2009 | Abrahams et al. |
| 2009/0327120 A1 | 12/2009 | Eze et al. |
| 2009/0328173 A1 | 12/2009 | Jakobson et al. |
| 2010/0009320 A1 | 1/2010 | Wilkelis |
| 2010/0009663 A1 | 1/2010 | Chang |
| 2010/0010935 A1 | 1/2010 | Shelton |
| 2010/0011428 A1 | 1/2010 | Atwood et al. |
| 2010/0023434 A1 | 1/2010 | Bond |
| 2010/0023448 A1 | 1/2010 | Eze |
| 2010/0030677 A1 | 2/2010 | Melik-Aslanian et al. |
| 2010/0042517 A1 | 2/2010 | Paintin et al. |
| 2010/0042583 A1 | 2/2010 | Gervais |
| 2010/0049803 A1 | 2/2010 | Ogilvie et al. |
| 2010/0082476 A1 | 4/2010 | Bowman |
| 2010/0107225 A1 | 4/2010 | Spencer et al. |

(56) References Cited

U.S. PATENT DOCUMENTS

| | | |
|---|---|---|
| 2010/0114724 A1 | 5/2010 | Ghosh et al. |
| 2010/0114744 A1 | 5/2010 | Gonen |
| 2010/0122316 A1 | 5/2010 | Lyon |
| 2010/0131390 A1* | 5/2010 | Emswiler ............ G06Q 30/0601 705/26.1 |
| 2010/0142698 A1 | 6/2010 | Spottiswoode et al. |
| 2010/0145836 A1 | 6/2010 | Baker et al. |
| 2010/0174638 A1 | 7/2010 | Debie et al. |
| 2010/0185546 A1 | 7/2010 | Pollard |
| 2010/0188684 A1 | 7/2010 | Kumara |
| 2010/0205087 A1 | 8/2010 | Hubler et al. |
| 2010/0217837 A1 | 8/2010 | Ansari et al. |
| 2010/0223168 A1 | 9/2010 | Haggerty et al. |
| 2010/0223211 A1 | 9/2010 | Johnson et al. |
| 2010/0228658 A1 | 9/2010 | Ketelsen et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0268660 A1 | 10/2010 | Ekdahl |
| 2010/0293090 A1 | 11/2010 | Domenikos et al. |
| 2010/0299251 A1 | 11/2010 | Thomas |
| 2010/0299252 A1 | 11/2010 | Thomas |
| 2010/0299260 A1 | 11/2010 | Thomas |
| 2010/0299262 A1 | 11/2010 | Handler |
| 2010/0324986 A1 | 12/2010 | Thomas |
| 2010/0325036 A1 | 12/2010 | Thomas |
| 2011/0004514 A1 | 1/2011 | Thomas |
| 2011/0004546 A1 | 1/2011 | Thomas |
| 2011/0029427 A1 | 2/2011 | Haggerty et al. |
| 2011/0035315 A1 | 2/2011 | Langley |
| 2011/0040736 A1 | 2/2011 | Kalaboukis |
| 2011/0054981 A1 | 3/2011 | Faith et al. |
| 2011/0060654 A1 | 3/2011 | Elliott et al. |
| 2011/0060673 A1 | 3/2011 | Delinsky et al. |
| 2011/0125632 A1* | 5/2011 | Neel ....................... G06Q 40/02 705/38 |
| 2011/0126275 A1 | 5/2011 | Anderson et al. |
| 2011/0131123 A1 | 6/2011 | Griffin et al. |
| 2011/0137924 A1 | 6/2011 | Hunt et al. |
| 2011/0161218 A1 | 6/2011 | Swift |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0184838 A1 | 7/2011 | Winters et al. |
| 2011/0196791 A1 | 8/2011 | Dominguez |
| 2011/0270779 A1 | 11/2011 | Showalter |
| 2011/0270925 A1 | 11/2011 | Mina |
| 2011/0282779 A1 | 11/2011 | Megdal et al. |
| 2011/0295733 A1 | 12/2011 | Megdal et al. |
| 2012/0005070 A1 | 1/2012 | McFall et al. |
| 2012/0023011 A1 | 1/2012 | Hurwitz |
| 2012/0030771 A1 | 2/2012 | Pierson et al. |
| 2012/0066065 A1 | 3/2012 | Switzer |
| 2012/0066084 A1 | 3/2012 | Sneyders |
| 2012/0066106 A1 | 3/2012 | Papadimitriou |
| 2012/0072464 A1 | 3/2012 | Cohen |
| 2012/0078932 A1 | 3/2012 | Skurtovich, Jr. et al. |
| 2012/0101938 A1 | 4/2012 | Kasower |
| 2012/0101939 A1 | 4/2012 | Kasower |
| 2012/0108274 A1 | 5/2012 | Acebo Ruiz et al. |
| 2012/0116951 A1 | 5/2012 | Chung et al. |
| 2012/0123931 A1 | 5/2012 | Megdal et al. |
| 2012/0123942 A1 | 5/2012 | Song et al. |
| 2012/0136763 A1 | 5/2012 | Megdal et al. |
| 2012/0136774 A1 | 5/2012 | Imrey et al. |
| 2012/0158574 A1 | 6/2012 | Brunzell et al. |
| 2012/0158654 A1 | 6/2012 | Behren et al. |
| 2012/0173406 A1 | 7/2012 | Fei et al. |
| 2012/0173417 A1 | 7/2012 | Lohman et al. |
| 2012/0198556 A1 | 8/2012 | Patel et al. |
| 2012/0215682 A1 | 8/2012 | Lent et al. |
| 2012/0226916 A1 | 9/2012 | Hahn et al. |
| 2012/0232958 A1 | 9/2012 | Silbert |
| 2012/0239553 A1 | 9/2012 | Gonen et al. |
| 2012/0239583 A1 | 9/2012 | Dobrowolski |
| 2012/0246048 A1 | 9/2012 | Cohen et al. |
| 2012/0246060 A1 | 9/2012 | Conyack, Jr. et al. |
| 2012/0253852 A1 | 10/2012 | Pourfallah et al. |
| 2012/0254018 A1 | 10/2012 | Davies et al. |
| 2012/0265607 A1 | 10/2012 | Belwadi |
| 2012/0265661 A1 | 10/2012 | Megdal et al. |
| 2012/0278767 A1 | 11/2012 | Stibel et al. |
| 2012/0284118 A1 | 11/2012 | Mamich, Jr. et al. |
| 2012/0290660 A1 | 11/2012 | Rao et al. |
| 2012/0317016 A1 | 12/2012 | Hughes |
| 2012/0324388 A1 | 12/2012 | Rao et al. |
| 2012/0330689 A1 | 12/2012 | McLaughlin et al. |
| 2013/0006825 A1 | 1/2013 | Robida et al. |
| 2013/0018811 A1 | 1/2013 | Britti et al. |
| 2013/0031624 A1 | 1/2013 | Britti et al. |
| 2013/0060603 A1 | 3/2013 | Wagner |
| 2013/0066775 A1 | 3/2013 | Milam |
| 2013/0103571 A1 | 4/2013 | Chung et al. |
| 2013/0110565 A1 | 5/2013 | Means et al. |
| 2013/0117087 A1 | 5/2013 | Coppinger |
| 2013/0124263 A1 | 5/2013 | Amaro et al. |
| 2013/0173449 A1 | 7/2013 | Ng et al. |
| 2013/0173451 A1 | 7/2013 | Kornegay et al. |
| 2013/0173481 A1 | 7/2013 | Hirtenstein et al. |
| 2013/0185293 A1 | 7/2013 | Boback |
| 2013/0191261 A1 | 7/2013 | Chandler et al. |
| 2013/0205135 A1 | 8/2013 | Lutz |
| 2013/0211986 A1 | 8/2013 | Debie et al. |
| 2013/0268357 A1 | 10/2013 | Heath |
| 2013/0317954 A1 | 11/2013 | Psota et al. |
| 2013/0332338 A1 | 12/2013 | Yan et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2014/0012734 A1 | 1/2014 | Megdal et al. |
| 2014/0019333 A1 | 1/2014 | Morris et al. |
| 2014/0032300 A1 | 1/2014 | Zhang et al. |
| 2014/0032723 A1 | 1/2014 | Nema |
| 2014/0061302 A1 | 3/2014 | Hammad |
| 2014/0081835 A1 | 3/2014 | Choudhuri et al. |
| 2014/0089167 A1 | 3/2014 | Kasower |
| 2014/0110477 A1 | 4/2014 | Hammad |
| 2014/0136422 A1 | 5/2014 | Jung et al. |
| 2014/0156500 A1 | 6/2014 | Lassen et al. |
| 2014/0156501 A1* | 6/2014 | Howe .................. G06Q 40/025 705/38 |
| 2014/0156503 A1 | 6/2014 | Lassen et al. |
| 2014/0157375 A1 | 6/2014 | Britti et al. |
| 2014/0258083 A1 | 9/2014 | Achanta et al. |
| 2014/0258089 A1 | 9/2014 | Pearson et al. |
| 2014/0279329 A1 | 9/2014 | Dancel |
| 2014/0279382 A1 | 9/2014 | Drakeley et al. |
| 2014/0372367 A1 | 12/2014 | McLean et al. |
| 2015/0026014 A1 | 1/2015 | Kasower |
| 2015/0073929 A1 | 3/2015 | Psota et al. |
| 2015/0112874 A1 | 4/2015 | Serio et al. |
| 2015/0200948 A1 | 7/2015 | Cairns et al. |
| 2015/0228016 A1 | 8/2015 | Chandler |
| 2015/0269506 A1 | 9/2015 | Britti et al. |
| 2015/0278944 A1 | 10/2015 | Searson et al. |
| 2015/0295906 A1 | 10/2015 | Ufford et al. |
| 2015/0310543 A1 | 10/2015 | DeBie |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2016/0125412 A1 | 5/2016 | Cannon |
| 2016/0224996 A1 | 8/2016 | Hunt et al. |
| 2017/0161486 A1 | 6/2017 | Jeon et al. |
| 2017/0200223 A1 | 7/2017 | Kasower |
| 2017/0228820 A1 | 8/2017 | Rohn |
| 2017/0262758 A1 | 9/2017 | Boyapalle et al. |
| 2017/0278182 A1 | 9/2017 | Kasower |
| 2017/0323063 A1 | 11/2017 | Krause et al. |
| 2017/0323358 A1 | 11/2017 | Psota et al. |
| 2018/0040063 A1 | 2/2018 | Buechler et al. |
| 2018/0082371 A1 | 3/2018 | Chandler |

(56) References Cited

U.S. PATENT DOCUMENTS

| | | | |
|---|---|---|---|
| 2018/0218069 | A1 | 8/2018 | Rege et al. |
| 2018/0285886 | A1 | 10/2018 | Yan et al. |
| 2019/0102832 | A1 | 4/2019 | Robida et al. |
| 2019/0156227 | A1 | 5/2019 | Duke et al. |
| 2020/0074099 | A1 | 3/2020 | Felice-Steele et al. |
| 2020/0074100 | A1 | 3/2020 | Raneri et al. |
| 2020/0074541 | A1 | 3/2020 | Finneran et al. |
| 2020/0074542 | A1 | 3/2020 | Manna et al. |
| 2020/0076813 | A1 | 3/2020 | Felice-Steele et al. |

FOREIGN PATENT DOCUMENTS

| | | |
|---|---|---|
| EP | 0 350 907 | 1/1990 |
| EP | 0 468 440 | 1/1992 |
| EP | 0 554 083 | 8/1993 |
| EP | 0 566 736 | 8/1993 |
| EP | 0 869 652 | 10/1998 |
| EP | 0 913 789 | 5/1999 |
| EP | 0 919 942 | 6/1999 |
| EP | 1 028 401 | 8/2000 |
| EP | 1 988 501 | 11/2008 |
| GB | 1 322 809 | 7/1973 |
| JP | 2001-282957 | 10/2001 |
| JP | 2002-163449 | 6/2002 |
| JP | 2003-016261 | 1/2003 |
| JP | 2003-316950 | 11/2003 |
| KR | 10-2004-0078798 | 9/2004 |
| KR | 10-0638324 | 10/2006 |
| KR | 10-2013-0107394 | 10/2013 |
| RU | 2 181 216 | 4/2002 |
| TW | 256569 | 6/2006 |
| WO | WO 94/012943 | 6/1994 |
| WO | WO 95/012857 | 5/1995 |
| WO | WO 99/046710 | 9/1999 |
| WO | WO 00/011574 | 3/2000 |
| WO | WO 00/055778 | 9/2000 |
| WO | WO 00/065469 | 11/2000 |
| WO | WO 01/004821 | 1/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/041355 | 6/2001 |
| WO | WO 01/057720 | 8/2001 |
| WO | WO 01/080053 | 10/2001 |
| WO | WO 01/084281 | 11/2001 |
| WO | WO 02/013047 | 2/2002 |
| WO | WO 2004/114160 | 12/2004 |
| WO | WO 2005/022348 | 3/2005 |
| WO | WO 2005/124619 | 12/2005 |
| WO | WO 2006/099081 | 9/2006 |
| WO | WO 2006/099492 | 9/2006 |
| WO | WO 2006/135451 | 12/2006 |
| WO | WO 2007/004158 | 1/2007 |
| WO | WO 2007/106393 | 9/2007 |
| WO | WO 2007/106786 | 9/2007 |
| WO | WO 2007/106787 | 9/2007 |
| WO | WO 2008/021061 | 2/2008 |
| WO | WO 2008/147918 | 12/2008 |
| WO | WO 2009/061342 | 5/2009 |
| WO | WO 2009/064840 | 5/2009 |
| WO | WO 2009/099448 | 8/2009 |
| WO | WO 2009/117468 | 9/2009 |
| WO | WO 2010/129257 | 11/2010 |
| WO | WO 2013/009920 | 1/2013 |
| WO | WO 2014/088895 | 6/2014 |
| WO | WO 2014/137759 | 9/2014 |
| WO | WO 2018/144612 | 8/2018 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, pp. 8, 2006.
Abrahams, Steven W., "The New View in Mortgage Prepayments: Insight from Analysis at the Loan-By-Loan Level," The Journal of Fixed Income, Jun. 1997, vol. 7, No. 1, pp. 8-21.
"ACS Company Birch & Davis Wins Texas CHIP Contract," PR Newswire, Section: Financial News, May 17, 2000, Dallas, TX, pp. 3.
Aharony et al., "Social Area Networks: Data Networking of the People, by the People, for the People," 2009 International Conference on Computational Science and Engineering, May 2009, pp. 1148-1155.
"An Even Better Solution to Financing Elective Surgery . . . ", Unicorn Financial, pp. 7, http://web.archive.org/web/20000816161359/http://www.unicornfinancial.com/, as downloaded Oct. 15, 2008.
"Authorizing Safety Net Public Health Programs," Hearing before the Subcommittee on Health of the Committee on Energy and Commerce, House of Representatives, One Hundred Seventh Congress, First Session, Serial No. 107-57, dated Aug. 1, 2001, 226 pgs.
AISG's National Underwriting Database, A-PLUS, is Now the Largest in the Industry, Business Wire, Aug. 7, 1997.
An Expert System for Determining Medicaid Eligibility, Journal of Medical Systems, vol. 12, Nov. 5, 1988, in 10 pages.
Announcing TrueProfiler, http://web.archive.org/web/20021201123646/http://www.truecredit.com/index.asp, dated Dec. 1, 2002, 2 pages.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
"AT&T Expected to Turn Up Heat in Card Wars", American Banker, May 27, 1993, vol. 158, No. 101, pp. 3.
Avery et al., "Consumer Credit Scoring: Do Situational Circumstances Matter?", Journal of Banking & Finance, vol. 28, 2004, pp. 835-856.
Awoonor-Williams, Princess Josephine, Ph.D. "Gender and Credit: An Analysis of Women's Experience in the Credit Market", ProQuest Dissertations and Theses, 2004, pp. 148.
"Balance Transfers Offer Opportunities", Risk Credit Risk Management Report, Jan. 29, 1996, vol. 6, No. 2, pp. 2.
Bancroft, John, "Tools Help Managers with Risk Management," Real Estate Finance Today, May 26, 1997, pp. 11-12.
"Bank of America Direct Web-Based Network Adds Core Functionality To Meet Day-To-Day Treasury Needs", Business Wire, Oct. 25, 1999. pp. 2.
Barone, Robert P., "The Integrated Approach to Branch Service Delivery," American Banker, Aug. 6, 1991, http://www.highbeam.com/doc/1G1-11128400.html.
Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].
Belford, Terrence, "Technology Quarterly: Computers, Internet Speeds Credit Checks System Tailored for Doctors, Dentists," The Globe and Mail (Canada), Section: Report on Business Special Reports, p. C10, Mar. 18, 1997.
"Beverly Hills Man Convicted of Operating 'Bust-Out' Schemes that Caused More than $8 Million in Losses", Department of Justice, Jul. 25, 2006, 2 Pgs.
Bienkowski, Nik, "A New Tool for Portfolio Risk Management—Gold Bullion", Apr. 2003, pp. 6.
Bilotta, Caryn, "Understanding Credit Scores," Pittsburgh Post—Gazette, May 9, 2010.
"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].
Boss, Shira J. "Elective Surgery Without the Plastic: Low-Interest Medical Financing Provides Alternative to Credit Cards," factiva, Crain's New York Business, 2 pgs., dated Jun. 22, 1998.
Broward County CAP Grant Application, as printed on Aug. 10, 2009, 41 pgs.

(56) References Cited

OTHER PUBLICATIONS

Brown et al., "ALCOD IDSS: Assisting the Australian Stock Market Surveillance Team's Review Process," Applied Artificial Intelligence Journal, Dec. 1, 1996, pp. 625-641.
Burr Ph.D., et al., "Utility Payments as Alternative Credit Data: A Reality Check", Asset Builders of America, Inc., Oct. 5, 2006, pp. 1-18, Washington, D.C.
"Bust-Out Schemes", Visual Analytics Inc. Technical Product Support, Newsletter vol. 4, Issue 1, Jan. 2005, pp. 7.
Calnan, Christopher, "Tenet, Fair Isaac invest $20M in startup," MHT, Mass High Tech: The Journal of New England Technology, dated Jul. 23, 2007, 2 pgs.
Cantor, R. and Packer, F., "The Credit Rating Industry," FRBNY Quarterly Review, Summer—Fall, 1994, pp. 1-24.
Capps et al., "Recent Changes in Texas Welfare and Work, Child Care and Child Welfare Systems," Assessing the New Federalism, The Urban Institute, State Update No. 1, 24 pgs., Jun. 2001.
CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].
Card Marketing, Use the Latest CRM Tools and Techniques, www.CardForum.com, vol. 5 No. 10, Dec. 2001.
"Chase Gets Positive," Bank Technology News, May 6, 2000, vol. 14, No. 5, p. 33.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Cheney, Karen, "Fix Your Nose, If You Wish, But Not With This New Loan," Money Magazine, vol. 27, No. 5, 1 pg., dated May 1, 1998.
Chores & Allowances, "Do Kids Have Credit Reports?" Oct. 15, 2007, http://choresandallowances.blogspot.com/2007/10/do-kids-have-credit-reports.html, pp. 5.
CISCO: What-If Simulator, http://www.ciscocredit.com/whatifsim.html printed Oct. 12, 2012 in 2 pages.
CISCO: Your Mortgage Credit Reporting Specialists, http://www.ciscocredit.com/cc_Services.html printed Oct. 12, 2012 in 4 pages.
"Cole Taylor Bank Chooses Integrated E-Banking/E-Payments/Reconciliation Solution From Fundtech", Business Wire, Oct. 21, 1999, pp. 2.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.
CreditAnalyst, Digital Matrix Systems, as printed out Mar. 4, 2008, pp. 2.
CreditSesame; "FAQ's"; http://www.creditsesame.com/how-we-help/faqs/#cb printed Dec. 5, 2011 in 8 pages.
CreditSesame; "Promote Your Financial Responsibility to Get an Edge in Life"; http://www.creditsesame.com/credit-badge/ printed Dec. 2, 2011 in 1 page.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
"Credit Information Bureaus and 'CIBIL'", http://www.icicibank.com/cibil.html printed Aug. 22, 2012 in 3 pages.
CreditKarma: How Credit Karma Works, http://www.creditkarma.com/help/howitworks printed Oct. 12, 2012 in 2 pages.
Credit Source Online: The Secrets of Raising Your Credit Score, http://www.creditsourceonline.com/secrets-of-raising-your-credit-score.html printed Oct. 12, 2012 in 4 pages.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
"Consumers Gain Immediate and Full Access to Credit Score Used by Majority of U.S. Lenders", PR Newswire, ProQuest Copy, Mar. 19, 2001, p. 1.
Credit Card Management, "Neural Nets Shoot for Jackpot," Dec. 1995, pp. 1-6.
"CreditCheck Monitoring Services," Dec. 11, 2000, pp. 1, lines 21-23.
Credit Risk Management Report, Potomac, Mar. 9, 1998, vol. 8, No. 4.
CreditXpert Inc., CreditXpert 3-Bureau Comparison™, 2002, pp. 5, http://web.archive.org/web/20030608171018/http://creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View—Experian on Jul. 7, 2003, http://www.creditxpert.com/cx_ess_app.pdf.
CreditXpert Inc., CreditXpert Essentials™, Advisor View—TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View—TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXpert%20What-If%20Simulator(TM)%20sample.pdf.
"D&B Corporate Family Linkage", D&B Internet Access for U.S. Contract Customers, https://www.dnb.com/ecomp/help/linkage.htm as printed Dec. 17, 2009, pp. 1.
Dash, Julekha, "Java on the Street," Software Magazine, Oct. 1, 1997, vol. 17, No. 11, p. 2.
Dataman Group, "Summarized Credit Statistics," Aug. 22, 2001, http://web.archive.org/web/20010822113446/http://www.datamangroup.com/summarized_credit.asp.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
David, Alexander, "Controlling Information Premia by Repackaging Asset-Backed Securities," The Journal of Risk and Insurance, Dec. 1997, 26 pages.
Davis, Lisa, "Safety in Numbers," Business North Carolina, Sep. 1, 1995, vol. 15, No. 9, p. 24.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
DentalFinancing.com, "Financial services for patients and dental professionals,", 7 pgs., as downloaded from http://web.archive.org/web/20010607151954/www.dentalfinancing.com/dentist/index.asp (1 of 2) [Oct. 15, 2008 3:55:16 PM].
Department of Real Estate, http://web.archive.org/web/20040619190012/http://www.dre.ca.gov/pubs_sub.htm, Jun. 19, 2004, in 5 pages.
Department of Real Estate, "Reference Book," http://web.archive.org/web/20041011063158/http://www.dre.ca.gov/pdf_docs/ref17.pdf, Jun. 18, 2004, Chapter 17, pp. 311-382.
DiBartolomeo, Dan, "Portfolio Optimization: The Robust Solution," Prudential Securities Quantitative Conference, Dec. 21, 1993, pp. 8.
Dietz, Ellen, "Dental Office Management," 8 pgs., pp. 316-321, Copyright 2000.
Dillon et al., "Good Science", Marketing Research: A Magazine of Management & Applications TM, Winter 1997, vol. 9, No. 4; pp. 11.
Downes et al., Dictionary of Finance and Investment Terms, Fifth Edition, 1998, pp. 332-333.
Downing, Jr.; Richard, "Changes to the Credit Reporting Act," Mortgage Banking, Apr. 1, 1998, vol. 58, No. 7, pp. 82-85.

(56) References Cited

OTHER PUBLICATIONS

Dymi, Amilda, Need for Leads Spurs Some Upgrades, Origination News—Special Report, May 1, 2008, vol. vol. 17, Issue No. 8, Pages p. 24, Atlanta, Copyright 2008 SourceMedia, Inc.

Ecredable: Discover your AMP Credit Rating™, http://www.ecredable.com/how-it-works/amp-credit-rating printed Oct. 12, 2012 in 2 pages.

EFunds Introduces QualiFileSM, Deluxe Corporation, eFunds Press Release and Product Launch, Sep. 23, 1999, Milwaukee, WI.

Electronic Privacy Information Center, "The Fair Credit Reporting Act" 15 USC 1681 (1992), 10 pgs., as downloaded from http://epic.org/privacy/financial/fcra.html on Mar. 19, 2008.

Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.

Equifax: Consumer Bureau, http://www.equifax.co.in/financial-services/consumer_bureau/en_in#RiskScore printed Oct. 12, 2012 in 3 pages.

Equifax Consumer Credit Report http://www.equifax.com/home/, as retrieved on Sep. 17, 2008.

Ettorre, "Paul Kahn on Exceptional Marketing," Management Review, vol. 83, No. 11, Nov. 1994, pp. 48-51.

"Equifax and FICO Serve Consumers", Mortgage Servicing News, Mar. 2001, vol. 5, No. 3, p. 19.

Expensr.com http://www.expensr.com/, as retrieved on Sep. 17, 2008.

Experian, http://www.experian.com/ printed Oct. 12, 2012 in 1 page.

Experian Announces PLUS Score; Experian Press Release dated Oct. 16, 2003; Experian Global Press Office.

Experian Consumer Credit Report http://www.experian.com/, as retrieved on Sep. 17, 2008.

"Experian Launches Portfolio Monitor—Owner NoticesSM", News Release, Feb. 2003, Costa Mesa, CA.

Experian—Scorex Announces New Credit Simulation Tool, PR Newswire, Costa Mesa, CA, Jun. 13, 2005.

Experian, Custom Strategist and Qualifile from Funds, 2000, in 2 pages.

Experian, "Enabling e-business", White Paper, Jan. 2001, pp. 21.

Experian Information Solutions, Inc., Credit Trends: Access Credit Trending Information Instantly, http://kewaneecreditbureau.com/Credit.Trends.pdf, Aug. 2000, pp. 4.

Experian, "Instant Prescreen: Offer preapproved credit at the point of sale", Oct. 2000, pp. 2.

Experian, "Experian Rental Payment Data," http://www.experian.com/rentbureau/rental-data.html printed Nov. 22, 2013 in 2 pages.

Fair Isaac Announces Integrated, End-to-End Collection and Recovery Solution, Business Wire, New York, Sep. 2, 2004, p. 1.

Fair Isaac Corporation, myFICO: Calculators: Credit Assessment, as printed Jun. 8, 2005 in 2 pages, http://www.myfico.com/CreditEducation/Calculators/CreditAssessment.aspx.

Fair Isaac Corporation, myFICO: Help: FICO Score Simulator, as printed Jun. 8, 2005 in 2 pages, http://www.myfico.com/Help/Simulator.aspx?fire=5.

Fair Isaac Corporation, myFICO: Products: Suze Orman's FICO Kit Platinum, as printed Jun. 8, 2005 in 4 pages, http://www.myfico.com/Products/FICOKit/Description.aspx.

Fair Isaac Corporation, myFICO: Products: Suze Orman's FICO® Kit Platinum: FICO Score Check, as printed Jun. 7, 2005 in 1 page, http://www.myfico.com/Products/FICOKit/Sample03.html.

Fair Isaac Corporation, myFICO: Products: Suze Orman's FICO®. Kit Platinum: Look for Errors, as printed Jun. 7, 2005 in 3 pages http://www.myfico.com/Products/FICOKit/Sample02.html.

Fair Isaac Corporation, myFICO: Products:Suze Orman's FICO® Kit Platinum: Your FICO Score, as printed Jun. 7, 2005 in 1 page, http://www.mvfico.com/Products/FICOKit/Sample01.html.

Fair Isaac Corporation, myFICO: Sample: FICO Score Simulator, as printed Jun. 8, 2005 in 5 pages, http://www.rnyfico.com/Content/Samples/Sample_ScoreSimulator.asp.

Fair Isaac Corporation, myFICO: Sample: FICO Score Simulator: Max Out All Your Credit Cards, as printed Jun. 8, 2005 in 2 pages, http://www.myfico.com/Content/Samples/Sample_ScoreSimulator-Results.asp?Simulation=4&ReportID=1&productID=&Execute.x=105&Execute.y=23.

Fair Isaac Corporation, myFICO: Sample: FICO Score Simulator: Miss Payments on All Accounts With a Payment Due, as printed Jun. 8, 2005 in 2 pages, http://www.myfico.com/Content/Samples/Sample_ScoreSimulatorResults.asp?miss_payment=radiobutton&Simulation=2&ReportID=1&ProductID=&Execute.x81&Execute.y=28.

Fair Isaac Corporation, myFICO: Sample: FICO Score Simulator: Pay Down Delinquent Balances First, as printed Jun. 8, 2005 in 2 pages, http://www.myfico.com/Content/Samples/Sample_ScoreSimulatorResults.asp?textfieldCC=750&Simulation=7&ReportID=1&ProductID=&PayDelinquent.x=78&PayDelinquent.y=30.

Fair Isaac Corporation, myFICO: Sample: FICO Score Simulator: Pay Down the Balances on All Your Credit Cards, as printed Jun. 8, 2005 in 2 pages, http://www.myfico.com/Content/Samples/Sample_ScoreSimulatorResults.asp?textfieldCC1=750&SelectMonths=1&PayOption=radiobutton&textfieldCC=750&Simulation=3&ReportID=1&ProductID=&Execute.x=57&Execute.y=22.

Fair Isaac Corporation, myFICO: Sample: FICO Score Simulator: Pay Your Bills on Time, as printed Jun. 8, 2005 in 2 pages, http://www.myfico.com/Content/Samples/Sample_ScoreSimulator-Results.asp?select1=1&Simulation=1&ReportID=1&ProductID=&PayBillsOnTime.x=93&PayBillsOnTime.y=23.

Fair Isaac Corporation, myFICO: Sample: FICO Score Simulator: Seek New Credit, as printed Jun. 8, 2005 in 2 pages, http://www.myfico.com/Content/Samples/Sample_ScoreSimulatorResults.asp?new_credit=radiobutton&textfield5A=3000&tectfield5B=&textfield5C=&Simulation=5&ReportID=1&ProductID=&NewCredit.x=62&NewCredit.y=20.

Fair Isaac Corporation, myFICO: Sample: FICO Score Simulator: Suggested Best Action, as printed Jun. 8, 2005 in 2 pages, http://www.myfico.com/Content/Samples/Sample_ScoreSimulatorResults.asp?Simulation=111&ReportID=1&ProductID=&TopAction.x=66&TopAction.y=16.

Fair Isaac Corporation, myFICO: Sample: FICO Score Simulator: Transfer Credit Card Balances, as printed Jun. 8, 2005 in 2 pages, http://www.myfico.com/Content/Samples/Sample_ScoreSimulator-Results.asp?textfield222=5000&Simulation=6&ReportID=1&ProductID=&TransferBalance.x=86&TransferBalance.y=24.

FamilySecure.com; "Identity Theft Protection for the Whole Family | FamilySecure.com" http://www.familysecure.com/, as retrieved on Nov. 5, 2009.

Felsenthal, Edward, "Health Costs; Managed Care Helps Curb Costs, Study Says," The Wall Street Journal, dated Aug. 12, 1991.

Fickenscher, Lisa, "Merchant American Express Seeks to Mine its Data on Cardholder Spending Patterns," American Banker, vol. 162, Issue 56, Mar. 24, 1997, pp. 1-2.

"Fictitious Business Name Records", Westlaw Database Directory, http://directory.westlaw.com/scope/default.asp?db=FBN-ALL&RS-W...&VR=2.0 as printed Dec. 17, 2009, pp. 5.

"Fighting the New Face of Fraud", FinanceTech, http://www.financetech.com/showArticle.jhtml?articleID=167100405, Aug. 2, 2005.

"Financing Medical Procedures a Lucrative But Risky Business," Credit Risk Management Report, vol. 10, Issue 15, 2 pgs., dated Aug. 7, 2000.

Financial Engines, http://corp.financialengines.com/ printed Oct. 12, 2012 in 1 page.

Fisher, Joseph, "Access to Fair Credit Reports: Current Practices and Proposed Legislation," American Business Law Journal, Fall 1981, vol. 19, No. 3, p. 319.

Forrest, David, "Achieving Perfect Credit—Lesson 3: Assessing Your Situation," http://www.fool.com/seminars/ev/index.htm?sid=0029&lid=300, 2002, copyright 1995-2002, in 7 pages.

Frank, John, "Scoring Takes on a New Meaning," Credit Card Management, Sep. 1996, vol. 9, No. 6, pp. 155-159.

"FTC Testifies: Identity Theft on the Rise", FTC News Release, Mar. 7, 2000, pp. 3.

(56) References Cited

OTHER PUBLICATIONS

"Fund Manager," Portfolio Management Software website, indexed into Google on Jan. 7, 2005, Retrieved Oct. 24, 2014 http://www.fundmanagersoftware.com/,http://www.fundmanagersoftware.com/help/gph_tp_pieasset.html,http://www.fundmanagersoftware.com/demo2.html.
GAO-03-661, Best Practices: Improved Knowledge of DOD Service Contracts Could Reveal Significant Savings, GAO, Jun. 2003.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gilje, Shelby, "Credit Agency Moving Into Health Care," NewsRoom, The Seattle Times, Section: SCENE, Mar. 22, 1995, pp. 3, http://web2.westlaw.com/result/documenttext.aspx?rs=WLW8.03&ss+CNT&rp=%2fWelc....
Gilje, Shelby, "Keeping Tabs On Businesses That Keep Tabs On Us", NewsRoom, The Seattle Times, Section: SCENE, Apr. 19, 1995, pp. 4.
Giudici, Paolo, "Bayesian Data Mining, with Application to Benchmarking and Credit Scoring," Applied Stochastic Models in Business and Industry, 2001, vol. 17, pp. 69-81.
"GLBA Compliance and FFIEC Compliance" http://www.trustwave.com/financial-services.php printed Apr. 8, 2013 in 1 page.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr, 2008, pp. 3.
"Green Tree Investors May Go To Court," Mar. 4, 1998, http://web.archive.org/web/20001101080021/http://www.channel4000.com/news/stories/news-980304-120038.html.
"Groups Demand Government Action on Online Marketing to Children," American Marketplace, Apr. 4, 1996, vol. 17, No. 7, p. 53.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
Healy, Thomas J., "The New Science of Borrower Behavior," Mortgage Banking, vol. 58, No. 5, pp. 26-35, Feb. 1, 1998.
Henry, M.D., Kimberly A., "The Face-Lift Sourcebook," copyright 2000, 3 pgs. (p. 207).
Herron, Janna, "Social Media-Based Credit Score?", http://www.bankrate.com/financing/credit-cards/social-media-based-credit-score/, posted Friday, Jan. 13, 2012, printed Nov. 22, 2013 in 2 pages.
Hill, Kerry, "Identity Theft Your Social Security Number Provides Avenue For Thieves", NewsRoom, Wisconsin State Journal, Sep. 13, 1998, pp. 4.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
Ideon, Credit-Card Registry that Bellyflopped this Year, Is Drawing some Bottom-Fishers, The Wall Street Journal, Aug. 21, 1995, pp. C2.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
"Improving the Implementation of State Children's Health Insurance Programs for Adolescents Report of an Invitational Conference Sponsored by the American Academy of Pediatrics, Section on Adolescent Health," PEDIATRICS, Official Journal of the American Academy of Pediatrics, Section on Adolescent Health, Sep. 26-27, 1999, 9 pages.
IndiCareTM, On-Line Patient Assistant Program, Website Users Manual, JBI Associates, LLC, 1997.
Instant Access to Credit Reports Now Available Online with DMS' CreditBrowser-based system also Simplifies Credit Decisioning and Offers a Central Point of Control, Business Wire, Dallas, May 23, 2000, p. 0264.
Internal Revenue Service Data Book 2000, Issued Aug. 2001, Revised May 2003.
Jones, Yvonne, "Consumers Understood the Basics but Could Benefit from Targeted Educational Efforts," GAO U.S. Government Accountability Office, Mar. 16, 2005, pp. 128, http://www.gao.gov/products/GAO-05-223.
"JPMorgan Worldwide Securities Services to Acquire Paloma's Middle and Back Office Operations," Webpage printed from http://www.jpmorgan.com on Apr. 1, 2009.
"Judging Credit: Consumers Need Better Finance Tools", News Journal, Daytona Beach, FL, Dec. 28, 2002.
Kent, Heather, "Huge declines in price as competition heats up in Vancouver's booming laser-surgery market," CMAJ, Oct. 5, 1999; 161 (7), pp. 857-858.
Kulkosky, Edward, "Credit Scoring Appeal Transcends Underwriting," American Banker, vol. 161, No. 93, p. 8, May 15, 1996.
Kuykendall, Lavonne, "Divergent Paths in Early Pacts with Credit Bureaus", American Banker, May 30, 2002, vol. 167, No. 3, pp. 2.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/.
Lee, W.A., "Experian Eyes Payments, Mulls Deals" American Banker: The Financial Services Daily, 2pgs., New York, NY, May 30, 2003.
Lee, W.A.; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
LendingTree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, "Identity Theft F.A.Q." http://web.archive.org/web/20080215093614/http://www.identitytheftkiller.com/promo/faq.php, Feb. 15, 2008, pp. 8.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
Littwin, Angela, "Beyond Usury: A Study of Credit-Card Use and Preference Among Low-Income Consumers", Texas Law Review, vol. 86, No. 3, pp. 451-506; Feb. 2008.
Longo, Tracey, "Managing Money: Your Family Finances", Kiplinger's Personal Finance Magazine, Jun. 1, 1995, vol. 49, No. 6, pp. 4.
Lorette, Kristie, "How to Successfully Dispute Inaccuracies on Your Credit Report," http://web.archive.org/web/20110531184149/http://www.quizzle.com/blog/2011/03/how-to-successfully-dispute-inaccuracies-on-your-credit-report/, Mar. 25, 2011, in * pp.

(56) References Cited

OTHER PUBLICATIONS

Lund, Graham, "Credit Bureau Data: Maximizing the Benefits," Credit Management, May 2004, ProQuest Central, pp. 44-45.

Magid, Lawrence, J., Business Tools: When Selecting an ASP Ensure Data Mobility, Los Angeles Times, Los Angeles, CA, Feb. 26, 2001, vol. C, Issue 4, pp. 3.

Mathematica Policy Research, Inc., "1998 Health Care Survey of DoD Beneficiaries: Technical Manual," Jul. 1999.

McGovern, Celeste, Jayhawk Medical Acceptance. (Brief Article), Alberta Report, 1 pg., dated Aug. 23, 1999.

McLaughlin, Nancy H., "Homeless, pregnant and alone Dana Sides knows her baby is likely to come in a month, but she has no idea where she will go after leaving the hospital," NewsRoom, Greensboro News & Record (NC), Section: General News, dated Dec. 6, 2001.

MediCredit Announces Major Investment from Medstone; Financing Will Enable Dramatic Expansion of Online Services, Business Wire, pp. 2, dated May 12, 2000.

MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].

Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.

Merriam Webster's Collegiate Dictionary, 10th Edition, 1999, p. 79.

MicroBilt, "PRBC Credit Reporting Agency—Payment Reporting Builds Credit," retrieved from http://www.microbilt.com/nontraditional-credit-report.aspx and corresponding "Sample Report," retrieved from http://www.microbilt.com/pdfs/PRBC%20Sample%20Report%20(complete).pdf printed Nov. 21, 2013 in 8 pages.

Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.

Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.

Mint.com, http://www.mint.com/ printed Sep. 18, 2008 in 2 pages.

Montgomery County Housing Report, Residential Market Report, Jan. 2004 in 6 pages.

MS Money Software by Microsoft http://www.microsoft.com/Money/default.mspx as retrieved on Sep. 17, 2008.

MyFico, http://www.myfico.com/products/ficoone/sample/sample_scoresimulator.aspx printed Oct. 12, 2012 in 3 pages.

My ID Alerts, "Why ID Alerts" http://www.myidalerts.com/why-id-alerts.jsps printed Apr. 3, 2012 in 2 pages.

My ID Alerts, "How it Works" http://www.myidalerts.com/how-it-works.jsps printed Apr. 3, 2012 in 3 pages.

MyReceipts, http://www.myreceipts.com/, printed Oct. 16, 2012 in 1 page.

MyReceipts—How it Works, http://www.myreceipts.com/howItWorks.do, printed Oct. 16, 2012 in 1 page.

"Name Availability Records", Westlaw Database Directory, http://directoy.westlaw.com/scope/default.asp?db=NA-ALL&RS=W...&VR=2.0 as printed Dec. 17, 2009 pp. 5.

National Alert Registry Launches RegisteredOffendersList.org to Provide Information on Registered Sex Offenders, May 16, 2005, pp. 2, http://www.prweb.com/printer/240437.htm accessed on Oct. 18, 2011.

National Alert Registry Offers Free Child Safety "Safe From Harm" DVD and Child Identification Kit, Oct. 24, 2006. pp. 2, http://www.prleap.com/pr/53170 accessed on Oct. 18, 2011.

National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.

"New Privista Product Provides Early Warning System to Combat Identity Theft", PR Newswire, Oct. 24, 2000, PR Newswire Association, Inc., New York.

NewsRoom, "CIGNA Report Withdrawn As Foe Sees Opening," Insurance Regulator, State Survey, Sep. 9, 1996, vol. 8, Issue 34, pp. 4.

"New for Investors: Asset Allocation, Seasoned Returns and More," Prosper, http://blog.prosper.com/2011/10/27/new-for-investors-asset-allocation-seasoned-returns-and-more/, pp. 4.

Next Card: About Us, http://web.cba.neu.edu/~awatson/NextCardCase/NextCardAboutUs.htm printed Oct. 23, 2009 in 10 pages.

Novack, Janet, "The Coming Fight over FICO," Forbes, Dec. 18, 1995, vol. 156, No. 14, p. 96.

Occasional CF Newsletter; http://www.halhelms.com/index.cfm?fuseaction=newsletters.oct1999; Oct. 1999.

Office of Integrated Analysis and Forecasting, DOE/EIA-M065(2004), Model Documentation Report: Macroeconomic Activity Module (MAM) of the National Energy Modeling System, EIA, Washington DC, Feb. 2004.

Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.

Pagano, et al., "Information Sharing in Credit Markets," Dec. 1993, The Journal of Finance, vol. 48, No. 5, pp. 1693-1718.

Partnoy, Frank, Rethinking Regulation of Credit Rating Agencies: An Institutional Investor Perspective, Council of Institutional Investors, Apr. 2009, pp. 21.

Paustian, Chuck, "Every Cardholder a King Customers get the Full Treatment at Issuers' Web Sites," Card Marketing, New York, Mar. 2001, vol. 5, No. 3, pp. 4.

Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.

Planet Receipt—Home, http://www.planetreceipt.com/home printed Oct. 16, 2012 in 1 page.

Planet Receipt—Solutions & Features, http://www.planetreceipt.com/solutions-features printed Oct. 16, 2012 in 2 pages.

Powerforms: Declarative Client-Side for Field Validation, ISSN 1386-145x, Dec. 2000.

"ProClarity and Microsoft to Host Free Seminar Series on Retail Analytics with Independent Analyst Firm-ProClarity to Share Best Forrester Analysts to Discuss Trends and the Future of the Retail"; Business Wire; pp. 2; Aug. 13, 2003.

"Qualifying for Debt Settlement", http://www.certifieddebt.com/debt/settlement-qualifications.shtml printed Jan. 9, 2013 in 2 pages.

Quantix Software, "Investment Account Manager," available at https://www.youtube.com/watch?v=1UwNTEER1Kk, as published Mar. 21, 2012.

Quicken Online by Intuit http://www.quicken.intuit.com/, as retrieved on Sep. 17, 2008.

"Quicken Support", http://web.archive.org/web/20071231040130/http://web.intuit.com/support/quicken/docs/d_qif.html as archived Dec. 31, 2007 in 6 pages.

Ramaswamy, Vinita M., Identity-Theft Toolkit, The CPA Journal, Oct. 1, 2006, vol. 76, Issue 10, pp. 66-70.

RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.

Ratner, Juliana, "GMAC to Sell Risk-Management Advice; Target is 150 Biggest Home Loan Servicers," American Banker, vol. 161, No. 53, p. 16, Mar. 19, 1996.

"Recognition and use by Appraisers of Energy-Performance Benchmarking Tools for Commercial Buildings," prepared by the Institute for Market Transformation, NYSERDA, Feb. 2003, pp. 6.

(56) References Cited

OTHER PUBLICATIONS

Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
"RF/Spectrum to Offer Score," National Mortgage News, Special Report; Credit Reporting & Scaring, Jun. 9, 1997, p. 40.
Risk Monitors, "New GMAC Unit Focuses on Portfolio Risk," PR Newswire, Mar. 13, 1996, pp. 2. http://www.thefreelibrary.com/NEW+GMAC+UNIT+FOCUSES+ON+PORTFOLIO+RISK-a018092212.
Roth, Andrew, "CheckFree to Introduce E-Mail Billing Serving," American Banker, New York, Mar. 13, 2001, vol. 166, No. 49, pp. 3.
Rubin, Rita, "Cosmetic Surgery on Credit, Finance plans let patients reconstruct now, pay later," The Dallas Morning News, 2 pgs., dated Sep. 10, 1988.
Saunders, A., "Data Goldmine," Management Today, London: Mar. 1, 2004, 6 pages.
Screenshot for Investment Account Manager v.2.8.3, published at http://www.aaii.com/objects/get/1642.gif by at least Aug. 30, 2011 in 1 page.
SearchAmerica, "Payment Advisor Suite TM", Solutions, 2009, pp. 2.
"Settling Your Debts—Part 1 in Our Debt Settlement Series", http://www.creditinfocenter.com/debt/settle_debts.shtml printed Jan. 9, 2013 in 6 pages.
Selz, Michael, "Lenders Find Niche In Cosmetic Surgery That Isn't Insured—But Since You Can't Repossess A Nose Job, Risks Aren't Restricted to the Patients," Wall Street Journal, New York, N.Y., Jan. 1997, p. A.1, 3 pgs.
"Shareholders Sue Green Tree Financial," Dated Dec. 4, 1997, http://web.archive.org/web/20000419070107/http://www.wcco.com/news/stories/news-971204-092238.html.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.
"StarNet Financial, Inc. Acquires Proprietary Rights to Sub-Prime Underwriting System Through Strategic Alliance With TRAkkER Corporation", PR Newswire, Dallas, TX, Sep. 13, 1999.
State of Wisconsin, Division of Health Care Financing, Department of Health and Family Services: 1999-2001 Biennial Report, pp. 17-21.
Steele, Georgia, "Fair, Isaac Seeks Mortgage Tech Opportunities," National Mortgage News, Special Report; B& C Lending, Mar. 23, 1998, p. 34.
Stein, Benchmarking Default Prediction Models: Pitfalls and Remedies in Model Validation, Moody's KMV, Revised Jun. 13, 2002, Technical Report #020305; New York.
Sullivan, Deidre, "Scoring Borrower Risk," Mortgage Banking, Nov. 1994, vol. 55, No. 2, pp. 94-98.
Sumner, Anthony, "Tackling The Issue of Bust-Out Fraud", Experian: Decision Analytics, Dec. 18, 2007, pp. 24.
Sumner, Anthony, "Tackling The Issue of Bust-Out Fraud", e-News, Experian: Decision Analytics, pp. 4, [Originally Published in Retail Banker International Magazine Jul. 24, 2007].
Taylor, Marshall, "Loan-Level Pricing Draws Interest From Investors," Real Estate Finance Today, Jul. 7, 1997, vol. 14, No. 14. p. 10.
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
"The Best of the Best," Mortgage Technology, Nov. 1, 2003, vol. 10, No. 8, pp. 34-53.
Thomas, David, "Report on Networks and Electronic Communications Newcourt Credit Turns to Extranet Services / A PC Connects To 1,200 Users At Once", The Globe and Mail (Canada), Section: Report on Business Special Report, Nov. 12, 1996, pp. 2.
TRAkkER Corporation website, trakkercorp.com, TRAkkER Software Description, May 26, 2000, available at http://web.archive.org/web/20000526234204/http://trakkercorp.com/page4.html.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
TransUnion: VantageScore®—Consistency in Credit Scoring, http://www.transunion.com/personal-credit/credit-reports/vantage-score.page printed Oct. 12, 2012 in 2 pages.
Trulia, "Trulia Estimates," http://www.trulia.com/trulia_estimates/, printed Feb. 18, 2014 in 2 pages.
Tuman, Diane, "What is a Zestimate?" Mar. 2013, pp. 5, http://www.zillow.com/wikipages/What-is-a-Zestimate/.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Van Collie, Shimon, "The Road to Better Credit-Card Marketing," Bank Technology News, Sep. 1995, pp. 4.
Verstraeten, Geert, Ph.D.; Issues in predictive modeling of individual customer behavior: Applications in targeted marketing and consumer credit scoring; Unversiteit Gent (Belgium) 2005.
Wahl, Martin, "The Stampede to Subprime," Mortgage Banking, Oct. 1, 1997, vol. 58, No. 1, p. 26(7).
Washington State Office of Public Defense, "Criteria and Standards for Determining and Verifying Indigency," dated Feb. 9, 2001.
Watts, Craig, "Consumers Now Can Know What Loan Rate Offers to Expect Based on Their FICO Credit Score at MyFICO.com," Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
"Web Site Fuels Elective Surgery Trend; The Complete Resource to Paying for Cosmetic Surgery, Laser Vision Correction and Cosmetic Dentistry," Business Wire, Apr. 7, 1999, pp. 2.
Wesabe.com http://www.wesabe.com/, as retrieved on Sep. 17, 2008.
West, David, "Neural Network Credit Scoring Models", Computers & Operations Research, vol. 27, 2000, pp. 1131-1152.
Wilson, Andrea, "Escaping the Alcatraz of Collections and Charge-Charge-Offs", http://www.transactionworld.net/articles/2003/october/riskMgmt1.asp, Oct. 2003.
Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08.
Wisconsin Department of Workforce Development, BadgerCare Medicaid Application Credit Report Authorization Form, dated Jun. 21, 2001, effective date, Jul. 1, 2001.

(56) References Cited

OTHER PUBLICATIONS

Wisconsin Department of Workforce Development, BadgerCare Medicaid Notification of Eligibility, dated Jul. 25, 2000, effective date, Jul. 1, 2000.

Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.

Yang, et al., "An Analysis of the Ex Ante Probabilities of Mortgage Prepayment and Default", Real Estate Economics, Dec. 1998, vol. 26, No. 4, pp. 651-676.

Yücesan et al., "Distributed Web-Based Simulation Experiments for Optimization", Simulation Practice and Theory 9, 2001, pp. 73-90.

Zimmerman et al., "A Web-Based Platform for Experimental Investigation of Electric Power Auctions," Decision Support Systems, 1999, vol. 24, pp. 193-205.

Zoot—Decision Engine, www.zootweb.com/decision_engine.html, as printed on Mar. 3, 2008.

Zoot—Instant Rules GUI, www.zootweb.com/instant_rules_GUI.html as printed Mar. 3, 2008.

Zoot—Pre-Built Standard Attributes, www.zootweb.com/credit_attributes.html as printed Mar. 3, 2008.

Zoot—Rules Management GUI, www.zootweb.com/business_rules_GUI.html as printed Mar. 3, 2008.

Official Communication in European Patent Application No. 12811546.6, dated Nov. 25, 2014.

Official Communication in Russian Patent Application No. 2014101674/08, dated Dec. 15, 2014.

International Preliminary Report on Patentability and Written Opinion for Application No. PCT/US2012/046316, dated Jan. 14, 2014.

International Search Report and Written Opinion for Application No. PCT/US2013/072102, dated Apr. 18, 2014.

International Search Report and Written Opinion for Application No. PCT/US2014/019142, dated Jun. 20, 2014.

Provisional Application as filed in U.S. Appl. No. 60/168,272, dated Dec. 1, 1999 in 14 pages.

Provisional Application as filed in U.S. Appl. No. 60/168,276, dated Dec. 1, 1999 in 82 pages.

Provisional Application as filed in U.S. Appl. No. 60/213,367, dated Jun. 23, 2000 in 20 pages.

Application as filed in U.S. Appl. No. 09/653,595, dated Aug. 31, 2000.

Apte, et al., "A Probabilistic Estimation Framework for Predictive Modeling Analytics," IBM Systems Journal, 2002, vol. 41, No. 3, pp. 438-448.

"Fraud Alert | Learn How". Fight Identity Theft. http://www.fightidentitytheft.com/flag.html, accessed on Nov. 5, 2009.

Gopalan, R., "Panning for Sales-Force Gold", Intelligent Enterprise, Dec. 21, 1999, vol. 2, No. 18, pp. 38-43.

International Search Report and Written Opinion for Application No. PCT/US2018/016258, dated May 16, 2018.

International Search Report and Written Opinion for Application No. PCT/US2018/061877, dated Mar. 8, 2019.

LifeLock, "Personal Identity Theft Protection & Identity Theft Products," http://www.lifelock.com/lifelock-for-people, accessed Nov. 5, 2007.

LifeLock, Various Pages, www.lifelock.com/, 2007.

"NewsHound: NewsHound User Guide Internet E-Mail", of record as early as May 2, 1997, pp. 11.

"Normalize," http://www.merriam-webster.com/dictionary/normalize printed Jun. 14, 2010.

Schmidt, David, "Environmental Impact: The Changing Credit Reporting Landscape," Business Credit, Apr. 2003, vol. 105, No. 4, pp. 14.

Sealey, Geraldine, "Child ID Theft Can Go Unnoticed for Years", http://abcnews.go.com/US/story?Id=90257, Sep. 12, 2003 in 9 pages.

TheMorningCall.Com, "Cheap Ways to Foil Identity Theft," www.mcall.com/business/columnists/all-karp.5920748jul01,0..., published Jul. 1, 2007.

Todorova, Aleksandra, "Protecting Your Child's Identity", Smart Money, Published Aug. 2, 2007, pp. 1-5.

Antonopoulos, Andreas M., "Mastering Bitcoin: Unlocking Digital Crypto-Currencies", O'Reilly, Dec. 2014, First Edition, pp. 282.

International Preliminary Report on Patentability in Application No. PCT/US2017/048265, dated Mar. 7, 2019.

International Preliminary Report on Patentability in Application No. PCT/US2018/016258, dated Aug. 15, 2019.

International Search Report and Written Opinion for Application No. PCT/US2019/049377, dated Dec. 20, 2019.

Langer et al., "Creditor List Screening Practices: Certain Implications Under the Fair Credit Reporting Act and the Equal Credit Opportunity Act," The Business Lawyer, May 1988, vol. 43, pp. 1123-1141.

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.

Official Communication in Indian Patent Application No. 490/DELNP/2014, dated Jun. 20, 2019.

"Use of Alternative Data to Enhance Credit Reporting to Enable Access to Digital Financial Services by Individuals and SMEs Operating in the Informal Economy", Guidance Note, International Committee on Credit Reporting (ICCR), Jun. 28, 2018, pp. 35.

White, Ron, "How Computers Work", Special 10th Anniversary, Seventh Edition, Que Corporation, Indianapolis, IN, Oct. 2003, pp. 23.

* cited by examiner

| Version Number: | 2 |
| --- | --- |
| SourceID: | 5555EX55 |
| UniqueTransactionID: | 434５634534 |
| EventType: | 2 |
| First Name: | Michael |
| Last Name: | Smith |
| Address: | 555 Null Street, Irvine, CA 92612 |
| CompanyID: | NationalB |

FIGURE 3F

| Consumer Identifier: | 554445 |
| --- | --- |
| Event Type: | 4 |
| Score: | 733 |
| Change in Score: | +25 |

FIGURE 3G

| CreditBureauSubscriberID: | AXSDEGWDEDD |
| --- | --- |
| EventType: | 1 |
| Supplied First Name: | Michael |
| Supplied Last Name: | Smith |
| Supplied Address: | 555 Null Street, Irvine, CA 92612 |

FIGURE 3H

| Name | Consumer PID | Consumer Information | Credit Information | Credit Request History |
|---|---|---|---|---|
| Jordan Lee | Address: 124 Dean Drive, Irvine, CA 92612 Phone Number: 441-555-6387 | Income: $422,000 | Credit Bureau 1 Score: 722 (accessed 11/7/2016) Credit Bureau 2 Score: 733 (accessed 11/8/2016) Credit Bureau 3 Score: 703 (accessed 11/8/2016) | 11/12/2016 - credit file request from Car Dealer (Identifier AM BANK) |
| John Doe | Address: 442 Troy Rd., Tokyo Japan Phone Number: 412-555-2568 Email: john.doe@gmail.com | Online videos and browser history data directed to boat purchases and loan comparisons | FICO Score: 688 (accessed 2/4/2015) total Debt: $221,000 | 4/1/2016 - credit file request from Bank 1 for a $70,000 loan (Identifier 45KL0987) |
| Jim Smith | Address: 24 Telephone Rd. #D111, New York, NY 11211 | Recently purchased a stroller, baby diapers, a baby crib, etc | Credit Bureau 1 Score: 701 (accessed 12/4/2012) Total Debt: $13,455 Public Record: one tax lien | 1/5/2015 - full credit report from Bank 1 for Gold Credit Card 1/20/2015 - fill credit report for Bank 2 Credit Card |

FIGURE 4A

| Identifier | Product(s)/Service Provider(s) | Contact Information | Financial Institution |
|---|---|---|---|
| ABL5533 | ABL Cable Co. | Phone — (300) 555-01921<br>Email — accounts@ABL.zzz | American Bank (545AM1) |
| QCP11CE3 | Quality Cellular Phones | Phone — (102) 555-0842 | |
| 1256335453 | Bob's Department Store – West L.A. | Phone — (310) 555-9325 | XYZ Capital (XYZ3454) |
| HRHR444452 | Harry's Department Store | ... | |
| Cloan-5-4-330 | Barry's Car Loans | Phone — (280) 555-01231 | ... |
| NFHESTL5455 | Higher Ed Student Loans | Email approvals@edloans.zzz | National Financial (NF-13-1) |

FIGURE 4B

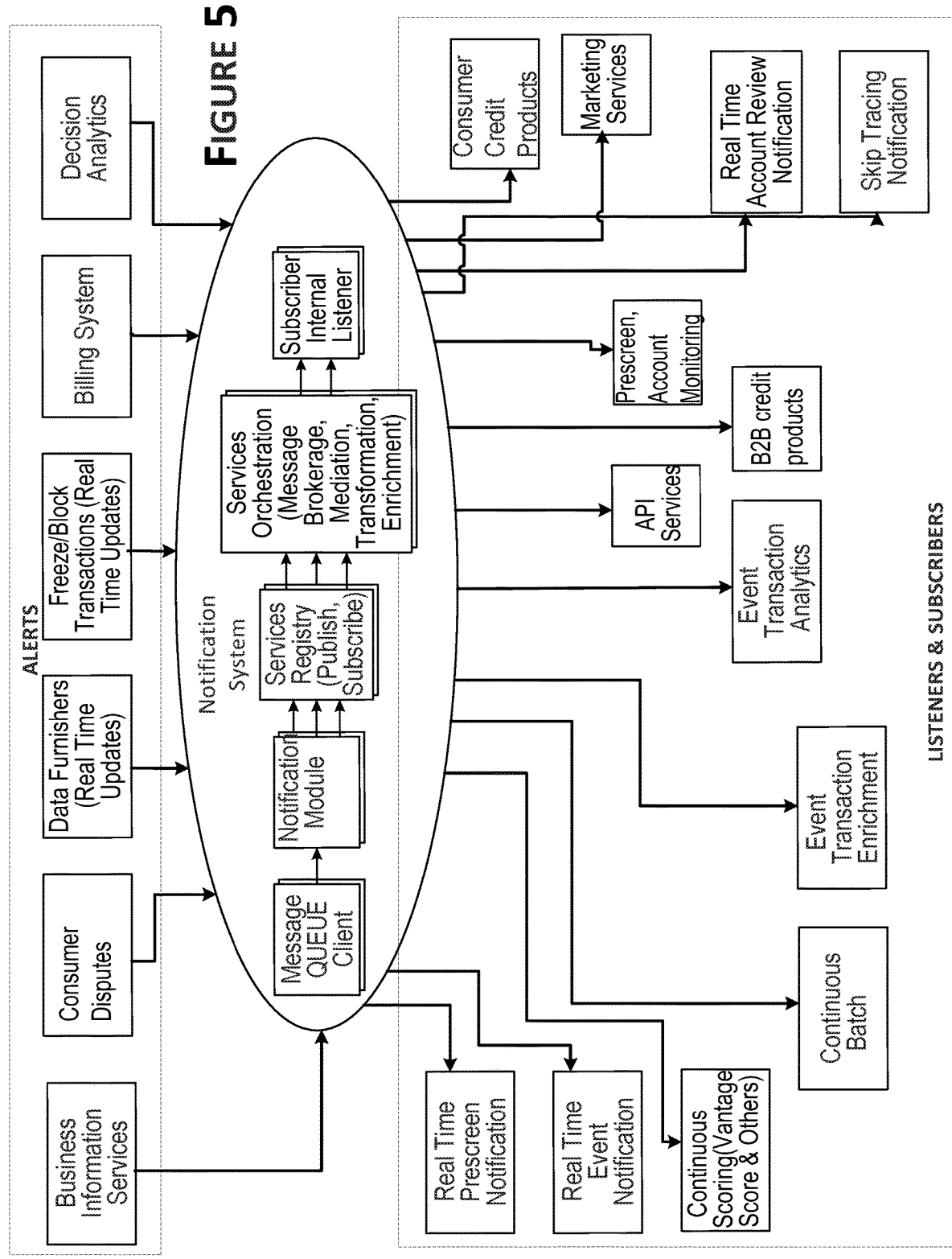

REAL-TIME EVENT-BASED NOTIFICATION SYSTEM

CROSS-REFERENCE TO RELATED APPLICATION

This application claims the benefit of U.S. provisional application No. 62/259,548, filed Nov. 24, 2015, the disclosure of which is hereby incorporated herein by reference in its entirety.

BACKGROUND

When an individual applies for a product or service with an entity, the entity often times requires credit information of the individual. The entity requests credit information for the individual from a credit bureau. Then the entity factors in credit information when negotiating the terms of the product or service with the individual. For example, an entity may present a loan with lower interest rates for individuals with higher credit scores than for individuals with lower credit scores. Credit information may also affect ancillary terms of an agreement. For example, the entity may require a different down payment for a real estate loan based on a credit score. When a credit bureau receives a request for credit information regarding a given consumer from a requesting entity, the bureau typically retrieves the relevant data from a credit database maintained by the bureau, generates a credit score (if requested), returns the credit data and score to the requesting entity, and may record additional information in the consumer's credit file (such as recording that a credit inquiry was received).

BRIEF DESCRIPTION OF THE DRAWINGS

FIGS. 3F, 3G, and 3H are example payloads that may be provided to a subscriber.

FIG. 4A is an illustrative representation of a table associating individual consumer information with credit information and information associated with a request for credit data.

FIG. 4B is an illustrative representation of a table associating financial institutions with vendors and/or service providers, along with corresponding contact and other information.

FIG. 5 is an illustrative representation of block diagram illustrating the ecosphere of notification system and associated modules.

Figure 1A:
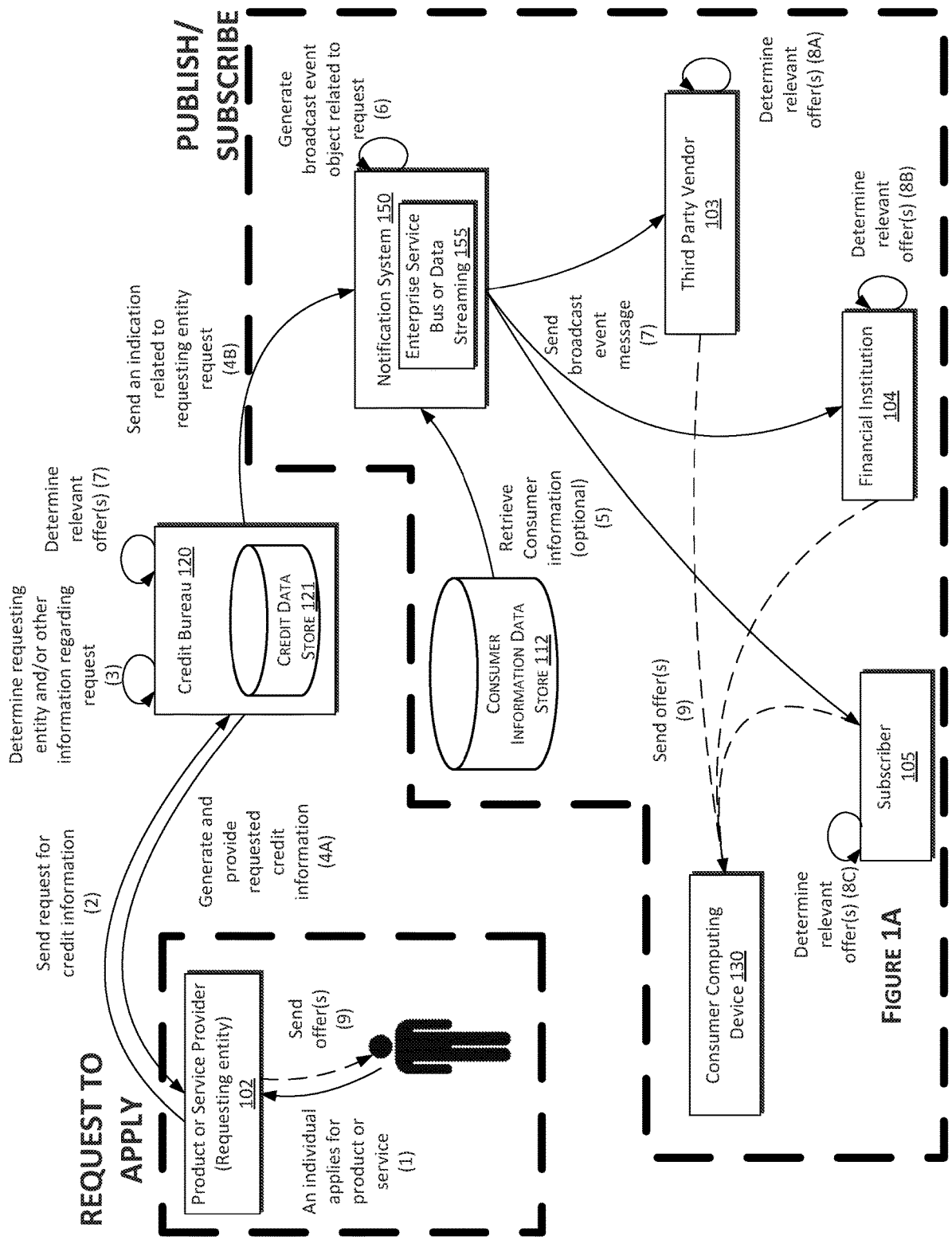
FIG. 1A is a functional block diagram showing a sample high-level flow of events related to a notification system, according to certain embodiments.

These and other features will now be described with reference to the drawings summarized above. The drawings and the associated descriptions are provided to illustrate certain embodiments and not to limit the scope of the invention. Throughout the drawings, reference numbers may be re-used to indicate correspondence between referenced elements.

DETAILED DESCRIPTION

Among other things, this disclosure describes systems and methods for providing alerts in association with monitored events, where the alerts may be electronically delivered to a number of event subscribers substantially in real time relative to the occurrence of an underlying event trigger.

In conventional negotiations and transactions, an entity that is selling products or services may have more information (e.g. credit information) than a buyer when bargaining for the entity's products or services. Without understanding, at the point of negotiation, the condition of an individual's credit data, the individual is placed at a disadvantage. The individual does not know whether an offer for sale or extension of credit is a reasonable one based on the individual's credit data. Furthermore, the individual may not know whether credit data can be easily improved to order to simply return at a later time for a better product or service. The individual may not know if the offer for the service or product is reasonable based on other services and products that the individual is qualified for from other vendors.

Furthermore, credit data may be maintained by a credit bureau which may include account data for millions of customers based on information retrieved from a myriad of different sources. The credit bureaus receive information that may result in changes to credit data (e.g. payments or inquiries change a credit file), but many of these payments take about thirty to sixty days to update. Generally, a credit bureau system utilizes batch processing on a periodic basis to update the credit file. Thus, an individual may not have access to opportunities such as an extension of credit or better products or services until the update takes effect on the credit data. Product and service providers would also have to wait before identifying the individual as having met a certain criteria for a product or service.

Disclosed herein are systems and methods for generating event objects that meet a certain criteria and then generating an alert including an event message that may be electronically delivered to a number of event subscribers substantially in real time relative to the occurrence of an underlying event trigger. In some embodiments, a "publish and subscribe" events-based architecture may be implemented to distribute the alert in real time to target end point systems. Aspects of the present disclosure include a notification system that provides an alert to event subscribers to cause the event subscribers to send relevant information to an individual (e.g. current credit data, credit score) in association with activity related to credit data, such as a request for credit data from the credit bureau, as well as providing notification to the individual on other information (e.g. alternative products or services, suggestions and advice).

As used herein, a "notification module" generally describes any software, firmware, and/or hardware that provides a backbone to publish and subscribe events. For example, a notification module may include an enterprise service bus ("ESB"), data streaming technology, or any other technology that can publish to subscribers. Certain examples herein refer to an enterprise bus or ESB for ease of description, but those embodiments may be implemented with any other notification module discussed herein and/or later developed. For example, the notification module may leverage an Enterprise Service Bus ("ESB") architecture when a trigger event meets certain broadcast criteria (e.g. an increase of a credit score by a certain value, a credit score meeting a threshold, or debt below a certain number). The notification system may generate an event object based on the broadcast criteria to post to an ESB, and the notification module may send a broadcast event message based on the event object to subscribers, allowing subscribers to obtain information on the individual in real-time.

Subscribers may use the information in the event object to send alerts to individuals in real time. Equipping the individual with such information empowers the individual with real time facts that will help him or her in the negotiation process. For example, in some embodiments, information identifying an individual may be sent to a credit bureau from a requesting entity in response to a request for a car loan. The requesting entity may be, in some embodiments, a vendor or service provider for the car loan and the entity that receives information from the individual to send to the credit bureau asking for credit data. In response to the credit bureau receiving the request for credit data from the requesting entity, the credit bureau may respond with credit data to the requesting entity. The credit bureau may also determine information derived from the inquiry (e.g. name of the requesting entity, purpose for the inquiry) and send the derived information to a notification system.

The notification system may assess the information derived from the inquiry, in particular whether the information meets a certain broadcast event criteria. This assessment may be the decisioning for generating a broadcast event object. For example, the notification system may assess whether the request meets a certain criteria (e.g. a credit score increase of 80 points or a total score greater than 700), which may be associated with one or more subscribers. Based on such criteria, the notification system may generate a broadcast event object. The notification system may generate a broadcast event object if the information received from the credit bureau indicates that a broadcast event criteria has been met. In other embodiments, the notification may generate multiple broadcast event objects where each broadcast event object is created based on its own set of broadcast criteria, which may each have been established with respect to different subscribers.

In some embodiments, the notification system receives information derived from the inquiry for credit data. The notification system can additionally receive other information about the individual, such as transactional data, personal identification information ("PID"), medical information, information associated with big data (e.g. search or browser history), and/or other information to determine and generate an event. In some embodiments, the event can identify (or be associated with data that identifies) a category of subscribers to receive information or updates associated with the individual. In some embodiments, the event can include information that can be posted to an enterprise service bus to be sent to subscribers to the enterprise service bus. The subscribers can then determine alerts that can be generated that provide value to the individual. For example, the individual may receive an alert that indicates the individual's latest credit score and/or other relevant information (e.g. how the credit data has changed recently, any mechanisms or actions that can be used or performed to increase the credit score, and/or other information).

Furthermore, the subscriber may extend offers to the individual providing the individual a baseline for the negotiation and that provides immediate alternative offers to compare. For example, the notification system may receive an indication from the credit bureau that the request for credit information came from a car dealership. The notification system may have a broadcast event criterion that identifies requests for individuals interested in a car loan. The notification system may generate a broadcast event object for the criterion, and post the broadcast event object to an ESB and/or other notification module. The ESB can then send a broadcast event message based on the broadcast event object to subscribers that are subscribed to the broadcast event criterion. The subscriber may receive information that the individual requested a car loan from a particular car dealership. The subscriber may determine loan details that the individual may be pre-qualified for to send to the individual based on the individual's credit data. Then, as the individual is negotiating with the car dealership, the individual will be empowered with an alternative loan such that the individual can simply walk away from the loan from the car dealership and go with the loan in the alert. The individual may also be equipped with sufficient information to understand that the individual can step away, take mitigating actions to improve the credit data, and reapply for the product/service for better terms.

Aspects of the present disclosure offer technical advancements that provide vendors and service/product providers with a new and effective way to market their products immediately at the point of sale. Traditionally, vendors and providers can send their marketing alerts at particular times (e.g. daily, monthly), or embedded in certain websites (e.g. searching for a particular product on a search engine or social media feed). However, aspects of the present disclosure provide a notification system that can generate a broadcast event object based on certain criteria and utilize a notification module (e.g. an ESB) to send a broadcast event message to vendors and service/product providers in substantially real-time from the event trigger in order to enable vendors and service/product providers to offer alternative offers for sale in real time as the individual is negotiating a competitor's offer for sale.

Various embodiments of systems, methods, processes, and data structures will now be described with reference to the drawings. Variations to the systems, methods, processes, and data structures that represent other embodiments will also be described.

Credit data may be maintained by a credit bureau or similar entity. Credit data maintained by a given credit bureau may include account data for millions or even billions of customers, where each customer identified in the data may have one or more accounts. The credit data may be based on several sources of data which include existing trade data, new trade data, inquiries, public record data (for example, bankruptcy filings), change of address data, and so forth. A common type of credit data is "tradeline data" (or trade data). Tradeline data may be an entry by a credit grantor to a consumer's credit history which is maintained by a credit reporting agency. A tradeline describes the consumer's account status and activity and can include names of companies with which the applicant has accounts, dates the accounts were opened, credit limits, types of accounts, account balances, payment histories, and/or other data.

In the United States, for example, multiple credit bureaus are constantly receiving data from a large number of data sources, including, for example, banks, creditors and other account providers. The credit bureaus use the data, among other things, to provide credit reports, credit scores and other credit-related products or services to consumers and businesses. The systems of a given credit bureau are typically tailored to specific legal and business requirements based on a number of factors, as well as the needs of its customers, which may have evolved over a long period of time.

In the United States, three hundred million consumers make payments to over fifty thousand entities every month, totaling thirty-five billion payments each year. The entities may include a variety of banks, utility companies, property owners, and the like. Many of these payments take about thirty to sixty days to show up on the consumers' credit ledgers after the payments are made. Generally, the reporting entities and a typical credit bureau system utilize batch processes on a periodic basis to update many aspects of a credit bureau's electronic records.

Disclosed herein are systems and methods for delivering key event alerts, such as credit inquiries and credit dispute status updates, in real time or near-real time from a system operated by a credit bureau to other systems either internal or external to the credit bureau. In some embodiments, a "publish and subscribe" events-based architecture may be implemented to build a real time "pub/sub" protocol, whereby transactions or business events from a producer system (e.g., a central credit bureau system, and/or various other systems) can be distributed to target end point systems (such as subscribers) simultaneously in real time. In some embodiments, the notification system uses data streaming to distribute the events.

In some embodiments, an event may be sent via a notification module when a significant change of state occurs in the producer system in which one or more target systems or end-point subscribers are interested. This events-based architecture may complement Services Oriented Architecture principles, whereby each change of state in the producer system may be considered a unique event and wrapped as a "business service" to be delivered to target end points or systems. Aspects of the present disclosure may provide a foundation for a loosely coupled enterprise architecture, thereby significantly reducing if not eliminating the need for point-to-point integration between application systems and the associated complexity.

Aspects of the present disclosure may leverage the capability of a notification module, such as an ESB, data streaming, or other publish and subscribe middleware, to implement an events-based architecture, and may be used to deliver atomic events in a publish and subscribe model. The publisher may be a system of records that creates various atomic events, and the subscriber may be a system that consumes the events. The publisher may deliver the events to various subscribers by posting the event in an Enterprise Service Bus. In some embodiments, the ESB may eliminate any point-to-point integration between the publisher and subscriber, and act as a backbone channel for both delivery of events to many subscribers and the clustering of different application systems within the enterprise. An ESB software suite, potentially combined with specialized hardware in some embodiments, may provide a mechanism wherein the events manifested from the publishing system can be cataloged, and each subscribing system can subscribe to certain atomic events from the catalog based on event type and/or various data or metadata associated with each event. In some embodiments, the publisher of events may not even know how many subscribers are there, as the ESB may render these events to different subscribers through listeners which are associated with each subscriber in the ESB framework. The ESB may also provide a flexibility whereby the role of producers and subscribers can be reversed, so that each application system can be either producing events or consuming events. In some embodiments, a single system may be both a producer and subscriber with respect to different events. For example, a given system may automatically produce an event in response to some other event that it consumes. The ESB backbone can also be leveraged, in some embodiments, to implement request-reply web services for any application systems clustered in an ESB cluster.

In some embodiments, a publish and subscribe model as described herein may provide functionality whereby a publisher effectively posts an event once for consumption by a large number of listeners or subscribers. Individual listeners may be configured to react to certain events uniquely by event type and/or other information, then repost a subsequent response event to the ESB.

In general, it is desirable for the payload of an event posted to the bus to be relatively small (e.g., less than a few hundred bytes). Accordingly, in some embodiments, an application programming interface ("API") and/or other functionality provided by an operator of a credit bureau may be configured to receive data from various sources and package the data into an event object in a manner that ensures a payload size below a pre-established threshold set based on size or efficiency benchmarks established to meet the technical and/or business needs of the ESB and/or credit bureau. For example, the event may provide notification of a change in credit data, personal identification information, information on the requesting entity, and/or other credit data.

In some embodiments, an API may be provided that enables consumers and/or financial entities (e.g., banks, credit card providers, etc.) to report credit data for inclusion in a credit bureau database in a real time manner utilizing features of the ESB architecture. As volume needs increase, systems disclosed herein may be scalable and self-adjusting, such as by automatically triggering multiple instances of an API to scale to volume or bandwidth needs. In some embodiments, many aspects of the system may be designed to have built-in redundancy and/or may be modular in order to enable increased flexibility.

The data layout of an event may depend on the type of event. For example, a generic layout may be established and used for certain events, while other events may be organized in a customized format based on the event type, specific subscriber needs, the producer's needs, and/or other factors. As a specific example in one embodiment, the payload of an event for reporting a credit inquiry may include fields indicating a consumer's basic information (e.g., name, birthday and social security number), credit data, address information, and the name of the inquiring entity. In some embodiments, the payload of an event may be in a JSON format in order to minimize ties to any specific schema, although other configurations (e.g., XML) are contemplated and intended to be within the scope of this disclosure. In some embodiments where multiple payload formats can be posted to and processed by the same ESB, only certain listeners/subscribers may be configured to process specific formats (e.g., a customized data layout may be used for a specific bank listener).

In some embodiments, the ESB may be configured to process both regulated and non-regulated data. For example, certain types of credit data and personal information may be regulated by one or more government entities in a given region or country. The ESB may be configured such that any events posted to the bus are checked automatically to determine whether the data types involved trigger any rules that require certain consumer consent or other special treatment. In the case that one or more consent rules are triggered, the producer system may be configured to automatically check for a record of the appropriate consent in an electronic data store, where the consent may have been previously obtained from a consumer via an API (such as the consumer agreeing to certain consents when previously self-reporting credit data to the credit bureau via an API, or in association with a firm offer of credit).

As mentioned above, a single system, in some embodiments, can act as both publisher and subscriber. For example, a given listener (e.g., a continuous scoring listener) can be configured to automatically perform an action (e.g., generate a credit report) upon listening to a certain even type, and then automatically post a resulting new event (e.g., a credit score) back to the ESB in real time. Events may be split into different parallel queues based on filtering, rule sets and/or load balancing, then a regulator associated with a given queue may determine one or more specific listeners to receive each queued event.

According to certain embodiments, a notification system, which may include an enterprise service bus, may broadcast an event to subscribers to cause the subscribers to provide an alert to an individual when an entity uses information of the individual to request credit data. In other embodiments, the notification system may generate an event to send directly to a consumer computing device. In some such embodiments, the consumer computing device may be a subscriber, and may launch an application upon receiving an event message in order to provide additional related information to the consumer. For example, a notification system, as disclosed herein, may provide an alert to a device associated with the individual when identification information associated with the individual is included in a request associated with a request for credit data, such as requesting a credit file.

In some embodiments, the credit bureau and/or the notification system may determine information underlying the request, such as the name of the requesting entity and/or the purpose for the request. The notification system may also determine third party vendors, financial institutions, or subscribers to which to broadcast the event. In some embodiments, the financial institution may be, for example, a bank or credit card issuer that maintains credit accounts for individuals on behalf of a separate entity, such as a vendor or service provider. The notification system may determine how the event will be broadcasted (e.g. categories of event receivers or particular receivers of the broadcast event). The notification system may, in some embodiments, provide information associated with related offers (e.g. categories of relevant offers for the receivers of the broadcast event).

In some embodiments, the notification system as described herein may include a subscription component. For example, the subscription component may be offered via a monitoring service that enrolls third parties to the enterprise service bus to receive broadcast messages. In some embodiments, a notification system may have a relationship with a credit bureau, or other entities (e.g. subscribers to the enterprise service bus, product or service providers, and/or financial institutions), such that certain requests that are received by the credit bureau or other entities are sent to the notification system prior to being processed by the credit bureau or the other entities. Furthermore, in some embodiments the notification system may be an intermediary that receives requests associated with a request for credit data from requesting entities or financial institutions and transmits the requests to one or more credit bureaus or other entities after (or concurrently with) extraction of information regarding an individual identified in the request and initiation of alert transmission to the consumer.

In some embodiments, alerts and/or events may be generated very quickly (e.g., in real-time or substantially in real-time) after a request associated with credit data or other event-triggering action occurs. For example, alerts may be transmitted to subscribers within seconds of the triggering event occurring. Similarly, notifications from subscribers indicating feedback, relevant offers, suggestions, and the like may be transmitted to the individual also in real-time or substantially in real-time. Although the disclosure discusses offers, feedback, information, and the like sent to the individual, the same notification or alert can be sent to other entities (such as the requesting entity). In other embodiments, notifications or alerts to individuals may be transmitted in batches, where the batch processing may occur every N seconds, minutes, hours, or other period.

In some embodiments, identity information that may be included in a request for credit data may broadly include various types of data associated with an individual. Examples that may be considered identity information, in some embodiments, include name, address, telephone number, email address, social security number, etc. Although the description provided herein refers to individuals, consumers, or customers, the terms "user," "individual," "consumer," and "customer" may, according to some embodiments, include groups of individuals, such as, for example, married couples or domestic partners, organizations, groups, and business entities. Furthermore, request for credit data may broadly include various types of data associated with the requesting entity, for example, requesting entity name, address, and the like. The request for credit data may also include information on the purpose of the inquiry, for example, a loan amount, a purpose for the loan, etc.

A request for credit data may generally refer to a request for more information on the individual based at least in part on one or more pieces of identification information. For example, the request for information may be non-credit data and/or credit data. For the purposes of discussion, the request will be described as a request for credit data directed to a credit bureau. In some embodiments, a request for credit data may be a part of an account opening transaction or request. For example, when an entity initiates a process to open a new credit account or other account for an individual, the entity may first attempt to receive credit data of the individual. The entity may subsequently request credit data associated with the individual as a part of the account opening process. In other embodiments, the entity may open an account for the individual by submitting a credit data request. As will be appreciated, examples described herein with reference to requests for credit data may also be applicable to requests for other types of requests associated with the opening of an account, line of credit, or other transaction. Examples of account types that may be associated with a request to open a new account may include, for example, a mortgage, a revolving loan, a credit card, financial services, utilities, leasing, renting, television service, telephone service, and/or other types of credit or non-credit accounts.

FIG. 1A is a functional block diagram showing a sample high-level flow of events in a notification system, according to certain embodiments. As shown in FIG. 1A, an individual applies for an account with a product or service provider (requesting entity) 102. For purposes of example, the individual applying for the account may be an individual named of Jim Smith. The requesting entity 102 may be attempting to open a credit account, for example, in the name of Jim, such as a department store credit card. As will be appreciated, the product or service provider (requesting entity) 102 could be any of a number of business types involved in products or services, even for products or services ancillary to credit data. For example, the requesting entity 102 may be involved in opening accounts for consumers, including credit accounts and/or non-credit accounts. While credit bureaus are often referred to in this disclosure to maintain credit data, it is appreciated that in other embodiments, some or all of the credit data may be maintained by other entities (such as the subscriber 105, financial institution 104, or third party vendor 103. In some embodiments, the requesting entities may be the entities to receive the broadcast event message. In some embodiments, the entities receiving the broadcast event message may be the requesting entity. Thus, a given system may both provide input to the notification system that triggers an event object to be created, and may receive event messages as a subscriber.

The credit bureau 120 may determine information regarding the request for credit data. For example, the credit bureau 120 may identify the name of the product or service provider (requesting entity) 102, the purpose of the request for credit data, or the like. The credit bureau 120 may retrieve credit data (e.g. a credit file) for the individual from a credit data store 121. In the illustrated example, the credit bureau 120 generates and provides the requested credit information to the product or service provider 102. A request for credit data is also sent to a notification system 150. As will be appreciated, requests for credit data and/or other requests associated with an account opening may additionally or alternatively be received by entities other than a credit bureau (such as an authentication service in the event of an account opening transaction, where the authentication service may be operated by the same operator or different operator than the credit bureau services).

In some embodiments, the notification system 150 may also receive consumer information from a consumer information data store 112. For example, the consumer information may include non-credit information that may be used by the notification system 150 when identifying whether an incoming request or other occurrence satisfies criteria for broadcasting the occurrence as a broadcast event. The consumer information may include information such as transaction data, browser data, personal information, and/or any other information that may be used when determining whether to generate a broadcast event object related to a request for data. Such information may be provided by financial institutions, credit bureaus, vendor or service providers, big data providers, the individual, and/or other entities that have relevant information on the individual. The consumer information data store 112 may include multiple data stores, in some embodiments.

Next, in the embodiment illustrated in FIG. 1A, the notification system 150 may identify that a broadcast event object related to the request for credit data should be generated as a result of the incoming notification meeting previously established event criteria, as will be discussed in more detail below. For example, the broadcast event object may include information regarding a credit file and/or other credit data, changes in credit data, consumer information (such as personal information, and/or non-credit data such as browser history), requesting entity information, information related to the purpose for the request for credit information, and/or the like. The notification system 150 may comprise a notification module, such as enterprise bus 155, data streaming, or other technology that can publish to subscribers (herein referred to as an enterprise bus for convenience, but any discussions of an enterprise bus are equally applicable to other notification module) as will be described in further detail below.

The notification system 150 may determine one or more broadcast event types in response to information received by the credit bureau 120. For example, the notification system 150 may determine that one broadcast event type is an increase in credit score over a specified threshold. In another example, the notification system 150 may determine a broadcast event type based on the type of requesting entity 102 (e.g. a car dealership), or the purpose of the information received from the credit bureau 120 (e.g. a car loan). In some embodiments, the broadcast criteria may include whether the information received by the credit bureau 120 falls under a particular event type. This event type information may be incorporated into an event object generated by the notification system 150.

In some embodiments, the notification system 150 may use the enterprise service bus 155 to send broadcast event messages to other entities. For example, the notification system 150 can send the broadcast event message to subscribers 105 of the enterprise service bus. In some embodiments, the notification system 150 may send the broadcast event message to third party vendors 103, financial institutions 104, and/or any other third party that may use the broadcast event message and/or related request information to determine an alert to send to the individual.

In some embodiments, the notification module comprises data streaming configured to publish events to subscribers. Data streaming, as used herein, generally refer to any technology that processes events in the order they occur, and may include the transfer of data at a high speed sufficient to support sufficient bandwidth and for real-time human perception of data. One example includes the KAFKA stream configured to stream messaging data in a publish and subscribe architecture. The KAFKA stream is a distributed streaming platform that allows the platform to publish and subscribe, to store streams of records, and to process streams of records as they occur. Other examples of data streaming technology include FLINK, and SPARK. "The Forrester Wave™: Big Data Streaming Analytics, Q1 2016," by Mike Gualtieri and Rowan Curran, published Mar. 30, 2016 by Forrester™, available at http://www.sas.com/content/dam/SAS/en_us/doc/analystreport/forrester-big-data-streaming-analytics-108218.pdf, and "Top Streaming Technologies for Data Lakes and Real-Time Data" by Greg Wood, published Sep. 20, 2016 by Zaloni The Data Lake Company, available at http://blog.zaloni.com/top-streaming-technologies-for-data-lakes-and-real-time-data, which are hereby incorporated by reference in their entirety, describe additional details and options in using data streaming technology that may be used in certain embodiments of notification systems discussed herein. The notification module may include a form of middleware, data streaming, other technology that may allow a system to publish/subscribe architecture, to publish or sent to an entity to consume, or send to subscribers of a certain event.

The entities (third party vendor 103, subscriber 105, and financial institution 104) that receive a broadcast event message may then, extract the information related to the request for credit data from the message, and determine relevant offers to send to the individual. Then, one or more entities may send an offer, an alert, notification, and/or message to a consumer computing device 130. The alert may include a notification of information (e.g. current credit score), suggestions for the consumer (e.g. mitigation factors to increase credit score), competing offers (e.g. other offers for a car loan), or any other information that may be helpful for the individual (e.g. helpful for the purpose of the inquiry).

The event message receiving entities (third party vendor 103, subscriber 105, financial institution 104) may, in some embodiments, de-dupe, parse, and/or re-phrase the broadcast event messages received from the notification system 150. For example, multiple alerts may be generated by the entities (third party vendor 103, subscriber 105, and/or financial institution 104) for the same consumer activity, such as when multiple entities may generate and transmit alerts to the consumer computing device 130. The consumer computing device 130 and or other system may parse and/or re-phrase the alert to make it user friendly. For example, the consumer computing device 130 may correlate information included in the alert, such as alert type, with a particular alert message and/or integrate the messages together in a single application or message. Additionally, different alert messages or formats may be accessed depending on the delivery medium, such as e-mail, software application, SMS, voice, etc.

The notification system 150 and/or an entity that receives an event message (such as third party vendor 103, subscriber 105, or financial institution 104) may determine contact information and/or contact preferences for the individual based on, for example, information that the individual provided when enrolling in a monitoring service or alert/notification service. The one or more alerts may be provided in various manners, and may depend in part on the device type. For example, alerts may be delivered, in some embodiments, via one or more of e-mail, text message, phone call, an online portal that is accessible to alert members (e.g., a credit monitoring or identity protection website), printed digests, mobile applications, etc.

In the embodiment of FIG. 1A, the individual may provide an indication back to the relevant entity (such as third party vendor 103, subscriber 105, or financial institute 104) to receive more information on the offer, such as details on the counter offer or view mitigating steps to improve credit score. The respective entity (such as third party vendor 103, subscriber 105, or financial institute 104) may implement one or more responsive actions in order to provide the individual with more information, or more detail on the contents of the offer. In some embodiments, the individual may have preconfigured notification/alert preferences. For example, the individual may allow for certain notifications (such as alternative counter-offers), but not authorize messages to be sent suggesting mitigating steps to improve the individual's credit score.

The alerts to consumers may include detailed information regarding the requesting entity. For example, rather than simply indicating the name of a chain store from which the request for credit data was received, in some embodiments the alerts may include the particular information regarding the individual that was provided to the requesting entity. Having more detailed information on the information provided to the requesting entity allows the consumer to better determine its negotiation stance.

Figure 1B:
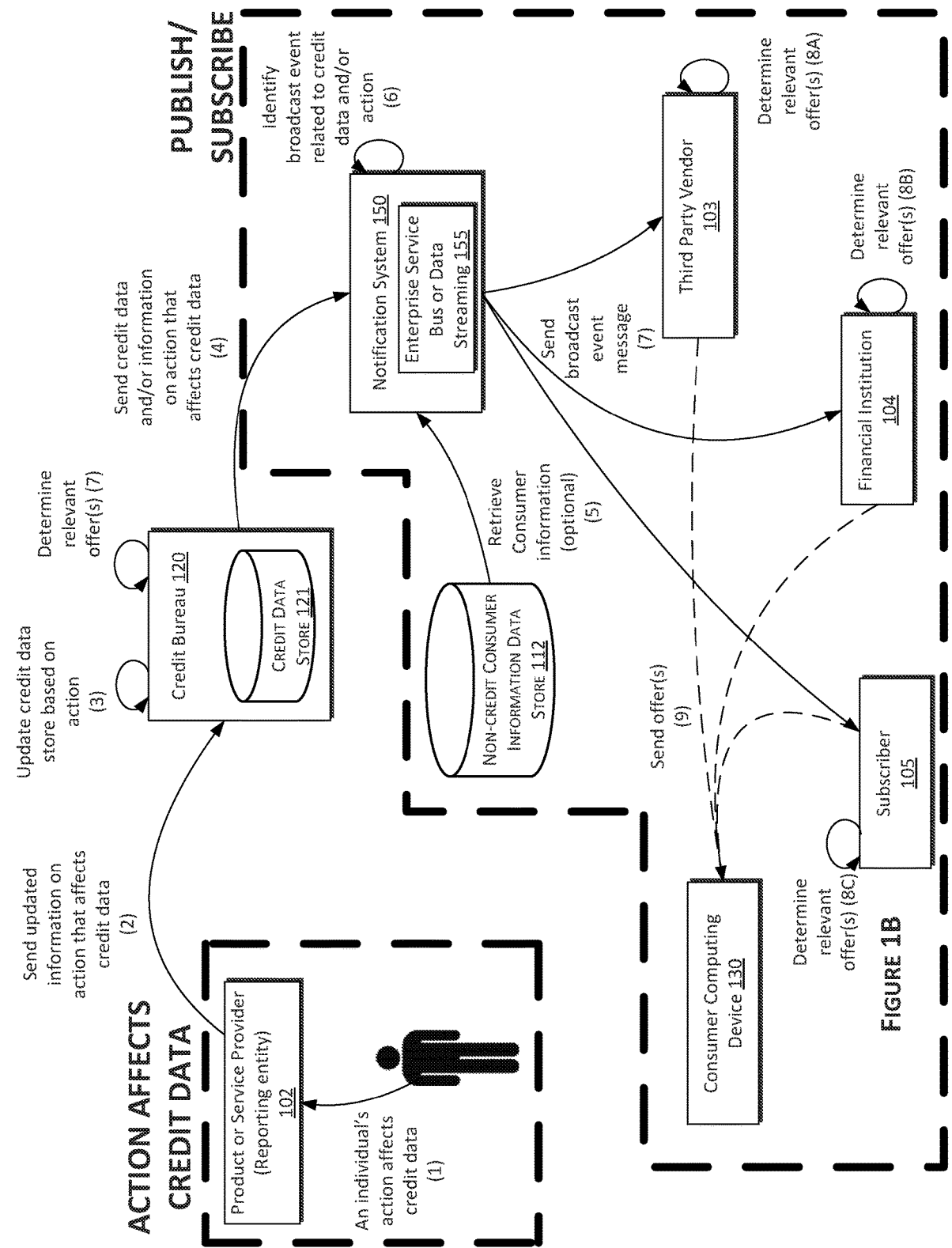
FIG. 1B is a functional block diagram showing another sample high-level flow of events related to a notification system, according to certain embodiments.

FIG. 1B is a functional block diagram showing another sample high-level flow of events in a notification system, according to certain embodiments. As shown in FIG. 1B, an individual can perform an action with a product or service provider (requesting entity) 102 that affects credit data. For example, the individual may have a debt with the product or service provider 102. However, the individual may pay off the balance of the debt, which would thereby affect the individual's credit score. Accordingly, as illustrated, the product or service provider 102 may send updated information on the action (e.g. paying off the debt) as performed to the product or service provider 102 by the individual. Alternatively, the credit bureau 120 may request such information upon the change, at different time intervals, upon a request for such information (e.g. request for a credit file), and the like.

The credit bureau 120 may update the credit data store based on the information related to the action that affects the credit data (e.g. paying off the debt). For example, the credit bureau 120 may update statistics on the credit file, such as total debt, or the like. The credit bureau 120 may also generate updates on the credit file, such as an updated credit score. The updated credit data and/or the action that affects the credit data can also be sent to the notification system 150. As will be appreciated, updates to the credit data may additionally or alternatively be received by entities other than a credit bureau.

In some embodiments, the notification system 150 may also receive consumer information from a data store 112, similar to FIG. 1A. Next, in the embodiment illustrated in FIG. 1B, the notification system 150 may generate a broadcast event object related to the credit data and/or action that affected the credit data. For example, the broadcast event object may include information associated with a credit file and/or other credit data, changes in credit data, consumer information (such as personal information, non-credit data such as browser history), requesting entity information, information related to the purpose for the request for credit information, and/or the like.

In some embodiments, the notification system 150 may use the enterprise service bus 155 to send broadcast event messages to other entities, as in FIG. 1A. The other entities (such as third party vendor 103, subscriber 105, and/or financial institution 104) may then each receive a broadcast event message, extract the information related to the updated credit data and/or actions that affected the credit data, determine relevant offers to send to the individual, and send an offer to a consumer computing device 130, as in FIG. 1A.

Figure 3A:
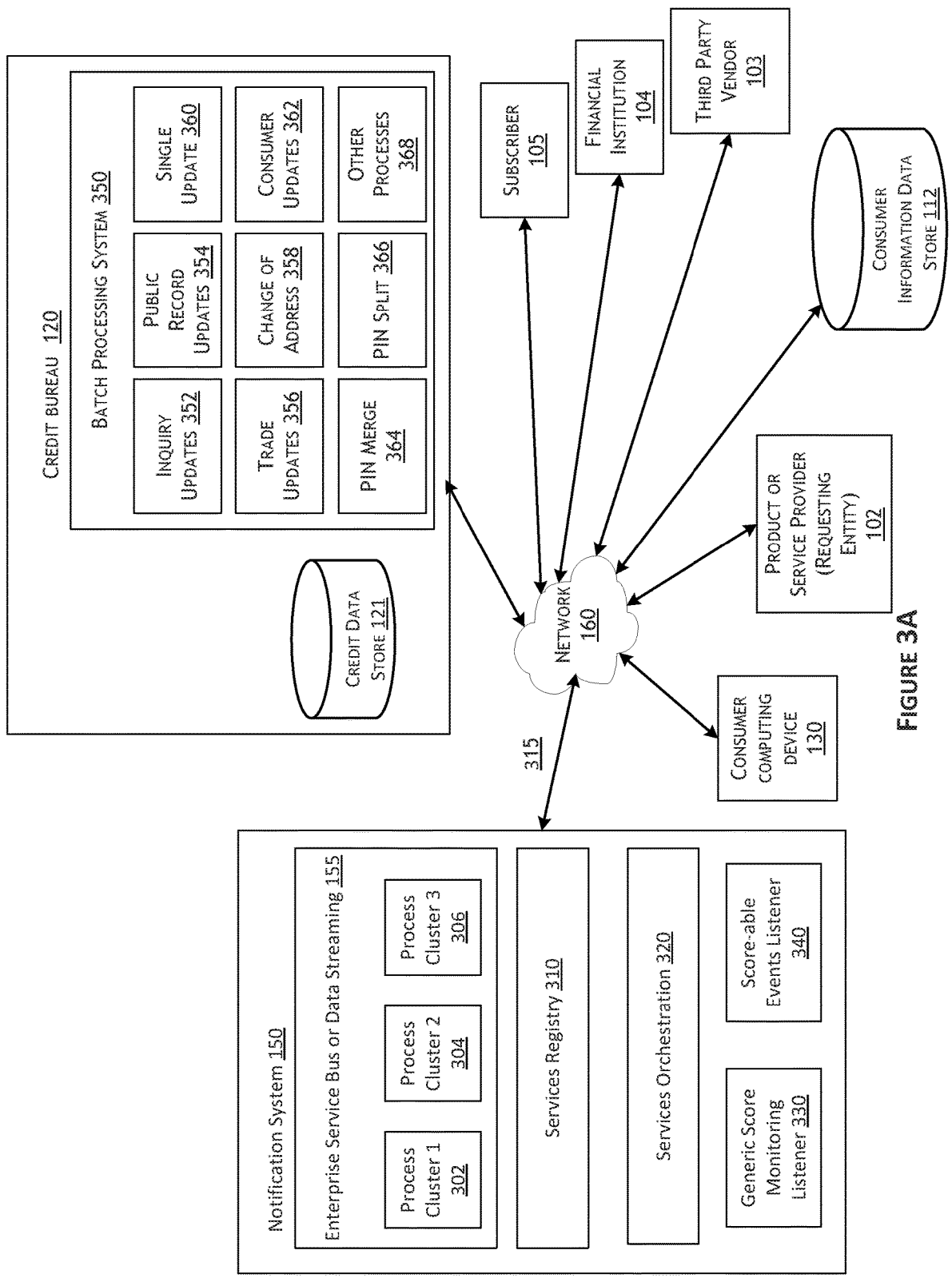
FIG. 3A illustrates one embodiment of a system that implements aspects of the present disclosure, such as broadcasting events to one or more subscribers.

Although the embodiments of FIGS. 1A and 1B describe the notification system 150 including the enterprise service bus 155, and entities (e.g. subscriber 105, financial institution 104, third party vendor 103) external to the notification system 150, it is appreciated that part or all of the enterprise service bus 155 (and other modules described in the notification system 150 in FIG. 3A) may be placed external to the notification system 150, and part or all of the entities (e.g. subscriber 105, financial institution 104, third party vendor 103) may be local to the notification system 150.

Figure 2A:
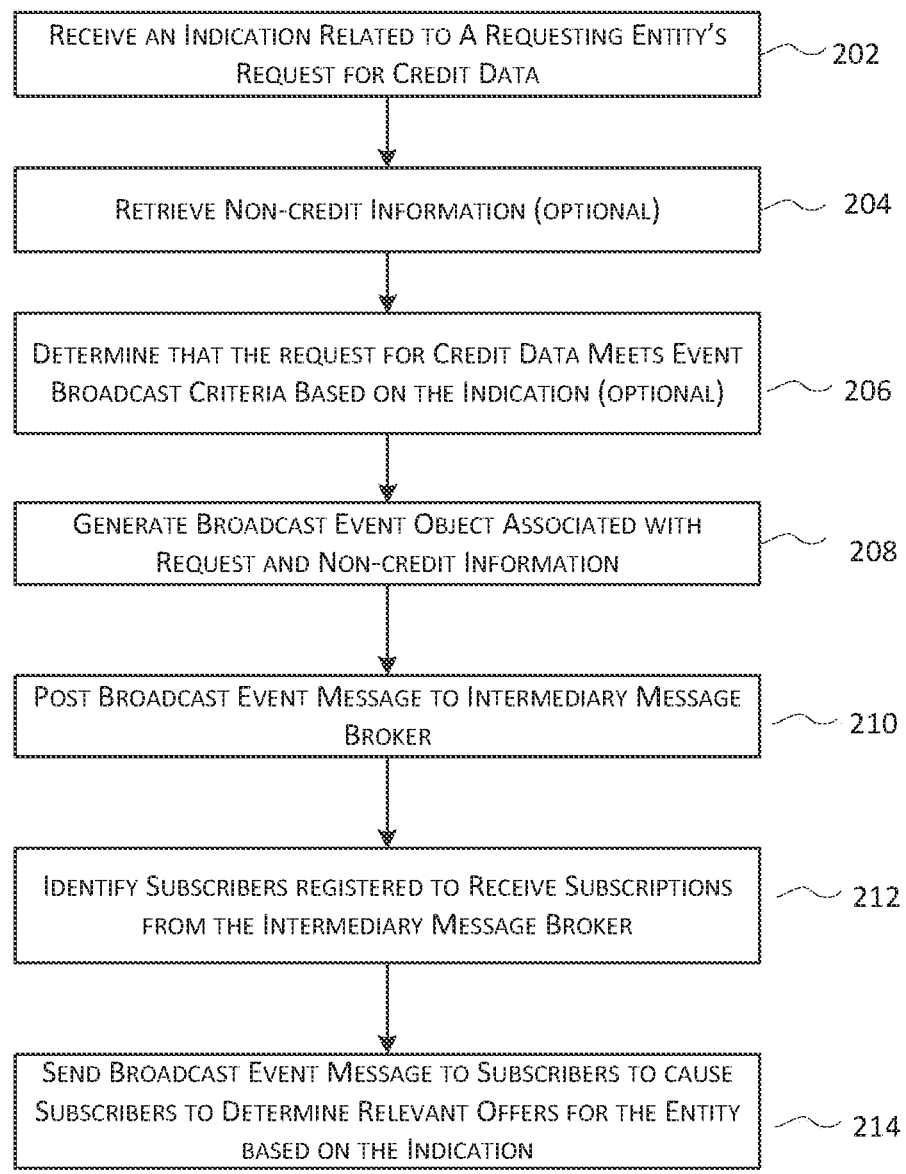
FIG. 2A is a flowchart illustrating one embodiment of a method for sending a broadcast event to subscribers based on a request for credit data.

FIG. 2A is a flowchart illustrating one embodiment of a method for sending a broadcast event message to subscribers based on a request for credit data, as described in FIG. 1A. The illustrative method may be implemented by a notification system, such as the notification system 150. In some embodiments, the notification system 150 may include an enterprise service bus 155 that implements some of the steps of the method illustrated in FIG. 2A. The illustrative method begins at block 202, where the notification system 150 receives an indication related to a requesting entity's request for credit data of an individual or other entity. As discussed above, an individual may apply for a service or product from a service or product provider 102. The request may be associated, for example, with a transaction to open an account on behalf of the individual. As used in the illustrated example, the underlying vendor or service provider 102 that submitted the initial request to the credit bureau 120 may be referred to as the requesting entity 102. In other embodiments, the notification system 150 may receive the indication related to the request for credit data from an entity other than the credit bureau 120, such as a subscriber 105, a financial institution 104, a third party vendor 103, an authentication service, or other entity.

Once the notification system 150 receives the indication related to a requesting entity's request for credit data, the method proceeds to block 204, where the notification system 150 accesses information associated with the identified consumer. The information can include personal identification information of the individual, transaction data, sociodemographic information, preferences, browser history, and/or any other information relevant to the consumer. For example, the notification system 150 may retrieve contact information from one or more data stores based on a determined match between the consumer identification information included in the request for credit data and contact information associated with a number of different consumers. The contact information retrieved may include, for example, one or more of an e-mail address, phone number, address, IP address, a user account name associated with enrollment in a monitoring service, etc.

At block 206, the notification system 150 may, in some embodiments, determine if the request for credit data meets event broadcast criteria based on the indication related to a requesting entity's request for credit data. The notification system 150 can also use a variety of other information in its decisioning whether to generate and/or how to generate the broadcast event object. The notification system 150 can use information directed to a change in the credit file. For example, the notification system may generate a broadcast event object if the credit score has increased by 80 points, or if the total credit score is above 700. The notification system 150 may also apply criteria directed to the requesting entity. For example, the notification system 150 may generate a broadcast event object if the requesting entity is associated with luxury brands (e.g. generate a broadcast event object if the requesting entity is associated with a luxury brand car dealership).

In some embodiments, the notification system 150 may generate a broadcast event object based on information on the requesting entity. The notification system 150 may generate an event broadcast criteria when the request for credit data is associated with a particular financial institution. For example, a subscriber that is a financial institution may subscribe for broadcast event messages that are associated with itself or its competitors. A financial institution may desire to receive messages in real time for requests associated with itself to identify better offers than the ones allowed by the requesting entity. The financial institution may have special promotions or have a long standing relationship with the individual that the financial institution would like to promote and foster. In some embodiments, the request for credit data may only provide the name of the requesting entity and not a financial entity associated with the requesting entity. The notification system 150 may retrieve data from one or more data stores that associates each of a number of different financial entities with one or more requesting entities with which the given financial entity is associated. Such association data is described with more detail below with reference to FIG. 4B. In this manner, the notification system 150 may set criteria to create a broadcast event object based on an association with a financial institution even if the request for credit data does not contain the financial institution. For example, if the data store links a real estate company to a particular financial institution, then the notification system can identify the financial institution from the identity of the real estate company that may be the requesting entity requesting credit data. In some embodiments, the notification system 150 and/or the subscriber 105 may provide the consumer directly with an alert about the specific underlying requesting entity in order for the consumer to better determine if the offer for the service or product is a fair one.

In some embodiments, the notification system 150 may generate a broadcast event object based on criteria related to information on the individual. The notification system 150 may generate a broadcast event object for a particular individual, or characteristic associated with the individual. For example, the notification system 150 may generate a broadcast event object for individuals based on gender, geolocation/residence, socio-economic attributes, race, age, level of education, income and employment, psychiatric or medical data, a personality trait, an interest, values, attitudes, lifestyles, opinions, preferences, likes or dislikes, predilections, purchase history, browser history, financial history and data, credit history and data, personal history and data, other activity data, and the like. The notification system 150 may receive information from the credit bureau 120 that may identify the individual, and may access other information on the individual from the consumer information data store 112.

In some embodiments, the notification system 150 may generate a broadcast event object based on criteria related to the request itself. For example, the notification system 150 may generate an object if there are a number of requests by a particular requesting entity or for a particular individual. Subscribers may subscribe to receive broadcast event messages when multiple occurrences of a request for credit file is placed for a particular individual. The notification system 150 may also assess the purpose of the inquiry to determine whether to generate a broadcast event object. For example, the notification system 150 may generate a broadcast event object for requests to open a line of credit, or for real estate loans for a particular amount in a specified area.

At block 208, the notification system 150 generates a broadcast event object associated with the request for credit information and optionally other non-credit information (e.g. information regarding the requesting entity, information regarding the consumer, etc.), and, at block 210, posts a corresponding broadcast event message to an intermediary message broker. The broadcast event object may include the indication related to the requesting entity's request, information on the requesting entity, information on the individual, information on the request itself (such as the purpose of the request), the criteria for the broadcast event object, the intermediary message broker, and/or other information that may be used by the intermediary message broker, the enterprise service bus 155, the individual, or the subscriber 105. The enterprise service bus 155 identifies subscribers 105 registered to receive subscriptions from the intermediary message broker at block 212. In some embodiments, each subscriber may be subscribed to one or more broadcast criteria. For example, a subscriber may be subscribed to receive broadcast event messages where (1) credit score is greater than 700, as well as receiving broadcast event messages from (2) individuals residing in California.

At block 214, the notification system 150 transmits the broadcast event message to subscribers 105 to cause the subscribers 105 to determine relevant offers for the entity (e.g. the individual) based on the indication related to the requesting entity's request for credit data at block 204. The broadcast event message may include at least a portion of the broadcast event object, routing information, information on the subscriber, and the like. Then, the subscribers can transmit a notification or alert to the consumer using one or more delivery mediums according to the contact information retrieved. For example, the alert may be delivered via e-mail, within a software application, an online portal or website, SMS text message, voice call, etc. In some embodiments, the delivery method may be selected based on preferences previously provided by the consumer. In some embodiments, the blocks of FIG. 2A may all be performed substantially in real time (such as within seconds or milliseconds, in one embodiment) with respect to the indication being received at block 202.

Figure 2B:
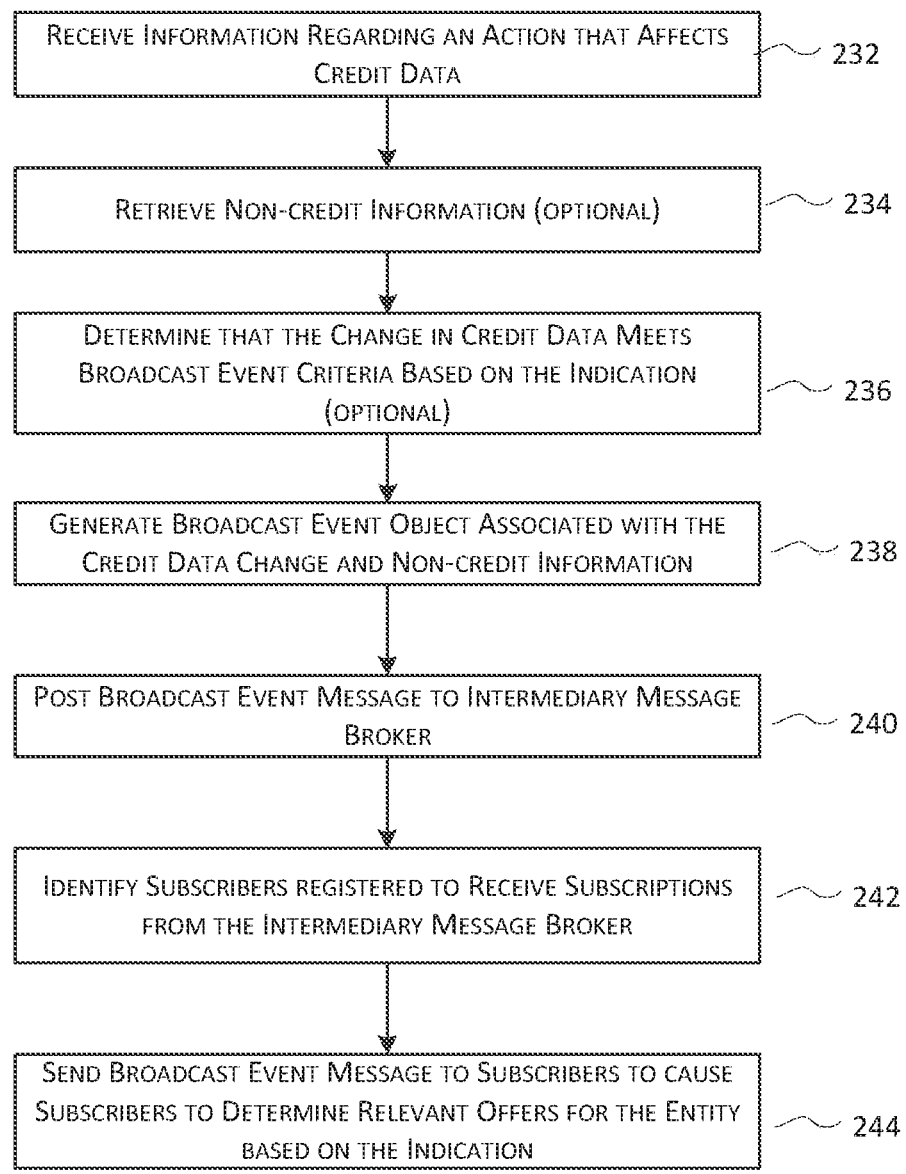
FIG. 2B is a flowchart illustrating one embodiment of a method for sending a broadcast event to subscribers based on an action that affects credit data.

FIG. 2B is a flowchart illustrating one embodiment of a method for sending a broadcast event message to subscribers based on an action affecting credit data (such as paying off debt), as described in FIG. 1B. The illustrative method may be implemented by a notification system, such as the notification system 150. In some embodiments, the notification system 150 may include an enterprise service bus 155 that implements some of the steps of the method illustrated in FIG. 2A. The illustrative method begins at block 232, where the notification system 150 receives information on an action that affects credit data. As discussed above, an individual may pay off a debt owed to a service or product provider 102. As used in the illustrated example, the underlying vendor or service provider 102 that submitted the change to the credit bureau 120 will be referred to as the reporting entity. In other embodiments, the notification system 150 may receive the indication related to a change, update, or action that affects credit data from an entity other than the credit bureau 120, such as a subscriber 105, a financial institution 104, a third party vendor 103, or other entity.

Once the notification system 150 receives the indication related to a requesting entity's request for credit data, the method proceeds to block 234, similar to block 214, where the notification system 150 accesses information associated with the identified consumer. The information can include personal identification information of the individual, transaction data, sociodemographic information, preferences, browser history, and/or any other information relevant to the consumer. For example, the notification system 150 may retrieve contact information from one or more data stores based on a determined match between the consumer identification information included in the request for credit data and contact information associated with a number of different consumers. The contact information retrieved may include, for example, one or more of an e-mail address, phone number, address, IP address, a user account name associated with enrollment in a monitoring service, etc.

At block 236, the notification system 150 may, in some embodiments, determine if the information regarding the action that affects credit data meets an event broadcast criteria. The notification system may generate a broadcast event object based on criteria relating to the individual, the requesting entity, the action affecting credit data, and the like. For example, the broadcast event criteria may include a threshold or a particular change to the credit data (e.g. an increase of 50 points to the credit score) that one or more subscribers have previously indicated an interest in being notified about.

At block 238, the notification system 150 generates a broadcast event object associated with the information on the action that affects the credit data and other non-credit information (e.g. information on the requesting entity, information on the consumer), and, at block 240, posts the broadcast event object to an intermediary message broker. The enterprise service bus 155 identifies subscribers registered to receive subscriptions from the intermediary message broker at block 242, and at block 244, the notification system 150 transmits the broadcast event object to subscribers to cause the subscribers to determine relevant offers for the entity based on the information on the action that affects credit data. Then, the subscribers can transmit a notification or alert to the consumer using one or more delivery mediums according to the contact information retrieved. In some embodiments, the blocks of FIG. 2B may all be performed substantially in real time (such as within seconds or milliseconds, in one embodiment) with respect to the information being received at block 232.

FIG. 3A illustrates a notification system 150 in communication with various systems, according to one embodiment. As illustrated, the various systems are in communication via network 160, which may be one or more of a LAN, WAN, and/or the Internet, for example. As illustrated, the notification system 150 is in communication with a consumer computing device 130. The notification system 150 may receive request for credit data from a credit bureau 120, which may provide the basis for the notification system 150 to generate and deliver an alert to one or more entities (such as third party vendor 103, financial institution 104, and/or subscriber 105). Alternatively or additionally, the notification system 150 may receive notification of a request for credit data for a given consumer from an entity (e.g. third party vendor 103, financial institution 104, or subscriber 105), which may be a basis for an alert to be delivered to the consumer, in some embodiments. As will be appreciated, the alert delivery device may be in communication with credit bureaus, a number of other alert providers, vendors, service providers, and consumer devices not illustrated in FIG. 3A.

In the illustrated embodiment, a notification system 150, which includes an enterprise service bus 155, a services registry 310, a services orchestration 320, a generic score monitoring listener 330, and a score-able events listener 340, is in communication with a network 160 and various systems are also in communication with the network 160. The notification system 150 may be used to implement systems and methods described herein. For example, the notification system 150 may be associated with an event generator that causes an event to be broadcasted to another entity (e.g. third party vendor 103, financial institution 104, and/or subscriber 105) to deliver a notification or alerts to a user. The alert and/or notification can additionally or alternatively be performed by the notification system 150. In other embodiments, a credit bureau, third party vendor 103, financial institution 104, subscriber 105, and/or other third-party system may include a computing system that includes components of notification system 150.

The notification system 150 may include, for example, a personal computer that is IBM, Macintosh, or Linux/Unix compatible or a server or workstation. In one embodiment, the notification system 150 comprises a server, a laptop computer, a cell phone, a personal digital assistant, a kiosk, or an audio player, for example. In one embodiment, the exemplary notification system 150 includes one or more central processing unit ("CPU") (not shown), which may each include a conventional or proprietary microprocessor. The computing system 700 further includes one or more memory (not shown), such as random access memory ("RAM") for temporary storage of information, one or more read only memory ("ROM") for permanent storage of information, and one or more mass storage device (not shown), such as a hard drive, diskette, solid state drive, or optical media storage device. Typically, the modules of the notification system 150 are connected to the computer using a standard based bus system (not shown). In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of notification system 150 may be combined into fewer components and modules or further separated into additional components and modules.

The notification system 150 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the notification system 150 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary notification system 150 may include one or more commonly available input/output (I/O) devices and interfaces (not shown), such as a keyboard, mouse, touchpad, and printer. In one embodiment, the I/O devices and interfaces (not shown) include one or more display devices, such as a monitor, that allows the visual presentation of data to a user. More particularly, a display device provides for the presentation of GUIs, application software data, and multimedia presentations, for example.

In the embodiment of FIG. 3A, the I/O devices and interfaces provide a communication interface to various external devices. In the illustrated embodiment, the notification system 150 is electronically coupled to a network 160, which comprises one or more of a LAN, WAN, and/or the Internet, for example, via a wired, wireless, or combination of wired and wireless, communication link. The network 160 communicates with various computing devices and/or other electronic devices via wired or wireless communication links.

According to FIG. 3A, information is provided to the notification system 150 over the network 160 from one or more data sources including, for example, the credit bureau 120, or other entities (e.g. third party vendor 103, financial institution 104, and/or subscriber 105). The information supplied by the various data sources may include a request for credit information such as credit data, personal information, application information, and/or other like data, notification of a request for credit information, or information on the requesting entity or the purpose for the request, for example. In addition to the devices that are illustrated in FIG. 3A, the network 160 may communicate with other data sources or other computing devices, such as a requesting entity 102. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

A consumer computing device 130 may be connected to the network 160 and used by a user to receive and respond to alerts provided by the notification system 150. The consumer computing device 130 may be a desktop computer, a mobile computer, or any other mobile device such as a mobile phone or other similar handheld computing devices. In some embodiments, a consumer can be a subscriber. For example, a consumer may subscribe to receive broadcast event messages from the notification system 150 on a consumer computing device 130.

In the embodiment of FIG. 3A, the notification system 150 also includes an enterprise service bus 155, a services registry 310, a services orchestration 320, a generic score monitoring listener 330, and a scorable events listener 340 that may be stored in the mass storage device as executable software code that is executed by the CPU. This components or modules may include, by way of example, software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 3A, the notification system 150 is configured to execute the enterprise service bus 155, a services registry 310, a services orchestration 320, a generic score monitoring listener 330, and a scorable events listener 340 in order to receive indication of a request for credit information or other underlying action or occurrence, generate event objects and messages, transmit broadcast event messages to other entities (e.g. third party vendor 103, financial institution 104, and/or subscriber 105), receive feedback from consumers regarding provided alerts, and/or other functionality described elsewhere in this specification.

The notification system 150 may include an enterprise service bus 155 that includes several process clusters (process cluster 1 302, process cluster 2 304, process cluster 3 306) to process services related to the notification system 150. The notification system 150 may also include a services registry 310 that is used to publish or post events to the intermediary message broker. In some embodiments, the service registry stores a catalog or index of events that the subscriber can access to select event subscriptions. The catalog of events may include a grouping of event types or may include an a la carte selection of different listings of events. For example, a new inquiry for a credit file may be an event type, and may publish to any subscribers who are interested in a new inquiry. Account level events may be another example of an event type, where account level events may include changes to account information (e.g. balance updates), adding an authorized user, opening/closing an account, and the like. Depending on the embodiment, the subscriber can subscribe to event types on various levels of granularity, such as subscribing generally to "account level events" as well as subscribing to individual account level events, such as one or more of those noted above. In some embodiments, each subscriber has associated access rights that identify types of events, sets of consumers, and/or other criteria required for that subscriber to enroll for notifications of particular events. For example, a financial institution may be limited to subscribing to events for that financial institutions customers. In some embodiments, each subscriber must have a "permissible purpose" under applicable Fair Credit Reporting Act (FCRA) regulations to access credit data of consumers associated with subscribed events.

The intermediary message broker (also referred to as the services orchestration 320, or bus) may also be included in the notification system 150, used to broker messages, and perform mediation and transformation of the events. The services orchestration 320 may use EBS, other middle layer technology, data streaming, or other technology that is able to recognize events and publish events to subscribers to the event.

For example, the mediation and transformation of the events may include changing the payload to the format that the subscriber 105 has enrolled in. In some embodiments, the mediation and transformation may also include changing payload formats for consumer computing devices that the subscribers 105 will send alerts and notifications to. The mediation and transformation can change the payload to a text file to send as a text message or format the message to fit in an application of a mobile device. The notification system 150 may also include generic score monitoring listener 330 (also referred to as a custom score listener) that may be created for subscribers that request to listen to a score event (e.g. listen to score changes and have the ability to select score ranges to tune into). The notification system 150 may connect to one or more subscriber systems for decisioning services based on the credit data. The notification system 150 may also include a score-able events listener 340 that may be used to listen to real time events such as hard inquiries, credit card payments, etc. The score-able events may flow into a scoring process that invokes a credit score calculator, creates a payload containing consumer identification and an updated credit score, and posts the score event back onto the bus.

While an enterprise service bus is often used as an example herein, other forms of middleware may be used in addition to or instead of an ESB, in some embodiments, or data streaming technology may be utilized. Middleware may include any hardware and/or software suitably configured to facilitate communications and/or process transactions between disparate computing systems. Middleware may be implemented through commercially available hardware and/or software, through custom hardware and/or software components, or through a combination thereof. Middleware may reside in a variety of configurations (e.g. as a part of the notification system 150), may exist as a standalone system, or may be a software component residing on the Internet server. Middleware may be configured to process transactions between the various components of a notification system 150 and any number of internal or external systems for any of the purposes disclosed herein. In various embodiments, where more than one notification system 150 components are dispersed across a network, middleware may be used to carry messages between components. These messages could be organized in any logical manner. WebSphere MQ™ (formerly MQSeries) by IBM, Inc. (Armonk, N.Y.) is an example of a commercially available middleware product. An Enterprise Service Bus ("ESB") application is another example of middleware.

The credit bureau system 120 may include a credit data store 121 that contains credit data for individuals, businesses, and/or entities. The credit bureau 120 may include a batch processing system 350 that processes the individual modules in batches, where the batches may include: inquiry updates 352, public record updates 354, single updates 360, trade updates 356, changes of addresses 358 or other personal information, consumer updates 362, a PIN merge 364, a PIN split 366, and/or other processes 368. In other embodiments, the credit bureau processes these modules in substantial real time upon receipt of a change, request, or other action or information that would initiate an action performed with respect to any one of these modules.

A consumer may include any individual, user, business, entity, government organization, software and/or hardware that interacts with a system to receive offers for products or services. A consumer computing device 130 may include any hardware and/or software suitably configured to facilitate input, receipt and/or review of information relating to alerts, notifications, and the other means of communication that may include information on the consumer, such as credit data and/or offers for products and services.

A consumer computing device 130 may include any device (e.g., personal computer) which communicates (in any manner discussed herein) via a network. The consumer computing device 130 may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, and/or the like.

As used herein, the term "network" (or similar terms) shall include any electronic communications means which incorporates both hardware and software components of such. Communication among the parties may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), virtual private network ("VPN"), networked or linked devices, keyboard, mouse and/or any suitable communication or data input modality. Moreover, the network 160 may also be implemented using IPX, Appletalk, IP-6, NetBIOS, OSI, any tunneling protocol (e.g. IPsec), or any number of existing or future protocols.

Figure 3B:
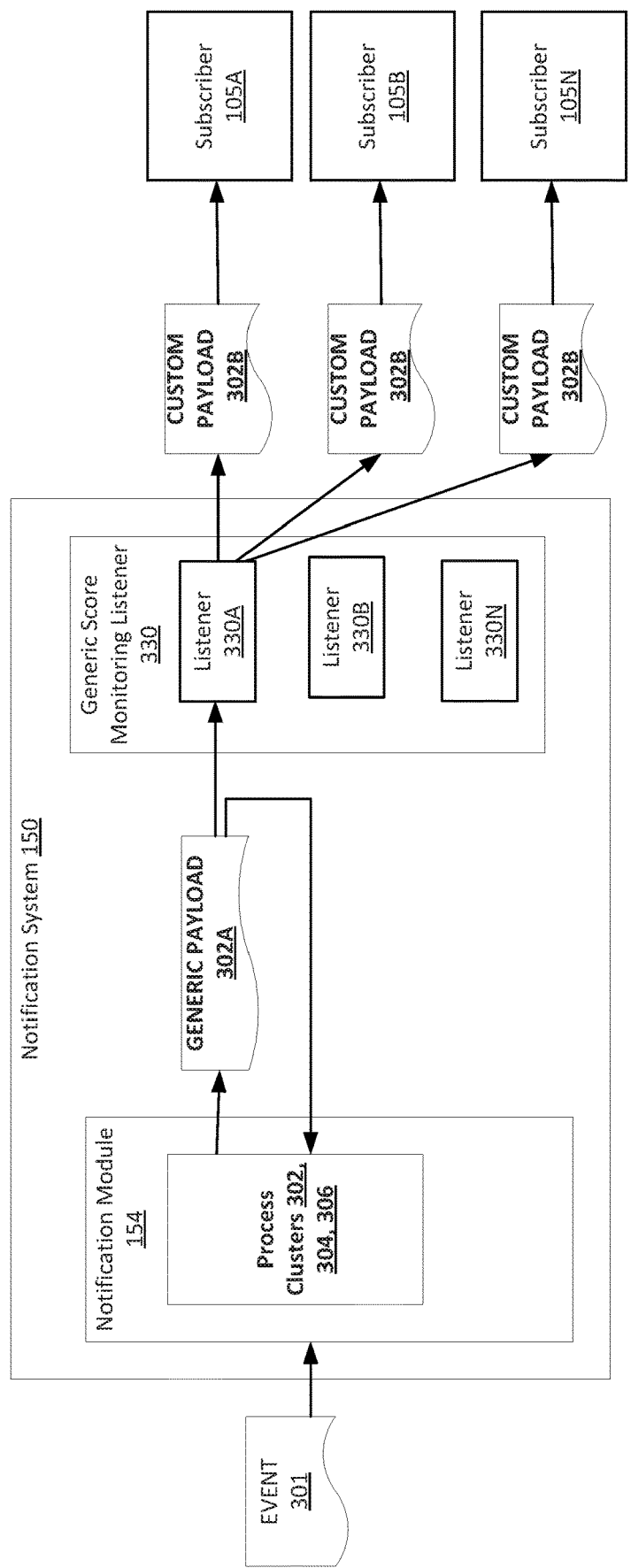
FIG. 3B is a flow diagram illustrating an example embodiment of a notification system that outputs custom payloads to multiple subscribers.

FIG. 3B is a flow diagram illustrating an example embodiment of a notification system 150 that outputs custom payloads 302B to multiple subscribers 105A, 105B, 105N (herein referred to as subscribers 105). As discussed above, in some embodiments the services registry 310 allows subscribers 105 to indicate which of multiple credit events 301 the particular subscriber 105 would like to receive. Thus, for a particular credit event type (or other credit event criteria that may be identified by a potential subscriber 105), multiple subscribers 105 may request receipt of matching events 301 (or custom payloads that are generated based on the matching events). In FIG. 3B, the notification system 150 receives an event 301 that executes one or more process clusters 302, 304,306 to generate a generic payload 302A. Then, the generic payload 302A is provided to the notification module 154 (or some other component such as data stream) as an event, such that the notification module 154 may trigger one or more additional process clusters 302, 304, 306 based on receipt of the generic payload event. Additionally, the generic payload 302A is processed by one or more listeners 330A, 330B, 330N (herein referred to as listener 330A) to determine if any custom payloads 302B should be generated. As discussed elsewhere herein, each of the listeners 330 include criteria, rules, requirements, etc. for identifying particular events, which will then be processed to generate corresponding custom payloads 302.

In the example of FIG. 3B, the listener 330A determines that the generic payload 302A matches criteria for generating a custom payload 302B by the listener 330A. One or more additional listeners may also generate custom payloads based on matching the listener criteria to the generic payload 302A. The listener 330A then generates the custom payload 302B and transmits to any subscribers 105 that have subscribed to receive that custom payload 302B. In the example of FIG. 3B, the custom payload 302B is transmitted to each of multiple subscribers, including 105A, 105B, and 105N (which signifies that any amount of subscribers may receive that same custom payload 302B). As an example application of FIG. 3B, the event 301 may comprise an indication of a late payment that is received from a bank on a consumer's credit card account. The generic payload 302A may be triggered based on a rule that indicates a new credit score should be calculated when any of a certain group of changes are identified, including a late payment. Thus, the listener 330 A may then generate the particular consumer's credit score as the custom payload 302B and transmit the newly calculated credit score to multiple subscribers. Furthermore, each subscriber 105A, 105B, and 105N may receive the same custom payload 302B. In other embodiments, each subscriber 105A, 105B, and 105N may request a payload that is customized to the subscriber 105A, 105B, and 105N (e.g. different formats, varying levels of information). The payload can also be published as an application program interface (API) or implemented as an HTTP direct push.

Figure 3C:
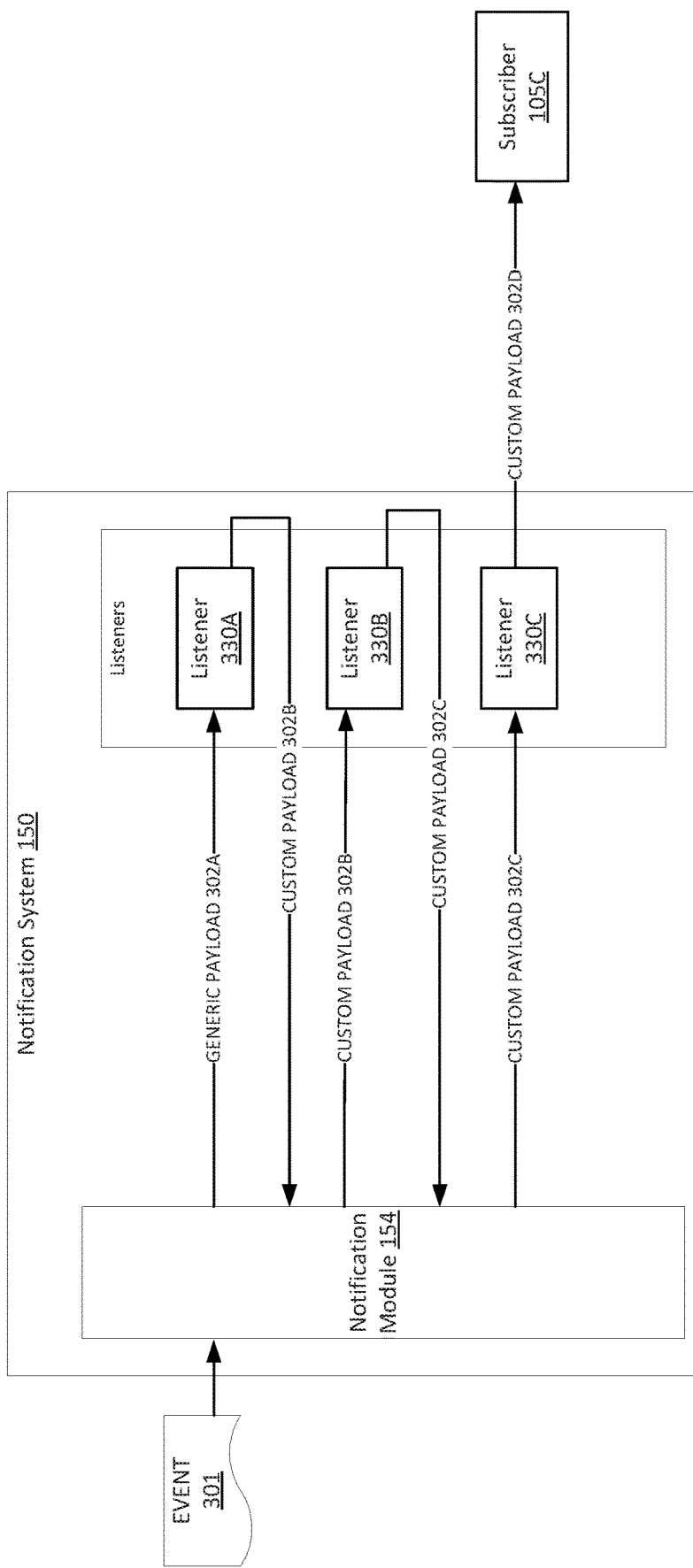
FIG. 3C is a flow diagram illustrating the example notification system executing a multi-phase processing of an event in order to generate a custom payload for a subscriber.

FIG. 3C is a flow diagram illustrating the example notification system 150 executing a multi-phase processing of an event in order to generate a custom payload for a subscriber. In this example, the event 301 is initially transformed into a generic payload 302A which is detected by the listener 330A. The listener 330A then transforms the generic payload 302A into a custom payload 302B. In some embodiments, the custom payload 302B may be transmitted to one or more subscribers (not shown in this figure). In this example, the custom payload 302B is provided back to the notification module 154 (or some other component of the notification system 150 such as a data stream component), such as in the form of an event. Listener 330B then identifies custom payload 302B as matching that listeners processing criteria. Thus, Listener 330B generates custom payload 302C which, again, is provided back to the notification module 154. The custom payload 302C is identified by listener 330C as matching that listener's criteria, which generates custom payload 302D for transmission to a subscriber 105C. As one example of the various payloads, the generic payload 302A may be a credit inquiry, payment on a credit account, balance change, late fee, etc. The custom payload 302B may be a credit score, such as the Experian Plus credit score, the custom payload 302C may be a customer specific risk score (e.g., a lender-specific risk score), and payload 302D may include prequalification results that are based at least on the lender-specific risk score. Advantageously, each of the custom payloads may be identified by multiple listeners and processed into multiple different custom payloads. Thus, a single event 301 may advantageously trigger generation of one or more custom payloads and transmission of one or more different custom payloads to a plurality of subscribers, all in substantially real-time in response to the notification system 150 receiving the event 301. For example, the prequalification offers may be provided to the subscriber 105C, such as an automobile lender, while the consumer is at the point of sale, e.g. the automobile dealership, in response to the consumer paying off a credit card balance to increase the consumer's credit score and chances of the consumer qualifying for an automobile loan. In this example, the listeners 330A, 330B, 330C are internal subscribers to the notification system 150 and the subscriber 105C is external to the notification system 150. However, it is appreciated that listeners 330A, 330B, 330C and the subscribers 105 may be external, internal, or a combination of internal and external to the notification system 150.

Figure 3D:
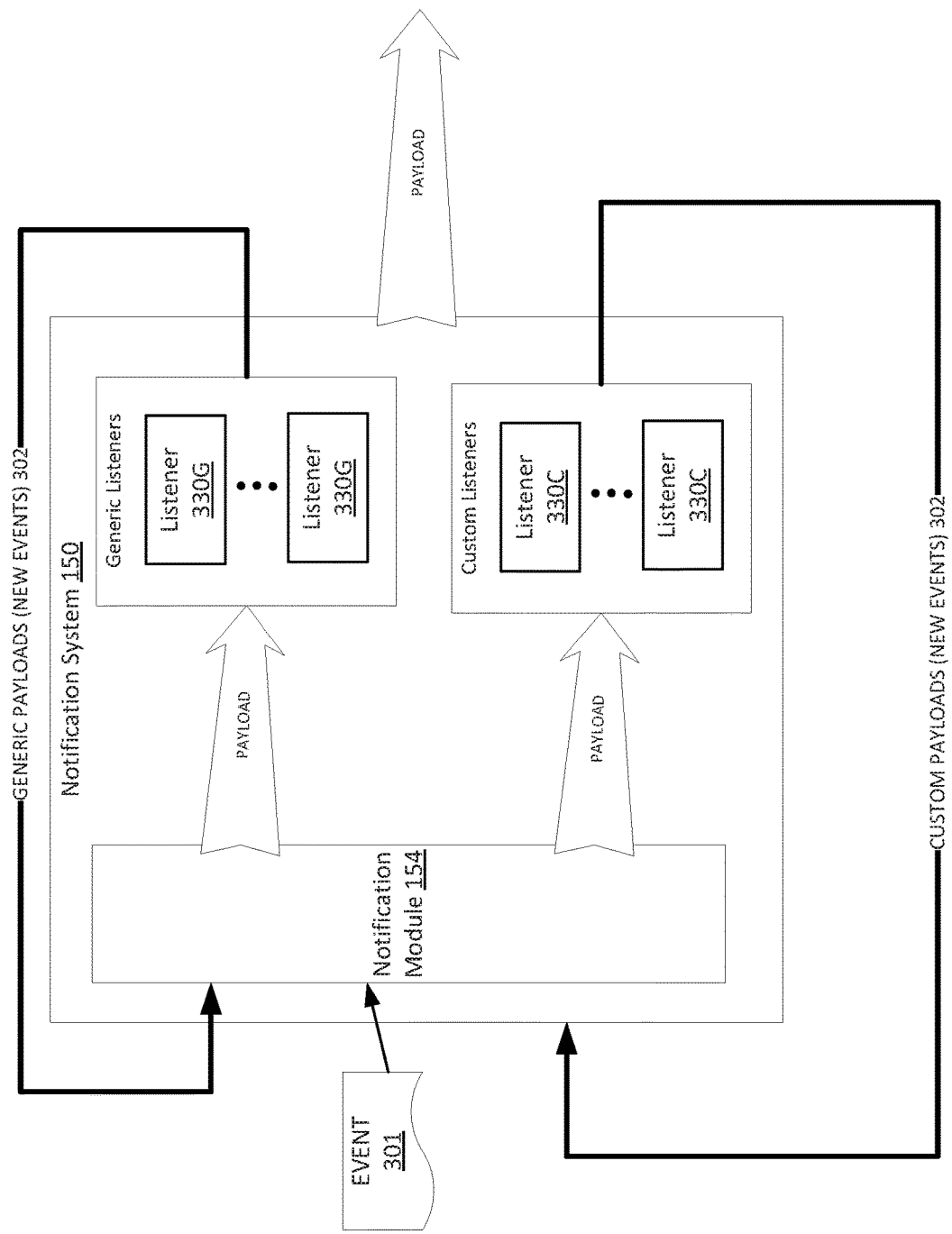
FIG. 3D is a flow diagram illustrating an example processing method that may be performed by the notification system to reduce processing cycles required to identify matching listeners from a large set of multiple available listeners (e.g., hundreds, thousands, or millions of different listeners).

FIG. 3D is a flow diagram illustrating an example processing method that may be performed by the notification system 150 to reduce processing cycles required to identify matching listeners from a large set of multiple available listeners (e.g., hundreds, thousands, or millions of different listeners). As discussed above, the listeners may include generic listeners 330G which are triggered when generic payloads are placed on the bus, and custom listeners 330C, which are triggered when custom payloads are placed on the bus. In this embodiment, the notification module 154, or some other component of the notification system 150 (such as data stream), determines whether an event 301 comprises a generic payload or a custom payload (e.g., whether the event is received from a financial institution or from an internal listener) and provides the payload to only a set of corresponding listeners. For example, any new events or payloads received by the notification module 154 would be analyzed by the generic listeners 330G. Similarly, any custom payloads received by the notification module 154 are processed by the custom listeners 330C. In this way, processing of incoming events is optimized by reducing processing power required and increasing speed at which events may be processed.

Figure 3E:
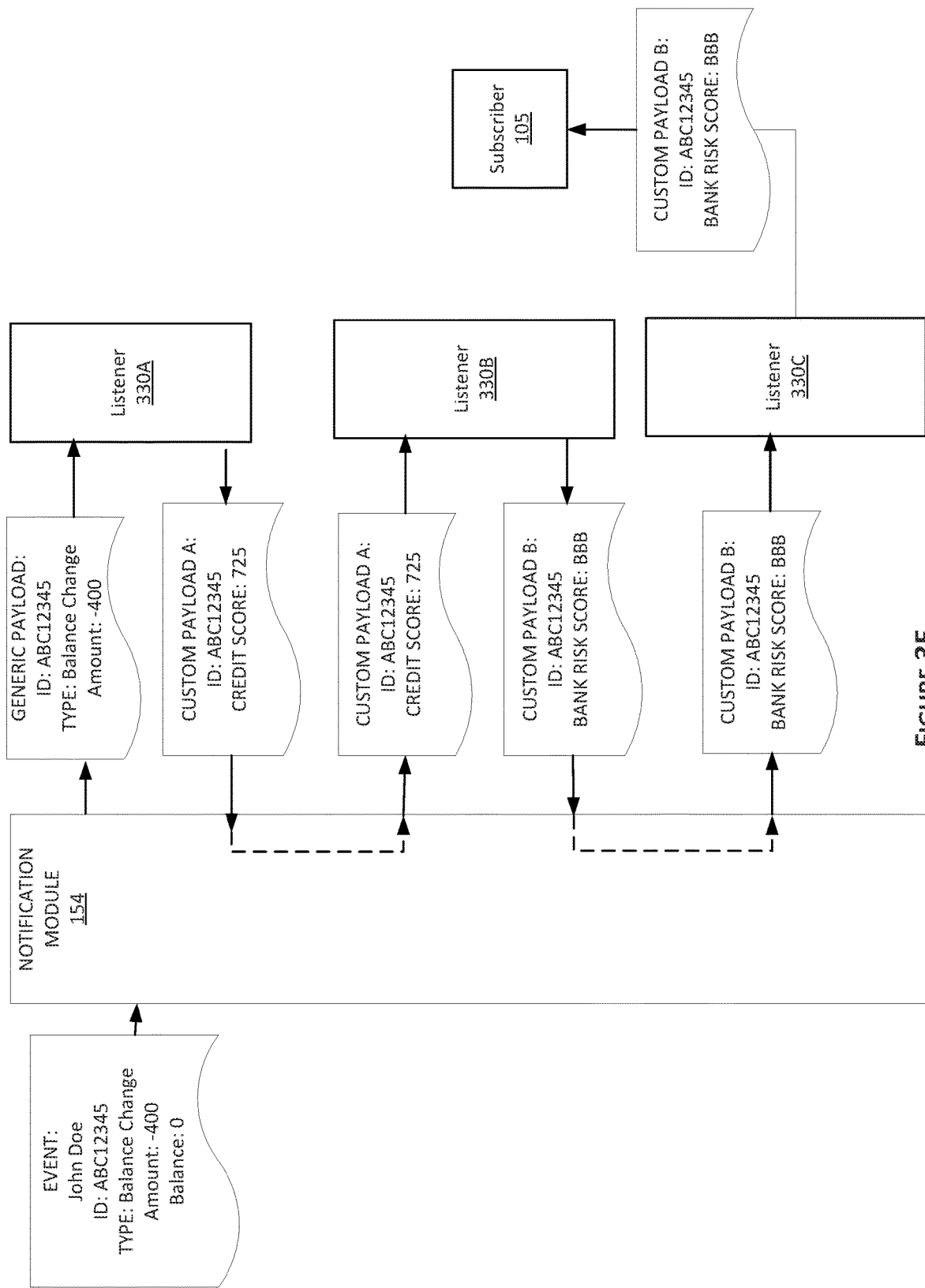
FIG. 3E is a flow diagram illustrating example event/payload data that may be transformed in various ways to provide a custom payload to a subscriber.

FIG. 3E is a flow diagram illustrating example event/payload data that may be transformed in various ways to provide a payload to a subscriber. In this example, the event comprises information regarding a balance change on an account owned by John Doe in the amount of –$400, and resulting in an account balance of zero dollars. In this example, the notification module 154 makes the payload available to the listeners, or to only a set of generic listeners in some embodiments. In the example of FIG. 3E, a listener 330A is illustrated as triggering generation of a payload in response to the event, but as discussed above, multiple listeners may be triggered in response to the same payload. In this example, the custom payload A comprises a credit score of 725 for John Doe, who is identified only by an alphanumeric identifier in this example payload. As shown, that payload A is made available to the listeners by the notification module 154 and, in this example, triggers listener 330B, which generates a bank-specific risk score for John Doe of BBB. For example, the bank-specific risk score may be calculated based on an algorithm from a particular bank, such as the subscriber 105 illustrated in FIG. 3E. Next, the payload B is recognized by the listener 330C, which transmits the payload B, or in some embodiments generates a new payload that includes additional information indicated by the subscriber 105, to the subscriber 105. As noted above, this process advantageously is performed in real-time or near real-time in response to receiving of the original balance change event by the notification module 154.

In some embodiments, the payloads are in an "atomic format" that provides minimal information regarding the event and any calculated custom data (e.g., calculated scores). For example, as shown in FIG. 3E, the custom payload B that is transmitted to the subscriber 105 includes only two data elements, a consumer identifier and a calculated bank risk score associated with that consumer identifier. Provision of only this minimal level of information allows the system to process larger amounts of events and more quickly and efficiently transmit payloads to subscribers, which can help provide distribution to a wider range of listeners and/or subscribers. The small payloads may be used by the subscribers to then provide alerts and notifications to consumer computing devices 130 that are also small in payload size to further improve speed and efficiency of the dissemination of information back to the individual, thus supporting the implementation of a response in substantially real-time. Thus, the payload may not need to send a full credit file, or a substantial portion thereof, but may only need to transmit the information the subscriber is interested in. Then, if the subscriber is further interested, the subscriber may request for more credit data or a full credit file for the individual.

FIGS. 3F and 3G are example payloads that may be provided to a subscriber. The payload in FIG. 3F illustrates a version number for the payload, a sourceID that may be used as an identifier for the transmitter of the payload, a UniqueTransactionID used to identify the individual, and an event type of 2. The event may trigger a listener based on the EventType matching an event type to which a subscriber has subscribed. For example, event type 2 may refer to a change in address. Thus, the payload includes information on the address of the individual. Furthermore, the payload may include a CompanyID that may indicate the source of the change of address for the individual (e.g. the individual requests a change of address in a company associated with the identifier NationalB). FIG. 3G is another example of a payload, where a consumer identifier is sent, and the event type is a 4. In this example, this event type references a change in credit score. Thus, the payload also transmits the score of 733, and a change in the score of +25 points. FIG. 3H is another example of a payload including a CreditBureauSubscriberID that may be used to identify the individual associated with the credit data using a credit bureau identifier of the individual. In this example, the EventType is "I", which indicates a credit inquiry. Thus, subscribers enrolled to receive alerts on credit inquiries may receive a payload include data similar to what is illustrated in example 3H. Information identifying the entity that submitted the inquiry request may be included as well, such as the name and address.

As a further example of event and alert content (e.g., the payload of these communications), below are some example payloads. These examples do not limit the type or content of data included in payloads in other embodiments. First below is an example of an alert payload, such as the data that may be received from a credit bureau by the notification system indicating that an inquiry request was received for the individual, John Doe:

{"Id":"XYZ23424242342323",
"CompanyId":"3323",
"PortfolioId":"11",
"CampaignId":"42111",
"VersionNum":"001"},
"EventInfo":{"EventType":"X",
"ExperianConsumerIdentifier":"V",
"EventDisplayCode":"SECUR",
"MonitoredAccount":"PIN00432425243242",
"ConsumerStatementIndicator":"A",
"FactaCode":"26",
"FCRAAttr":"00 0100"}, "CustomerSuppliedName":{"Name":{"FirstName": "JOHN","MiddleName":"D",
"Surname":"DOE",
"SecondSurname":"DOETWO","Gen":"D"}},
"CustomerSuppliedData":"CUSTOMER SUPPLIED DATA PRESENT",
"BestAddressInformation":{"PrimaryStreetId":"1111",
"PreDirectional": null,
"StreetName":"STREET",
"PostDirectional":null,
"StreetSuffix":"ST",
"UnitType":null,
"UnitID":null,
"City":"DOETOWN",
"State":"MN",
"Zip":"111111",
"NonStandardAddress":null},
"SecurityAlertEventInformation":{"SecurityAlertDate": "234234234",
"SecurityAlertType":"26",
"SecurityAlertText":"26& 2016-11-22 3999997 ID SECURITY ALERT: FRAUDULENT APPLICATIONS MAY BE SUBMITTED IN MY NAME OR MY IDENTITY MAY HAVE BEEN USED WITHOUT MY CONSENT TO FRAUDULENTLY OBTAIN GOODS OR SERVICES. DO NOT EXTEND CREDIT WITHOUT FIRST VERIFYING THE IDENTITY OF THE APPLICANT. THIS SECURITY ALERT WILL BE MAINTAINED FOR 90 DAYS BEGINNING 07-10-15."}.
"NumOfStatements":"0001",
"ConsumerStatement":[{"StatementIndicator":"A",
"StatementType":"26",
"SubscriberName":null,
"AccountReferenceNumber":null,
"DateOpenedFiled": null,
"AcctCond":null,
"Status":null,
"StatementText":"26& 2016-11-22 3999997 ID SECURITY ALERT: FRAUDULENT APPLICATIONS MAY BE SUBMITTED IN MY NAME OR MY IDENTITY MAY HAVE BEEN USED WITHOUT MY CONSENT TO FRAUDULENTLY OBTAIN GOODS OR SERVICES. DO NOT EXTEND CREDIT WITHOUT FIRST VERIFYING THE IDENTITY OF THE APPLICANT. THIS SECURITY ALERT WILL BE MAINTAINED FOR 90 DAYS BEGINNING 07-10-15."}]}

Next, below is an example of a custom data package that may be generated by the notification system and transmitted to subscribers to inquiry requests (for a group of individuals that includes John Doe), such as in an HTTP data package or via an API.

{"Id":"RTE000022421000110000008357T60023001",
"CompanyId":"224210",
"PortfolioId":"11",
"CampaignId":"8357",
"VersionNum":"001"},
"EventInfo":{"EventType":"I",
"ExperianConsumerIdentifier":"KLJFOI34343DSFAD",
"EventDisplayCode":"INSTI",
"MonitoredAccount":"POSITIVE9227",
"ConsumerStatementIndicator:null,
"FCRAAttr":"00 0601"},
"CustomerSuppliedName":{"Name":{"FirstName": "JOHN",
"MiddleName":"D", "Surname":"DOE",
"SecondSurname":null,
"Gen": null}},
"CustomerSuppliedData": null,
"BestAddressInformation":{"PrimaryStreetId":"1111",
"PreDirectional": null,
"StreetName":"STREET",
"PostDirectional":null,
"UnitType":null,
"UnitID":null,
"City":"DOETOWN",
"State":MN",
"Zip":"111111",
"NonStandardAddress":null},
"InquiryEventInformation":{"KOB":"IZ",
"PurposeType":"OA",
"InquiryDate":"2016-11-22"}}

Below is an example custom payload that may be transmitted to a subscriber, such as a credit access control system associated with a credit bureau, to request freezing of an individual's credit file:
{"RTTRG":{"RecordType":"T","VersionNum":"2.00",
"UniqueTransactionId":"65465464536546543",
"EventType":"2",
"SystemID":"CAP",
"ReturnedPin":" ",
"LoggingPin":251369794,
"OptOut":" ",
"OnsInd":" ",
"FCRAAttr":" ",
"InquiryPre":" ",
"CrsReferralPre":" "},
"RTFRZ":{
"NCACId":"5445343",
"Type":"FREEZE",
"CapId":"4534543543543",
"StartDate":"2016-11-22",
"AdditionalText":"A security freeze has been successfully placed on your credit report."}}

Below is an example event payload that may be received by the notification system, indicating that the security freeze has been placed on the individuals credit file:
{"Id":"RTE000022421000110000008357072220160-01753000003655",
"TransactionInfo":{"EventDeliveryDate":"2016-11-22",
"EventDeliveryTime":"001753",
"CompanyId":"45454",
"PortfolioId":"11",
"CampaignId":"8357",
"VersionNum":"001"},
"EventInfo":{"EventType":"2",
"ExperianConsumerIdentifier":"235445243DF-GSDFG3456345",
"EventDisplayCode":"FRTHL",
"MonitoredAccount":"PIN45345243",
"ConsumerStatementIndicator:null},
"CustomerSuppliedName":{"Name":{"FirstName":"JANE",
"MiddleName":null,
"Surname":"DOE",
"SecondSurname":null,
"Gen": null}},
"CustomerSuppliedData": null,
"FreezeEventInformation":{"NCACId":
"454545454545",
"Type":"FREEZE",
"CapId":"45454545454",
"StartDate":"2016-11-22",
"AdditionalText":"A security freeze has been successfully placed on your credit report." }}

FIG. 4A is an illustrative representation of a table 400 associating credit data with other information, such as information from the inquiry for credit data, along with corresponding personal information for the individual. The data represented in illustrative table 400 may be stored in one or more data stores accessible to the notification system 150. The data may be determined and stored, for example, based on information provided by each financial institution to the notification system 150, either in bulk prior to sending individual requests for credit data or in a piecemeal fashion as requests for credit data or other requests are processed by the notification system 150. In some embodiments, when the notification system 150 receives indications of requests for credit data, the notification system 150 may consult the data in table 400 to determine information on the consumer and the request for credit data to be used in generating an event to broadcast to the other entities.

Example table 400 includes columns indicating the name of an individual 420, consumer personal identification information 422, other consumer information 424 that may be relevant to the alert, credit information 426 of the individual, and credit request history 428 for the individual or related information. This information can be gathered from one or more of the credit data store 121, the non-credit consumer information data store 112, and/or other database. The table of information may be stored in separate tables of information located within different entities, but accessible by the notification system 150.

As illustrated in table 400, row 402 includes information associated with Jordan Lee, 404 for John Doe, and 406 Jim Smith. Column 422 includes consumer PID for the three individuals, which may be relevant for the notification system to send to the subscriber when the subscriber is generating the alert to send to the individual, or event object to generate by the notification system with respect to the individual's action(s). For example, the consumer PID may include the contact information to send the alert, such as a phone number or email address.

Column 424 may include consumer information and column 426 credit data regarding the three individuals. For example, for Jordan Lee, there may be information about his income that may be relevant to an alert to send based on the request for credit data. For example, if it is known that Jordan Lee's income is $422,000 and his credit score is above a certain threshold, then the notification system 150 can use this information to determine an appropriate event for the request for credit data (e.g. an event for lenders that may have certain loans at better rates for individuals with high income and good credit score than the loans provided by the lender associated with the requesting entity).

In another example, John Doe in row 404 has been watching a lot of online videos and a large portion of his browser history is direct to boat purchases and price comparisons around $70,000 in column 424, and the credit request history includes a requested loan for $70,000, which may indicate his decision to purchase a boat, which may be used by the notification system 150 to generate an event object. In row 406, Jim Smith recently purchased a stroller as shown in column 424, opened several credit cards in a short period of time and has many purchases directed to childcare. The notification system 150 may generate an event object based on these types of information (e.g. identifies entities or subscribers to broadcast event information that may have products or services related to products or services that the user is currently seeking). A subscriber may receive an event message regarding John Doe and suggest better loan rates based on a discount for loans for boat purchases. A credit card supplier may offer a credit card with a high balance and low interest rate to suggest Jim Smith to consolidate his total debt of $13,455 into a single credit card.

FIG. 4B is an illustrative representation of a table associating financial institutions with vendors and/or service providers, along with corresponding contact and other information. Column 470 shows the identifier for the vendor/service provider, shown in column 472. Column 474 shows contact information for the vendor/service provider. The vendor/service provider is linked with a financial institution 476.

The requesting entity can be associated with the request by matching data included in the request with data previously stored in table 450. In this manner, the notification system may quickly provide an alert to subscribers who may use the alert to send information to the consumer that includes additional information (such as the identity of the requesting entity) that was not necessarily included in the request for credit data itself. As illustrated in table 450, row 452 includes a financial entity identifier ("ABL5533") associated with the vendor "ABL Cable Co." In some embodiments, the identifier may be included in the request for credit data without any other indication of the identity of the product/service provider. The product/service provider is tied to the financial institution American Bank. The vendors for American Bank are identified as "ABL Cable Co." and "Quality Cellular Phones" in columns 452 and 454. The identifier may also be an identifier for a financial institution, which may have been the identifier included in the request for credit data. For example, the request for credit data may have been associated with an individual visiting BL Cable Co. (vendor of row 452), but the request for credit data may include the identifier 545AM1 associated with American Bank. In some embodiments, the requests for credit data from the vendor/service providers may include the vendor identifier associated with the requesting entity, such that the notification system can determine the name and contact information of the requesting entity by matching the vendor identifier in the request with data in table 450. As indicated in rows 452, 454, 456, the stored data associated with each vendor or service provider includes contact information, which may include multiple forms of contact information for a single vendor, such as one or more e-mail addresses and/or phone numbers. The stored information may also include contact information for the financial institution.

FIG. 5 is a block diagram of an example notification system in communication with various publishers and subscribers. The notification system includes a message QUEUE client that queues the messages as they come into the notification system, sends the messages to the notification module (or other middleware, data streaming, or other publish and subscribe technology), the notification module contains the catalog of events that the subscriber can enroll in, the services orchestration uses the USB to recognize events and publish events to subscribers to the event, and the subscriber or informal listener can receive such events.

The notification system may receive data to and/or send data to a variety of modules that may be internal, external, or a combination of both to the notification system. For the sake of discussion, the descriptions will be shown to be external to the notification system.

In some embodiments, the ecosystem includes Sending Contributing Data which are applications responsible for sending data from contributors into Credit Bureau that may affect credit data. The Sending Contributing Data can be both Subscriber and Publisher of Credit events actions to be sent through notification system.

In some embodiments, the ecosystem includes Consumer Disputes that is an application responsible for creation and management of consumer disputes (e.g. disputes reported to consumer call center either through Agents or through Webapps or API). The Consumer Disputes can be both subscriber and publisher of credit events actions to be sent through notification system.

In some embodiments, the ecosystem includes Data Furnishers (real time updates) that can be responsible for providing data to the bureau either through Real time, API, or Batch process.

In some embodiments, the ecosystem includes Freeze/block transactions that are transactions where specific data furnishes account information and status could be disputed. In some embodiments, the freeze/block transactions cannot be accessed. This transaction types may be publisher of events to the notification system that others can subscribe to.

In some embodiments, the ecosystem includes a Billing System that may be responsible for processing billing transactions from the system of records and feeding the records to a central billing system, which could be both a publisher or subscriber to the notification system.

In some embodiments, the ecosystem includes a Customer Master that may be responsible for maintaining customer information (e.g. maintaining credit files for individuals) and the products for which the individuals are authorized to use.

In some embodiments, the ecosystem includes Business Information Services that may be responsible for managing Business information related to credit data similar to a consumer information related to credit data. The Business Information Services can use the same underpinning notification infrastructure to perform subscription and publication of events.

In some embodiments, the ecosystem includes Decision Analytics that may be responsible for managing decisioning related products such modeling, aggregation, tools and fraud services. The ecosystem may also include an Event Transaction Analytics that is done at an event level (e.g. atomic payload level). The Event Transaction Analytics may also feed into the Decision Analytics for further processing and analysis at the macro level.

In some embodiments, the ecosystem includes a real time prescreen notification that may be responsible for receiving event notification that is related to a prescreen of customers. For example, events may be published to subscribers that would like to prescreen customers based on a certain credit criteria. The notification system may send event notifications to marketing services that may use the published event notifications to market to consumers. The notification system may send event notifications to external clients that may have interest in the published event notifications.

In some embodiments, the ecosystem includes the real-time event notification that can receive notification in real-time, or substantially real time. The real-time event notification may then be able to notify or alert the individual in real-time and empower the individual with information at the point of sale or during negotiation. In some embodiments, the ecosystem includes a real-time account review notification, where a business uses an existing relationship with the individual. For example, if an entity is notified of a new delinquency reported on one of their subscribers, the entity may take proactive action to mitigate risks while managing their accounts.

In some embodiments, the notification system may send events to a continuous scoring module that continuously listens to a particular score, such as changes to a credit score.

In some embodiments, the notification system may send event notifications through HTTP direct pushes, in continuous batches, through API services, and other modes of communication. In some embodiments, the ecosystem includes an event transaction enrichment which may be responsible for the ability to add enhancement in real time to an event. For example, upon closing a balance on a revolving account, the event can be enriched by further calculating a generic credit score or a custom model score. The event enhancement can be sent with or without the event in combination.

In some embodiments, the ecosystem includes a skip tracing notification, which notifies any changes to credit data from a collections perspective. For example, a new address for the consumer will be sent to the skip tracing notification.

In some embodiments, the ecosystem includes platforms that can deliver products such as prescreen or account monitoring. The ecosystem may also include products for commercial application, in a business-to-business context or directly to consumers. Furthermore, the ecosystem may also include platforms that allow consumers to share their own credit reports or other credit data to others, such as sharing credit reports with potential tenant screeners for renting.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 700, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. The methods may be executed on the computing devices in response to execution of software instructions or other executable code read from a tangible, non-transitory computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

Although this disclosure has been described in terms of certain example embodiments and applications, other embodiments and applications that are apparent to those of ordinary skill in the art, including embodiments and applications that do not provide all of the benefits described herein, are also within the scope of this disclosure.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

What is claimed is:

1. A computing system comprising:
an electronic data store configured to store credit data;
a first computing system comprising one or more computing devices, said computing system in communication with the electronic data store and configured to at least:
receive an indication of at least one of: a request for information regarding an individual submitted by a requesting entity or information about an action that affects the individual's credit data;
based at least in part on the indication, determine that the request for information meets one or more event broadcast criteria;

generate a broadcast event object, wherein the broadcast event object includes an event type and at least a portion of the indication of the request for information;

electronically post the generated broadcast event object to an enterprise service bus, wherein posting the generated broadcast event object triggers a plurality of listeners based on the event type, wherein the event type comprises at least one of: requesting for a loan, paying off a debt, or a credit inquiry, each of the plurality of listeners having access to the enterprise service bus and each associated with processing and/or reporting related to particular broadcast event objects to identify a plurality of subscribers registered to receive broadcast event objects from the enterprise service bus that relate to the event type, wherein the plurality of subscribers are computing systems associated with one or more entities other than the individual, the requesting entity, and the plurality of listeners; and send the broadcast event object to the identified subscribers, wherein at least one identified subscriber is configured to generate a message based on the broadcast event object and transmit the message directly to the individual.

2. The computing system of claim 1, wherein the identified subscribers receive the broadcast event object at substantially the same time as each other.

3. The system of claim 1, wherein the message is further based at least in part on information about the individual not included in the request for information.

4. The computing system of claim 1, wherein the request comprises at least one of: a request for a credit file, a credit status dispute, a credit freeze, a credit lock, a credit thaw, a credit lift, or a security event.

5. A computer-implemented notification method comprising:

receiving an indication of at least one of: a request for information regarding an individual has been submitted by a requesting entity or information about an action that affect credit data of the individual;

based at least in part on the indication, determine that the request for information meets one or more event broadcast criteria;

generate a broadcast event object associated with the indication, wherein the broadcast event object includes at least (a) data associated with the request for information regarding the individual, and (b) an indicator of an event type;

electronically post the broadcast event object to an enterprise service bus, wherein posting the broadcast event object triggers a plurality of listeners based on the event type, wherein the event type comprises at least one of: requesting for a loan, paying off a debt, or a credit inquiry;

identify subscribers registered to receive broadcast event objects from the enterprise service bus that relate to the event type; and send the broadcast event object to the identified subscribers, wherein receipt of the broadcast event object by at least one identified subscriber causes the at least one identified subscriber to generate a message based on the broadcast event object and send the message directly to the individual.

6. The method of claim 5, wherein the message includes suggestions of actions the individual can perform to improve the information requested by the requesting entity.

7. The method of claim 5, wherein the request comprises at least one of: a request for a credit file, a credit status dispute, a credit freeze, a credit lock, a credit thaw, a credit lift, or a security event.

8. The method of claim 5, wherein the indication is associated with a change in credit data, and the event broadcast criteria comprises whether the change in credit data meets a threshold value.

9. A computer-implemented notification method comprising:

receiving an indication of an action that affects credit information related to an entity;

generate a first broadcast event object associated with the credit information, wherein the first broadcast event object includes at least data associated with the update;

electronically post the generated first broadcast event object to an enterprise service bus, wherein posting the generated first broadcast event object triggers a plurality of listeners based on an event type, each of the plurality of listeners having access to the enterprise service bus and each associated with one or more of: processing or reporting related to particular broadcast event objects to identify a plurality of subscribers registered to receive broadcast event objects that relate to the event type associated with the indication, wherein the event type comprises at least one of: a request for a loan, paying off a debt, or a credit inquiry, wherein the plurality of subscribers include a first subscriber that comprises a first computing system associated with a second entity that is different than the entity and the listeners; and send the first broadcast event object to a first computing system of the first subscriber, wherein the broadcast event object causes the first computing system of the first subscriber to generate a message based on the broadcast event object and send the message directly to the individual.

10. The method of claim 9, wherein the request comprises at least one of: a request for credit information, a request for a credit file, a credit status dispute, a credit freeze, a credit lock, a credit thaw, a credit lift, or a security event.

11. The method of claim 9, further comprising:
receiving non-credit information related to the entity,
wherein the broadcast event is further associated with the non-credit information of the entity.

12. The method of claim 9, further comprising:
determine that the update to credit information meets one or more event broadcast criteria,
wherein broadcasting the first broadcast event object is in response to determining that the update to the credit information meets the one or more event broadcast criteria.

13. The method of claim 12, wherein the update comprises a change in a credit score, and the broadcast criteria comprises whether the change in the credit score meets a threshold value.

14. The method of claim 12, wherein the message includes suggestions the entity can perform to improve the credit information.

15. The method of claim 12, further comprising:
generating a second broadcast event object based on the first broadcast event object; and
broadcast the second broadcast event object to a subscriber.

16. The system of claim 1, wherein a listener of the plurality of listeners is configured to, in response to being executed by the first computing system, generate a first payload for a first subscriber and a second payload for a second subscriber, wherein the first payload is different than the second payload.

17. The system of claim 1, wherein is the first computing system is further configured to, in response to the plurality of listeners being executed by the first computing system, generate a first payload including first data, and generate a second payload for a second listener of the plurality of listeners based on the first data, wherein the second listener is configured to generate a third payload including second data and send the third payload to at least one of the plurality of subscribers.

18. The system of claim 1, wherein sending the broadcast event object to the identified subscribers occurs in real time with respect to receiving the indication.

19. The system of claim 1, wherein transmitting the message directly to the individual occurs in real time of the at least one identified subscriber receiving the broadcast event object.

* * * * *

UNITED STATES PATENT AND TRADEMARK OFFICE
CERTIFICATE OF CORRECTION

PATENT NO. : 10,757,154 B1
APPLICATION NO. : 15/360496
DATED : August 25, 2020
INVENTOR(S) : Dwayne Charles Jacobs et al.

It is certified that error appears in the above-identified patent and that said Letters Patent is hereby corrected as shown below:

On the Title Page

On Page 6, Column 1, Item (56), Line 13, under U.S. Patent Documents, delete "Ravels," and insert --Raveis,--.

On Page 15, Column 2, Item (56), Line 39, under Other Publications, delete "Unversiteit" and insert --Universiteit--.

On Page 15, Column 2, Item (56), Lines 63-64, under Other Publications, delete "Charge-Charge-Offs"," and insert --Charge-Offs",--.

In the Specification

In Column 11, Line 26, delete "and or" and insert --and/or--.

In Column 24, Line 8, delete ": null," and insert --:null,--.

In Column 24, Line 30, delete "15."}." and insert --15."},--.

In Column 24, Line 48, delete "15."}]}" and insert --15."}]}.--.

In Column 24, Line 63, delete ":null," and insert --":null,--.

In Column 25, Line 4, delete ": null," and insert --:null,--.

In Column 25, Line 6, delete ": null," and insert --:null,--.

In Column 25, Line 18 (Approx.), delete "22"}}" and insert --22"}}.--.

In Column 25, Line 40, delete "report."}}" and insert --report."}}.--.

Signed and Sealed this
Seventeenth Day of November, 2020

Andrei Iancu
*Director of the United States Patent and Trademark Office*

CERTIFICATE OF CORRECTION (continued)
U.S. Pat. No. 10,757,154 B1

In Column 25, Line 57 (Approx.), delete ":null}," and insert --":null},--.

In Column 25, Line 64, delete ": null," and insert --:null,--.

In Column 26, Line 4, delete "report."}}" and insert --report."}}.--.

In the Claims

In Column 33, Line 4, Claim 17, delete "wherein is the" and insert --wherein the--.